United States Patent
Ohta et al.

(10) Patent No.: US 7,095,470 B2
(45) Date of Patent: Aug. 22, 2006

(54) IN-PLANE FIELD TYPE LIQUID CRYSTAL DISPLAY DEVICE COMPRISING LIQUID CRYSTAL MOLECULES WITH MORE THAN TWO KINDS OF REORIENTATION DIRECTIONS

(75) Inventors: Masuyuki Ohta, Mobara (JP); Kazuhiko Yanagawa, Mobara (JP); Kazuhiro Ogawa, Mobara (JP); Keiichiro Ashizawa, Mobara (JP); Masahiro Yanai, Mobara (JP); Nobutake Konishi, Mobara (JP); Katsumi Kondo, Hitachinaka (JP); Masahito Ohe, Mobara (JP); Sukekazu Aratani, Hitachi (JP); Hagen Klausmann, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 10/400,637

(22) Filed: Mar. 28, 2003

(65) Prior Publication Data

US 2003/0184701 A1 Oct. 2, 2003

Related U.S. Application Data

(63) Continuation of application No. 10/237,756, filed on Sep. 10, 2002, which is a continuation of application No. 09/841,100, filed on Apr. 25, 2001, now Pat. No. 6,545,658, which is a continuation of application No. 08/722,849, filed on Sep. 26, 1996, now Pat. No. 6,266,116.

(30) Foreign Application Priority Data

| Oct. 4, 1995 | (JP) | 7-257366 |
|---|---|---|
| Oct. 9, 1995 | (JP) | 7-261235 |
| Mar. 27, 1996 | (JP) | 8-71787 |

(51) Int. Cl.
*G02F 1/1343* (2006.01)
(52) U.S. Cl. ............................ 349/141; 349/143
(58) Field of Classification Search ............. 349/139, 349/114, 141, 143
See application file for complete search history.

(56) References Cited

U.S. PATENT DOCUMENTS

| 5,434,690 A | 7/1995 | Hisatake et al. | 349/8 |
|---|---|---|---|
| 5,504,604 A | 4/1996 | Takatori et al. | 349/123 |

(Continued)

FOREIGN PATENT DOCUMENTS

JP   63-187218   8/1988

(Continued)

OTHER PUBLICATIONS

Ohta et al, Development of Super TFT LCDs with In-Plane Switching Display Mode, Asia Display '95, pp. 707-710.

*Primary Examiner*—Dung T. Nguyen
(74) *Attorney, Agent, or Firm*—Antonelli, Terry, Stout and Kraus, LLP.

(57) ABSTRACT

A liquid crystal display device includes a pair of substrates with a liquid crystal layer therebetween, scanning signal lines and video signal lines formed on one of the substrates, first electrodes provided on the one substrate, second electrodes provided on the one substrate to drive the liquid crystal layer by a voltage difference with respect to the first electrode, and an orientation film formed on a nearest surface to the liquid crystal layer on each of the substrates and having an initial orientation direction. At least two first electrodes and at least one second electrode are provided in each pixel with the first electrode and the second electrode having portions substantially in parallel. The at least two first electrode are connected by connecting portion in each pixel.

15 Claims, 40 Drawing Sheets

U.S. PATENT DOCUMENTS

| | | |
|---|---|---|
| 5,598,285 A | 1/1997 | Kondo et al. ................. 349/39 |
| 5,600,464 A | 2/1997 | Ohe et al. ................... 349/123 |
| 5,745,207 A | 4/1998 | Asada et al. ................ 349/141 |
| 5,754,266 A * | 5/1998 | Ohta et al. .................. 349/139 |
| 5,793,459 A | 8/1998 | Toko .......................... 349/128 |
| 5,864,376 A | 1/1999 | Takatori ..................... 349/128 |
| 5,914,761 A | 6/1999 | Ohe et al. ................... 349/141 |
| 5,977,562 A | 11/1999 | Hirakata et al. ............. 257/72 |
| 6,266,116 B1 | 7/2001 | Ohta et al. .................... 349/3 |
| 6,288,763 B1 | 9/2001 | Hirota et al. ............... 349/141 |

FOREIGN PATENT DOCUMENTS

| | | |
|---|---|---|
| JP | 1-277215 | 11/1989 |
| JP | 6-082617 | 3/1994 |
| JP | 7-134301 | 5/1995 |
| JP | 7-191336 | 7/1995 |

* cited by examiner

IN-PLANE FIELD TYPE LIQUID CRYSTAL DISPLAY DEVICE COMPRISING LIQUID CRYSTAL MOLECULES WITH MORE THAN TWO KINDS OF REORIENTATION DIRECTIONS

CROSS REFERENCE TO RELATED APPLICATION

This is a continuation of U.S. application Ser. No. 10/237,756, filed Sep. 10, 2002, which is a continuation of U.S. application Ser. No. 09/841,100, filed Apr. 25, 2001, now U.S. Pat. No. 6,545,658, which is a continuation U.S. application Ser. No. 08/722,849, filed Sep. 26, 1996, now U.S. Pat. No. 6,266,116, the subject matter of which is incorporated by reference herein.

BACKGROUND OF THE INVENTION (1) Field of the Invention

The present invention relates to a liquid crystal display device and its manufacturing method, particularly to an art to be effectively applied to an in-plane field type active-matrix liquid crystal display device.

(2) Description of the Prior Art

An active-matrix liquid crystal display device using an active element such as thin film transistor (TFT) has been widely spread as a display terminal of OA equipment because it is thin and lightweighted and has a high image quality equal to that of a cathode-ray tube.

The display system of the active-matrix liquid crystal display device is roughly divided into the following types.

One of them is a type, in which a liquid crystal layer is enclosed between a pair of substrates with two transparent electrodes formed on the substrates, a driving voltage is applied to the transparent electrodes, thereby driving the liquid crystal layer by an electric field almost perpendicular to the surfaces of the substrates, and the light passing the transparent electrodes and entering the liquid crystal layer is modulated (hereafter referred to as a vertical field type). Every product spread at present uses this type.

However, an active-matrix liquid crystal display device using the vertical field type has the problems on practical use that a contrast of an image extremely varies when changing viewing angles and particularly, a gradation level is inverted depending on a viewing angle when displaying half tone images.

The other of them is a type, in which a liquid crystal layer is enclosed between a pair of substrates, a driving voltage is applied to two stripe-like or line-like electrodes formed on either or both of the substrates, thereby driving a liquid crystal layer by an electric field almost parallel with the surfaces of the liquid crystal layer, and the light entering the liquid crystal layer from the gap between the two electrodes is modulated (hereafter referred to as an in-plane field type).

An active-matrix liquid crystal display device using the in-plane field type can realize wide viewing-angle characteristics. However, any active-matrix liquid crystal display device using the in-plane field type is not practically used yet.

Features of an active-matrix liquid crystal display device using the in-plane field type are shown in the official gazettes of Japanese Patent Application No. 505247/1993, Japanese Patent Publication No. 21907/1988, and Japanese Patent Laid-Open No. 160878/1994.

SUMMARY OF THE INVENTION

A conventional active-matrix liquid crystal display device using the in-plane field type modulates incoming light to a liquid crystal layer by rotating homogeneously initial-orienting liquid crystal molecules with no twisting, where an initial orientation direction is at an inclination to a pixel electrode and a counter electrode arranged in parallel, to create a reorientation state of liquid crystal molecules with twisting, whose major-axes are rotated substantially parallel with the surfaces of the liquid crystal layer, and displays images by a driving voltage enough small for conventional video signal drivers and with a response speed enough high to display animation.

Furthermore, the conventional active-matrix liquid crystal display device using the in-plane field type has extremely wide viewing angle characteristics compared with the active-matrix liquid crystal display device using the vertical field type.

However, the active-matrix liquid crystal display device using the in-plane field type cited above has a problem that viewing angle characteristics equal to those of a self-light-emitting display device such as a cathode ray tube (CRT) cannot be achieved because a homogeneous color tone cannot be realized and the viewing angle range of isochromaticity narrows when tilting a viewing angle to a certain direction.

That is, when liquid crystal molecules are twisted by rotation and viewing angle is tilted to the major-axis direction of the molecules, the birefringence anisotropy of the liquid crystal molecules more easily changes compared with the case of tilting the viewing angle to other directions, so that gradation level is more easily inverted and color tone more easily changes in the major-axis direction than in other directions.

Particularly, when a white image is displayed in the normally black mode, the color tone of white shifts to blue in the major-axis direction of the liquid crystal molecules.

Moreover, though the birefringence anisotropy does little change in the minor-axis direction of the liquid crystal molecules perpendicular to the major-axis direction of them, the color tone of white shifts to yellow in the minor-axis direction because the optical path length increases as the viewing angle tilts to the minor-axis direction.

The present invention has been made to solve the above mentioned problems of the prior art and its object is to provide an art for realizing wide viewing angle characteristics equal to those of a CRT and improving the image quality for an active-matrix liquid crystal display device using the in-plane field type.

The above and other objects and novel features of the present invention will become more apparent by the description of the present specification and the accompanying drawings.

The outline of a typical invention out of the inventions disclosed in this application is briefly described below.

(1) An active-matrix liquid crystal display device comprises a pair of substrates, a liquid crystal layer held between the substrates, a plurality of video signal lines formed on a first substrate of the pair, a plurality of scanning signal lines formed on the first substrate of the pair and intersecting the video signal lines, and a plurality of picture elements formed in a matrix in the intersecting regions between the video signal lines and the scanning signal lines;

wherein each of the picture elements has at least an active element formed on the first substrate, at least a pixel electrode connected to the active element, and at least a counter electrode formed on either of the substrates to generate an electric field almost parallel with the surfaces of the liquid crystal layer between the counter electrode and the pixel electrode;

and wherein liquid crystal molecules of the liquid crystal layer have at least two kinds of driving (reorientation) directions for neighboring picture elements or in one picture element.

(2) For the means in the above Item (1), the liquid crystal molecules of the liquid crystal layer between the counter electrode and the pixel electrode have one initial orientation direction.

(3) For the means in the above Item (2), each of the picture elements has a plurality of pairs of pixel electrodes and counter electrodes; wherein each pair of a pixel electrode and a counter electrode have a pair of facing sides faced almost parallel each other and the plurality of pairs of the facing sides have a tilt angle to the initial orientation direction of the liquid crystal molecules.

(4) For the mean in the above Item (3), wherein the initial orientation direction of the liquid crystal molecules is almost vertical to the scanning signal lines or parallel with the video signal lines, and picture elements with tilt angles θ and −θ are alternately arranged into a matrix.

(5) For the means in the above Item (4), the angle θ is kept in a range of $10° \leq θ \leq 20°$.

(6) For the means in the above Item (2), each of the picture elements has a plurality of pairs of pixel electrodes and counter electrodes; wherein each pair of a pixel electrode and a counter electrode have a pair of linear facing sides faced each other; and one of the pair of linear facing sides has a tilt angle to the initial orientation direction while the other of the pair is parallel with the initial orientation direction.

(7) For the means in the above Item (6), wherein the initial orientation direction of liquid crystal molecules is almost vertical to the scanning signal lines or parallel with the video signal lines, and the tilt angles of the plurality of pairs of facing sides are equal to θ and −θ.

(8) For the means in the above Item (7), the angle θ is kept in a range of $10° \leq θ \leq 20°$, and the numbers of the pairs of facing sides with tilt angles of θ and −θ in each of the picture elements are the same.

(9) For the means in the above Item (2), each of the picture elements has a plurality of pairs of pixel electrodes and counter electrodes; wherein each pair of a pixel electrode and a counter electrode have a pair of facing sides faced each other, and a first side of the pair is almost parallel with the initial orientation direction while a second side of the pair is formed by two parts, one part being extended almost parallel with the initial orientation direction and the other part being tilted from the initial orientation direction at a tilt angle and intersecting with the first side at near the edge of the first electrode; and wherein the plurality of pairs of facing sides have a plurality of the tilt angles in each picture element.

(10) For the means in the above Item (9), wherein the initial orientation direction of liquid crystal molecules is almost vertical to the scanning signal lines or almost parallel with the video signal lines, and the plurality of the tilt angles are equal to θ and −θ.

(11) For the means in the above Item (10), the angle θ is kept in a range of $30° \leq θ \leq 60°$, and the numbers of the pairs of facing sides with the tilt angles of θ and −θ in each of the picture elements are the same.

(12) For the means in the above Item (2), each of the picture elements has a plurality of pairs of pixel electrodes and counter electrodes; wherein each pair of a pixel electrode and a counter electrode have a pair of facing sides faced almost parallel each other and are bent inside the image display region of each of the picture elements.

(13) For the means in the above Item (12), wherein the video signal lines or the scanning signal lines are bent to be almost parallel with the pair of facing sides.

(14) For the means in the above Item (12), there are two or more types of gap distances between pairs of pixel electrodes and counter electrodes in each of the picture elements.

(15) For the means in the above Item (1), the liquid crystal molecules of the liquid crystal layer between the counter electrode and the pixel electrode have two initial orientation directions in each of the picture elements.

(16) For the means in the above Item (15), the liquid crystal layer has a positive dielectric anisotropy, initial orientation angles φLC1 and φLC2 are 90°+α and 90°−α, respectively, and angles φP1 and φP2 between the transmission axes of two polarizing plates and the direction (EDR) of the applied electric field are 90° and 0° respectively.

(17) For the means in the above Item (15), the liquid crystal layer has a negative dielectric anisotropy, initial orientation angles φLC1 and φLC2 are 0°+α and 180°−α, respectively, and angles φP1 and φP2 between the transmission axes of two polarizing plates and the direction (EDR) of the applied electric field are 90° and 0°, respectively.

(18) For the means in the above Item (16) or (17), the absolute value of α is 2.5° or less.

(19) For the means in the above Item (15), initial orientation angles φLC1 and φLC2 are 45° and 135°, respectively, and angles φP1 and φP2 between the transmission axes of two polarizing plates and the direction (EDR)of the applied electric field are 90° and 0° respectively.

(20) For the means in the above Item (15), the boundary between the two initial orientation directions of liquid crystal molecules is arranged over a pixel electrode or a counter electrode in each of the picture elements.

(21) For the means in the above Item (2) or (15), wherein an initial twist angle of the liquid crystal layer is within 5 degrees of 0°.

(22) For a manufacturing method of an active-matrix liquid crystal display device comprising a pair of substrates, a liquid crystal layer held between the substrates, a plurality of active elements formed in a matrix on a first substrate of the pair, a plurality of pixel electrodes connected to the active elements respectively, a plurality of counter electrodes formed on either of the substrates to generate an electric field almost parallel with the surfaces of the liquid crystal layer between the pixel electrodes and the counter electrodes, a pair of orientation films formed between the substrates and contacting the liquid crystal layer, and two polarizing plates formed on surfaces opposite to the surfaces of the substrates for holding the liquid crystal layer; two-directional rubbings are applied to the both orientation films in one picture element.

(23) For a manufacturing method of an active-matrix liquid crystal display device comprising at least a pair of substrates, a liquid crystal layer held between the substrates, a plurality of active elements formed in a matrix on a first substrate of the pair, a plurality of pixel electrodes connected to the active elements respectively, a plurality of counter electrodes formed on either of the substrates to generate an electric field almost parallel with the surfaces of the liquid crystal layer between the pixel electrodes and the counter electrodes, a pair of orientation films formed between the substrates and contacting the liquid crystal layer, and two polarizing plates formed on surfaces opposite to the surfaces of the substrates for holding the liquid crystal layer; a chiral agent is mixed in the liquid crystal layer and two-directional rubbings are applied only to either of the orientation films in one picture element.

(24) For a manufacturing method of an active-matrix liquid crystal display device comprising at least a pair of substrates, a liquid crystal layer held between the substrates, a plurality of active elements formed in a matrix on a first substrate of the pair, a plurality of pixel electrodes connected to the active elements respectively, a plurality of counter electrodes formed on either of the substrates to generate an electric field almost parallel with the substrate surfaces to the liquid crystal layer between the pixel electrodes and the counter electrodes, a pair of orientation films formed between the substrates and contacting the liquid crystal layer, and two polarizing plates formed on surfaces opposite to the surfaces of the substrates for holding the liquid crystal layer; two initial orientation directions of liquid crystal molecules are provided in one picture element by applying a laser beam having two predetermined polarized directions to different regions of the orientation films in the picture element.

According to the above means, shifts of color tones are offset each other and the dependency of color-tone on a viewing angle can greatly be reduced because the initial orientation angle $\phi LC$ is made different for neighboring picture elements or in one picture element so as to form two or more kinds of reorientation directions.

For example, in an in-plane field type device utilizing the normally black mode, in which a displayed image is dark when no voltage is applied and bright when a voltage is applied, and also utilizing the birefringence first minimum mode, the transmission axes of the two polarizing plates are perpendicularly intersected each other (cross Nicols), and the maximum transmittance, that is, a white image is obtained when the angle formed between each transmission axis and the major axis of liquid crystal molecules twisted by the electric field becomes almost equal to 45□.

When changing viewing directions from an upward direction, which is vertical to the substrate surface, to a tilted direction toward the substrate surface in the major-axis direction of liquid crystal molecules in the direction of about 45° away from the transmission axis under the above twisted state, the birefringence anisotropy changes and the color tone of white shifts to blue in the major-axis direction.

In the minor-axis direction of liquid crystal molecules (at a direction of about −45° away from the transmission axis, and perpendicular to the major-axis direction), the birefringence anisotropy does little change by tilting viewing angles from a vertical direction to an in-plane direction.

However, the color tone of white shifts to yellow in the minor-axis direction because the optical path length increases as the viewing angle tilts from a vertical to a in-plane direction in the minor-axis direction.

The important point is that, because blue and yellow colors are complimentary colors in chromaticity coordinates, white color can be created by mixing these two colors.

Therefore, by rotating liquid crystal molecules in two directions for each picture element or in one picture element, and by creating two reorientation states where the major-axis directions of the two states are nearly perpendicular to each other in displaying a white image or a half-tone image, color tones of the two states are offset each other and the viewing angle dependency of color tone change can greatly be reduced.

Moreover, also for gradation inversion, the characteristics of both the minor-axis direction of liquid crystal molecules to be hardly gradation-reversed and the major-axis direction of them to be easily gradation-reversed are averaged and the no-inversion viewing angle range of a gradation level can be expanded.

Thereby, the homogeneity of gradation and that of color tone are averaged or expanded in every direction and wide viewing angle characteristics close to those of a CRT can be realized.

The foregoing and other objects, advantages, manner of operation and novel features of the present invention will be understood from the following detailed description when read in connection with the accompanying drawings.

BRIEF DESCRIPTION OF THE DRAWINGS

FIGS. 27A and 27B are graphs showing the azimuthal angle ($\phi$) dependent characteristics of white color tone when driving the liquid crystal display device of the present invention and the liquid crystal display device of the comparative example, in which FIG. 27A shows the case of the comparative example and FIG. 27B shows the case of the present invention.

FIGS. 28A and 28B show a color tone constant region (an isochromatic region) in the form of semispherical polar-coordinate ($\theta$, $\phi$) graphs, in which FIG. 28A shows the case of the comparative example and FIG. 28B shows the case of the present invention and both of which show distributions of the white color tone.

DESCRIPTION OF THE PREFERRED EMBODIMENTS

Embodiments of the present invention are described below in detail by referring to the accompanying drawings.

In all drawings for explaining embodiments of the invention, components having the same function are provided with the same symbol and repetitive description of them is omitted.

Embodiment 1

First, the in-plane field type active-matrix color liquid crystal display device constituted in accordance with embodiment 1 of the present invention is outlined below.

<<Planar Structure of Matrix Portion (Picture Element Portion)>>

Figure 1:
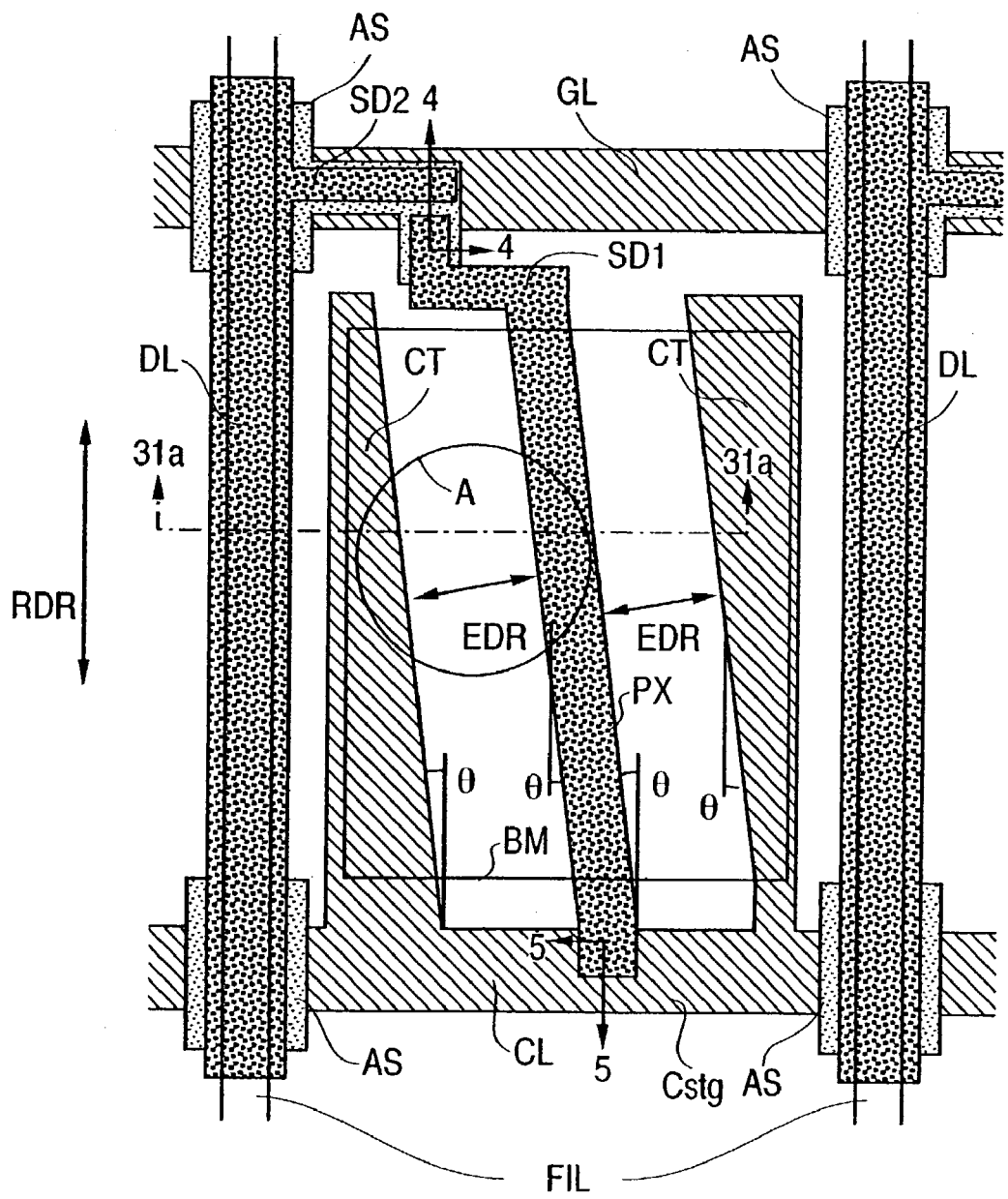
FIG. 1 is a top view of an essential portion showing one picture element and its neighborhood of the active-matrix color liquid crystal display device which is embodiment 1 of the present invention.

FIG. 1 is a top view showing one picture element and its neighborhood of the active-matrix color liquid crystal display device of embodiment 1 of an invention of the present invention.

Each picture element is arranged in a region (a region enclosed by four signal lines) where two adjacent scanning signal lines (gate signal lines or horizontal signal lines) (GL) and two adjacent video signal lines (drain signal lines or vertical signal lines) (DL) intersect.

Each picture element includes thin film transistor (TFT), storage capacitance (Cstg), a pixel electrode (PX), two counter electrodes (CT), and a counter voltage signal line (a common signal line) (CL).

In FIG. 1, a plurality of scanning signal lines (GL) and a plurality of counter voltage signal lines (CL) are arranged in the vertical direction while extending in the horizontal direction.

Moreover, a plurality of video signal lines (DL) are arranged in the horizontal direction while extending in the vertical direction.

Furthermore, a pixel electrode (PX) is connected to a source electrode (SD1) of a thin film transistor (TFT) and two counter electrodes (CT) are integrated with a counter voltage signal line (CL).

A pixel electrode (PX) and each of two counter electrodes (CT) are faced each other, controlling optical states of liquid crystal layer (LCD) by an electric field between the pixel electrode (PX) and the counter electrode (CT).

The pixel electrode (PX) and the two counter electrodes (CT) are formed like comb teeth. As shown in FIG. 1, the pixel electrode (PX) extends straight diagonally downward, and the two counter electrodes (CT) are formed in a comb tooth shape which protrude upward from a counter voltage signal line (CL) and whose facing sides faced with the pixel electrode (PX) also extend diagonally upward. The region between the pixel electrode (PX) and the two counter electrodes (CT) is divided into two parts in one picture element.

<<Sectional Structure of Display Matrix Portion (Picture Element Portion)>>

Figure 31:
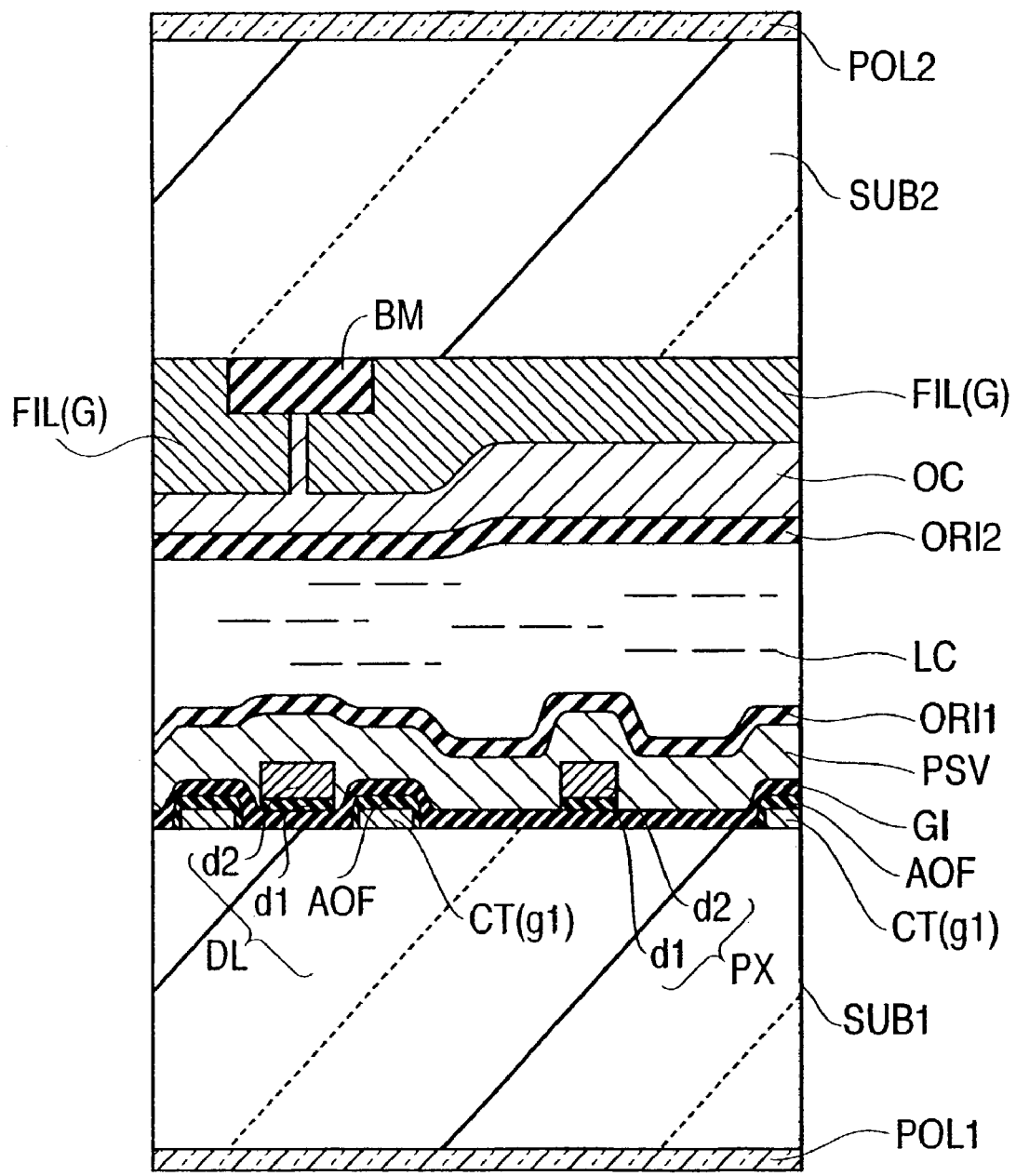
FIG. 31 is a sectional view of the picture element in FIG. 1, taken along the line a—a in FIG. 1.
Figure 32:
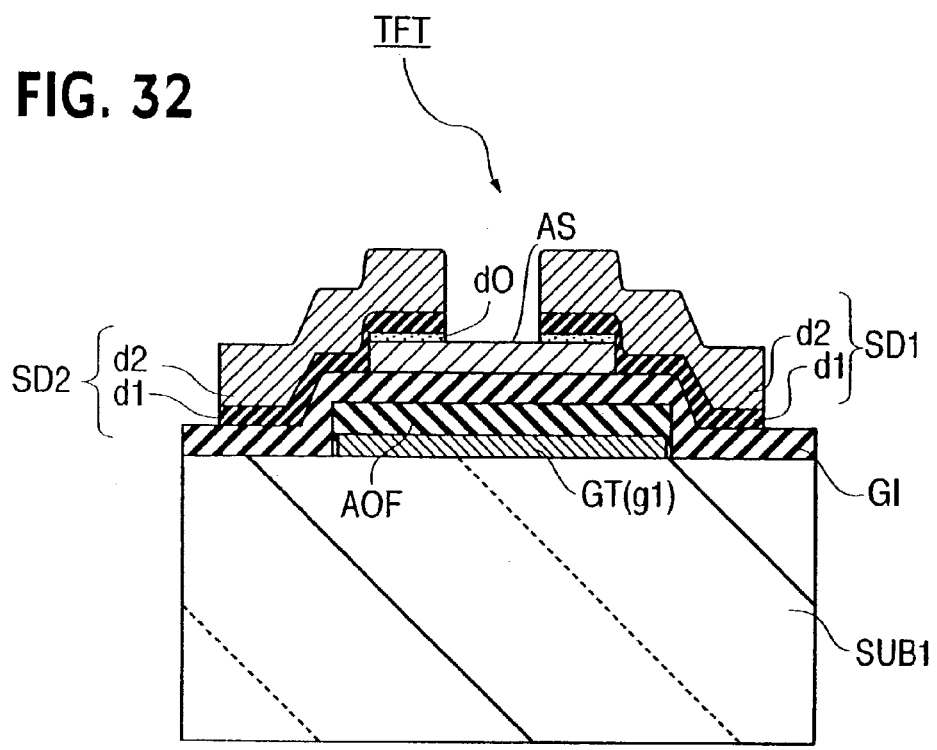
FIG. 32 is a sectional view of the thin film transistor (TFT) in FIG. 1, taken along the line 4—4 in FIG. 1.
Figure 33:
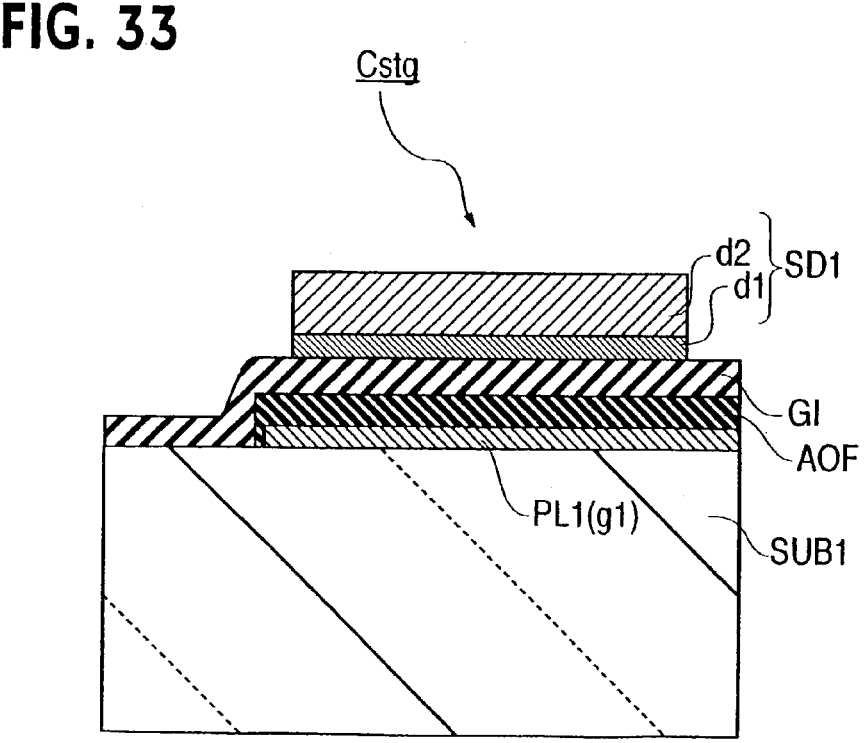
FIG. 33 is a sectional view of the storage capacitance (Cstg) in FIG. 1, taken along the line 5—5 in FIG. 1.

FIG. 31 is a sectional view showing the essential portion in FIG. 1, taken along the line 31a—31a in FIG. 1. FIG. 32 is a sectional view showing thin film transistor (TFT) in FIG. 1, taken along the line 4—4 in FIG. 1. FIG. 33 is a sectional view showing a storage capacitance (Cstg) in FIG. 1, taken along the line 5—5 in FIG. 1.

As shown in FIGS. 31 to 35, thin film transistors (TFT), storage capacitances (Cstg), and electrodes group are formed at the bottom transparent glass substrate (SUB1) side, and color filter (FIL) and light shielding black matrix (BM) are formed at the top transparent glass substrate (SUB2) side.

Moreover, orientation films (OR1 and ORI2) for controlling initial orientation directions of liquid crystal molecules (LC) at the surfaces of the liquid crystal layer are provided between transparent glass substrates (SUB1 and SUB2), and polarizing plates (POL1 and POL2) are provided on the outside surfaces of each of transparent glass substrates (SUB1 and SUB2).

More minute structures are described below.

<<TFT Substrate>>

First, the structure of the bottom transparent glass substrate (SUB1) (TFT substrate) is described below in detail.

<<Thin Film Transistor (TFT)>>

Thin film transistor (TFT) operates so that the channel resistance between the source and drain decreases by applying a positive bias to the gate electrode and increases by decreasing the bias to zero.

As shown in FIG. 32, thin film transistor (TFT) comprises gate electrode (GT), gate insulating film (GI), i-type semiconductor layer (AS) made of i-type (intrinsic, or undoped) amorphous silicon (Si), and a pair of a source electrode (SD1), and a drain electrode (SD2).

A source electrode (SD1) and a drain electrode (SD2) are originally determined by the bias polarity between them. Because the polarity of the circuit of the present liquid crystal display device is inverted during operation, a source electrode (SD1) and a drain electrode (SD2) are replaced each other during operation.

In the following description, however, one is fixed to source electrode (SD1) and the other is fixed to drain electrode (SD2) for convenience sake.

The embodiment of the present invention uses an amorphous-silicon thin film transistor as thin film transistor (TFT). However, it is also possible to use a two-terminal device such as a polysilicon thin film transistor, MOS transistor on a silicon wafer, organic TFT, or MIM (Metal-Insulator-Metal) diode (though each of them is not strictly an active element, it is assumed as an active element in the case of the present invention).

<<Counter Electrode (CT)>>

Counter electrode (CT) is made of conductive film (g1) on the same layer as gate electrode (GT) and scanning signal line (GL).

Moreover, anodic oxide film (AOF) made of aluminum oxide is formed on counter electrode (CT).

Counter electrode (CT) is constituted so that counter voltage (Vcon)) is applied to counter electrode (CT).

<<Counter Voltage Signal Line (CL)>>

Counter voltage signal line (CL) is made of conductive film (g1).

Counter voltage signal line (CL) is formed in the same manufacturing process as that of conductive films (g1) of gate electrode (GT), scanning signal line (GL), and counter electrode (CT).

Counter voltage (Vcom) is supplied to counter electrode (CT) from an external circuit through counter voltage signal, line (CL).

Moreover, anodic oxide film (AOF) made of aluminum oxide is formed on counter voltage signal line (CL).

Furthermore, it is possible to form counter electrode (CT) and counter voltage signal line (CL) at the top transparent-glass substrate (SUB2)(color filter substrate) side.

<<Insulating Film (GI)>>

Insulating film (GI) is used as a gate insulating film for providing an electric field for semiconductor layer (AS) together with gate electrode (GT) in thin film transistor (TFT).

Insulating film (GI) is formed over gate electrode (GT) and scanning signal line (GL). Insulating film (GI) uses, for example, a silicon nitride film formed by plasma CVD and is formed at a thickness of 1,200 to 2,700A (approx. 2,400A for the embodiment of the present invention).

Gate insulating film (GI) is formed so as to entirely enclose display Matrix portion (AR) and its margin is removed so that external terminals (DTM and GTM) are exposed.

Insulating film (GI) also contributes to electrical insulation between counter voltage signal line (CL) and video signal line (DL).

<<Pixel Electrode (PX)>>

Pixel electrode (PX) comprises conductive film (d1), and conductive film (d2) formed on conductive film (d1).

Moreover, pixel electrode (PX) is formed on the same layer as source electrode (SD1) and drain electrode (SD2). Furthermore, pixel electrode (PX) is integrated with source electrode (SD1).

<<Storage Capacitance (Cstg)>>

Pixel electrode (PX) is constituted so as to overlap with counter voltage signal line (CL) at the end opposite to the end connected with thin film transistor (TFT).

As shown in FIG. 33, this overlap constitutes storage capacitance (Cstg) using pixel electrode (PX) as one electrode (PL2) and counter voltage signal (CL) as other electrode (PL1).

The dielectric film of storage capacitance (Cstg) comprises insulating film (GI) used as a gate insulating film of thin film transistor (TFT) and anodic oxide film (AOF).

As shown in FIG. 1, planar storage capacitance (Cstg) is arranged on a part of conductive film (g1) of a counter voltage signal line (CL).

<<Color Filter Substrate>>

Then, the structure of the top transparent-glass substrate (SUB2) (color filter substrate) is described in detail below by referring to FIGS. 1 and 31.

<<Light Shielding Film (BM)>>

Light shielding film (BM) (so-called black matrix) is formed at the top transparent glass substrate (SUB2) side so that contrast of a displayed image is not deteriorated due to the light transmitted through an unnecessary gap other than the gap between a pixel electrode (PX) and a counter electrode (CT) and emitted to the display surface side.

Light shielding film (BM) also has a function for preventing external light or backlight from entering semiconductor layer (AS).

That is, i-type semiconductor layer (AS) of thin film transistor (TFT) is sandwiched between light shielding film (BM) and slightly-large gate electrode (GT) from the top and bottom and thereby protected from external natural light or backlight.

The inside of the closed polygonal contour of light shielding film (BM) shown in FIG. 1 shows an opening where light shielding film (BM) is not formed.

Light shielding film (BM) has a shielding characteristic to light and is made of a film with a high insulating property not so as to influence the electric field between a pixel electrode (PX) and a counter electrode (CT). For the embodiment of the present invention, light shielding film (BM) uses a mixture obtained by mixing black pigment with resist and formed at a thickness of approx. 1.2 μm.

Light shielding film (BM) is formed like a lattice around each picture element and the lattice partitions the effective display region of one picture element.

Therefore, the contour of each picture element is made clear by light shielding film (BM).

That is, light shielding film (BM) has a function for serving as a black matrix and a function for shielding light to i-type semiconductor layer (AS).

Light shielding film (B) is also formed on the margin like a frame and its pattern is formed continuously with the pattern of the matrix portion provided with a plurality of dot-like openings shown in FIG. 1.

Light shielding film (BM) at the margin is extended to the outside of sealing portion (SL) to prevent leak light such as reflected light due to a real machine such as a personal computer from entering the display matrix portion.

Moreover, light shielding film (BM) is kept in a range approx. 0.3 to 1.0 mm inside from the peripheral edge of top transparent-glass substrate (SUB2) and formed so as to avoid the cutting region of top transparent-glass substrate (SUB2).

<<Color Filter (FIL)>>

Color filter (FIL) is formed like a stripe in repetition of red, green, and blue and moreover, it is formed so as to overlap with the edge of light shielding film (BM).

Color filter (FIL) can be formed as shown below.

First, a dyeing base material such as an acrylic resin is formed on the surface of top transparent-glass substrate (SUB2) and then the dyeing base material other than that in a red-filter forming region is removed by photolithography.

Thereafter, the dyeing base material is dyed by a red dye and fixed to form red filter (R).

Then, green filter (G) and blue filter (B) are successively formed by the same process.

<<Overcoat Film (OC)>>

Overcoat film (OC) is used to prevent a dye from leaking from color filter (FIL) to a liquid crystal layer and flatten steps due to color filter (FIL) and light shielding film (BM).

Overcoat film (OC) is made of, for example, a transparent resin such as acrylic resin or epoxy resin.

<<Structure Around Display Matrix Portion (AR)>>

Figure 34:
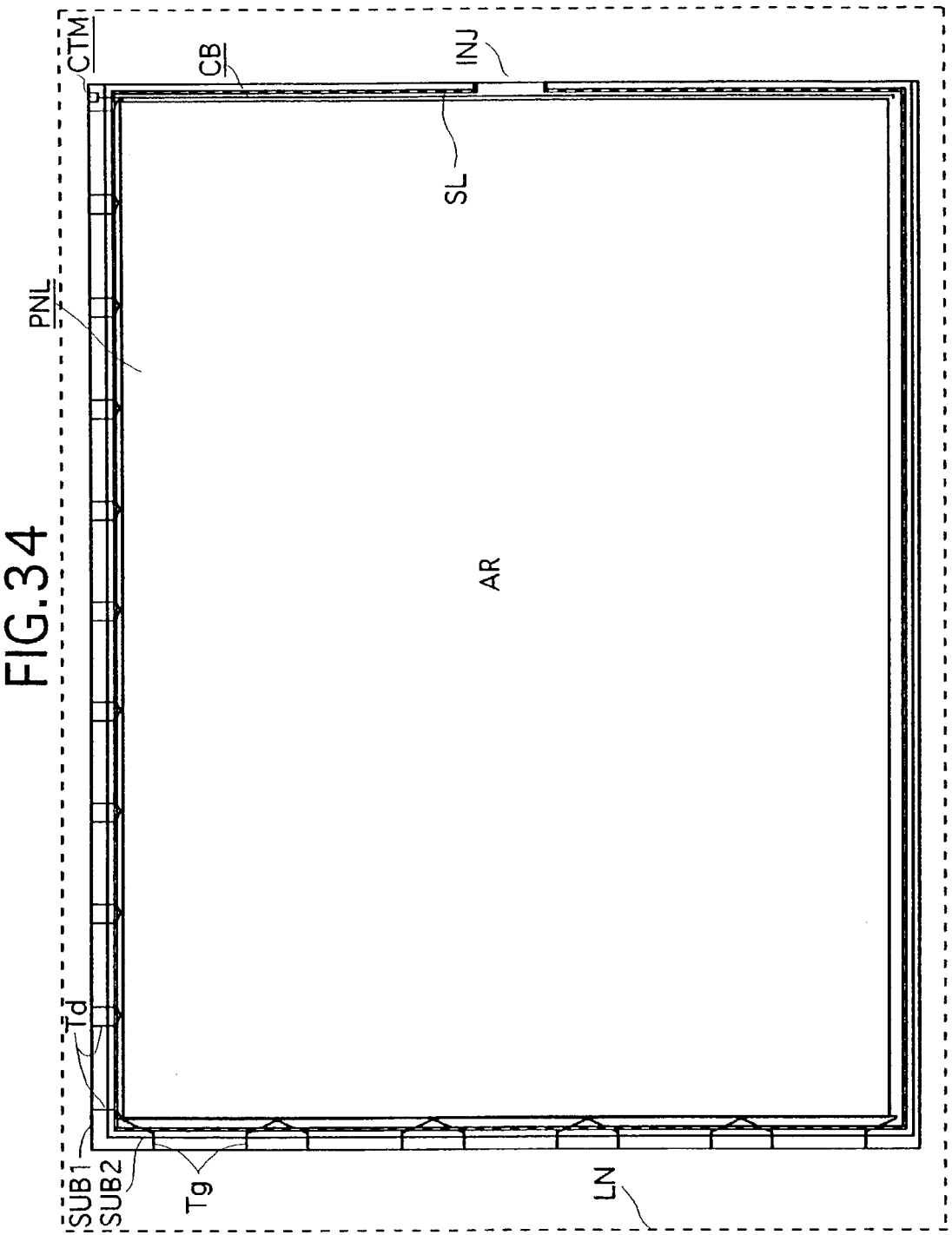
FIG. 34 is a top view for explaining the structure of portions around the matrix of the display panel (PNL) of the liquid crystal display device of each embodiment of the present invention.

FIG. 34 is an illustration showing a top view of an essential portion around display matrix (AR) portion of display panel (PNL) including top and bottom transparent-glass substrates (SUB1 and SUB2).

Figure 35:
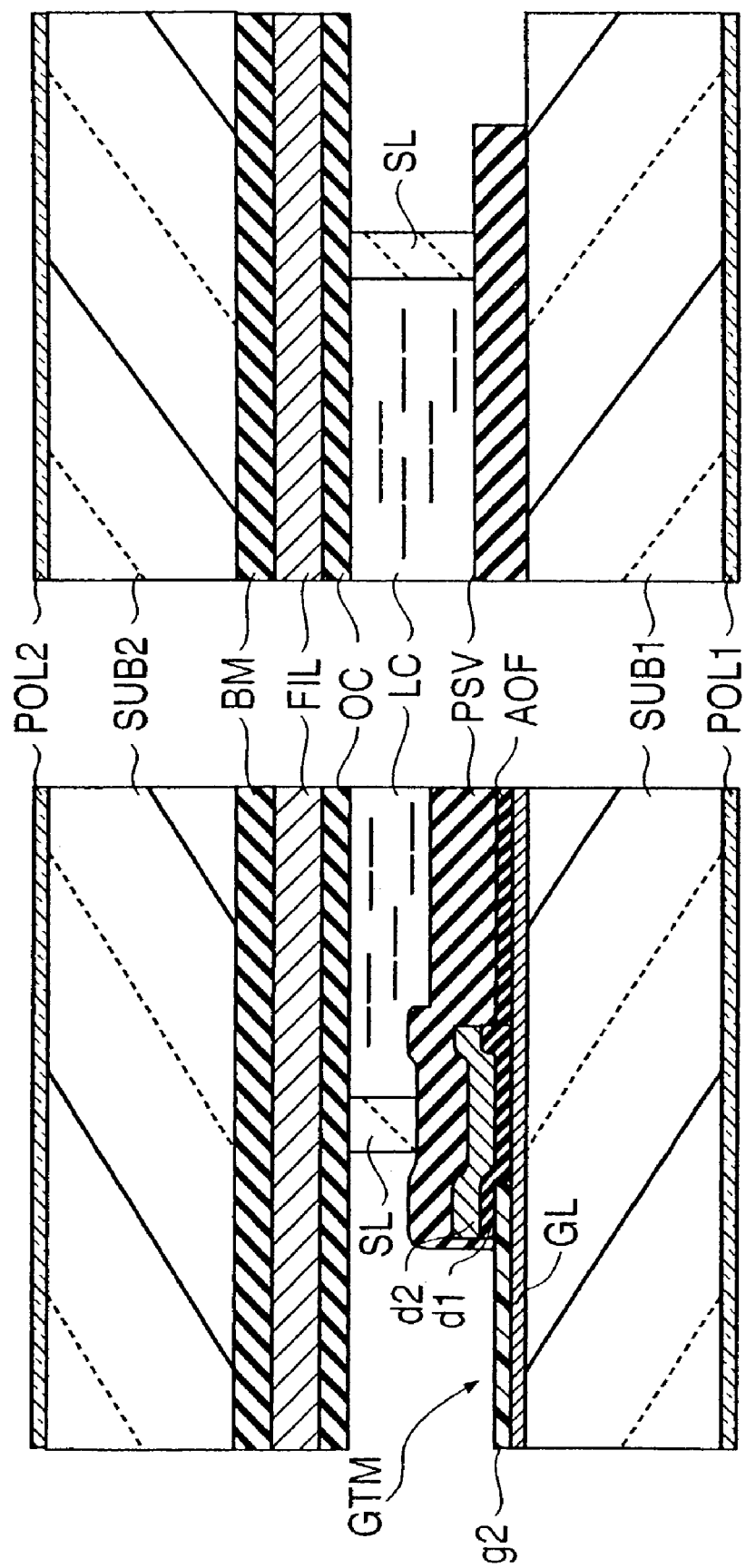
FIG. 35 is a sectional view showing the margin of a panel having scanning signal terminals at its left side and having no external connection terminals at its right side in the liquid crystal display device of each embodiment of the present invention.

FIG. 35 is an illustration showing the cross section of the neighborhood of external connection terminal (GTM) to which a scanning circuit should be connected at the left side and the cross section of the neighborhood of a sealing portion free from external connection terminal at the right side.

Terminal groups (Tg and Td) are named by collecting every several scanning-circuit connection terminals (GTM), video-signal-circuit connection terminals (DTM), and their outgoing wiring portions for connection with tape carrier packages (TCP).

Counter electrode terminal (CTM) is a terminal for supplying counter voltage (Vcom) to counter electrode (CT) from an external circuit.

Counter voltage signal line (CL) of the display matrix portion is extended to the opposite side (right side in drawings) to scanning-circuit terminal (GTM), and counter voltage signal lines (CL) are collected by common bus line (CB)(counter electrode connection signal line) and connected to counter electrode terminal (CTM).

Layers of orientation films (ORI1 and ORI2) are formed inside of sealing pattern (SL) and polarizing plates (POL1 and POL2) are formed on the outside surfaces of bottom transparent glass substrate (SUB1) and top transparent glass substrate (SUB2), respectively.

Liquid crystal layer (LCD) is sealed in a region partitioned by sealing pattern (SL) between bottom orientation film (ORI1) and top orientation film (ORI2) for setting the orientation of liquid crystal molecules.

Bottom orientation film (ORI1) is formed on protective coat (PSV) over the bottom transparent-glass substrate (SUB1).

The liquid crystal display device of each embodiment of the present invention is fabricated by superposing various layers to separately form bottom transparent glass substrate (SUB1) and top transparent glass substrate (SUB2), thereafter forming sealing pattern (SL) on the top transparent glass substrate (SUB2), superposing top transparent glass substrate (SUB2) on bottom transparent glass substrate (SUB1) and, injecting liquid crystal (LCD) through opening portion (INJ) of sealing pattern (SL), sealing injection port (INJ) with epoxy resin or the like, and cutting the top and bottom substrates.

<<Equivalent Circuit of Whole Display Device>>

Figure 39:
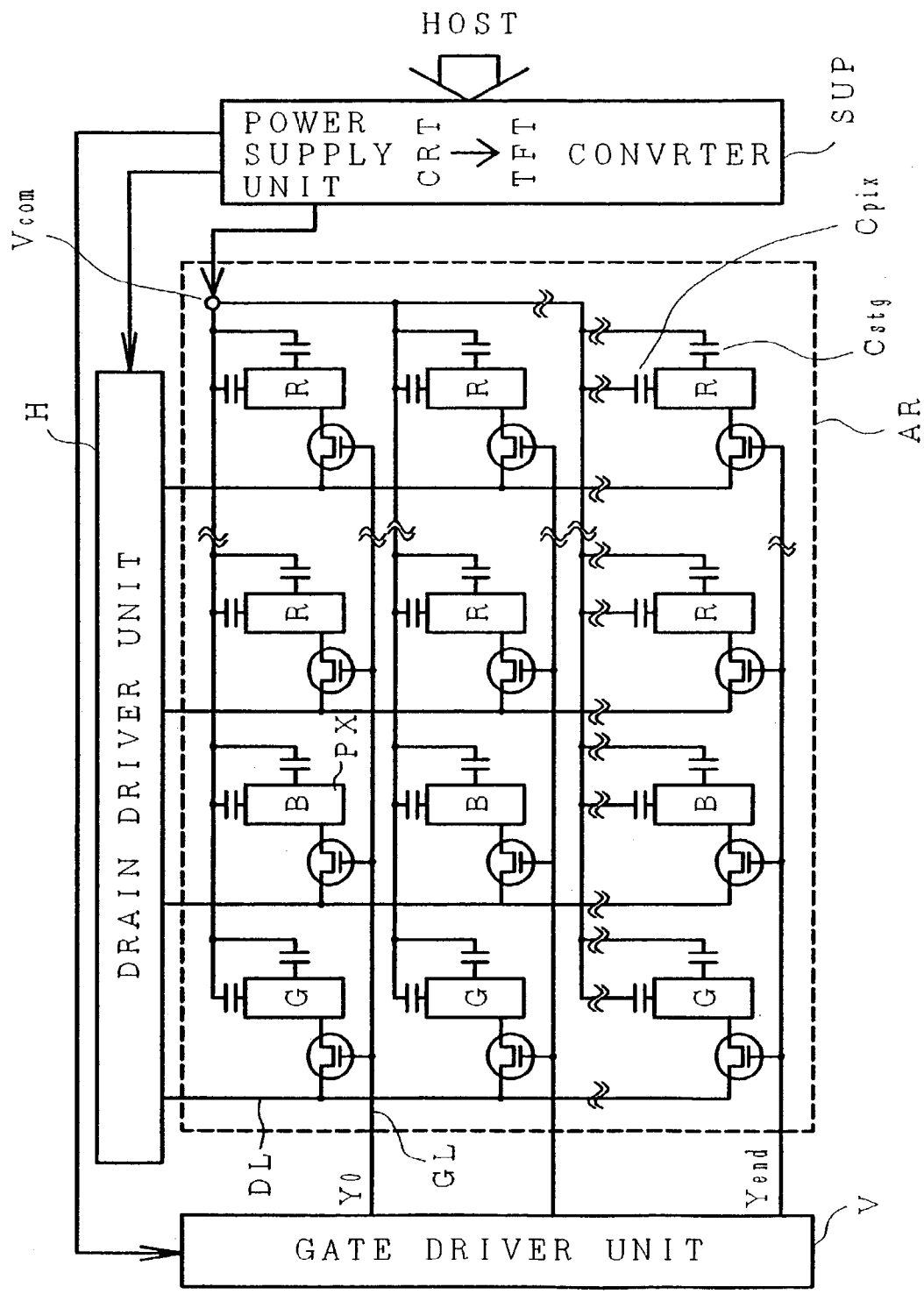
FIG. 39 is an illustration showing the equivalent circuit and its peripheral circuits of the display matrix portion (AR) of the liquid crystal display device of each embodiment of the present invention.

FIG. 39 is a connection diagram of an equivalent circuit of display matrix portion (AR) and its peripheral circuits.

In FIG. 39, symbol AR denotes a display matrix portion (matrix array) in which a plurality of picture elements are two-dimensionally arranged.

In FIG. 39, symbol PX denotes a pixel electrode, in which additional characters G and B are added correspondingly to green and blue respectively. Symbols y0, y1, . . . , and yend of scanning signal line (GL) denote the sequence of scanning timing.

Scanning signal line (GL) is connected to vertical scanning circuit (V) and video signal line (DL) is connected to video signal driving circuit (H). Circuit (SUP) includes a power supply circuit for obtaining a plurality of stabilized voltage sources of divided voltages obtained from one voltage source and a circuit for converting the information for an CRT (cathode ray tube) sent from a host (host arithmetic processing unit) to the information for a (TFT) liquid crystal display device.

<<Driving Method>>

Figure 40:
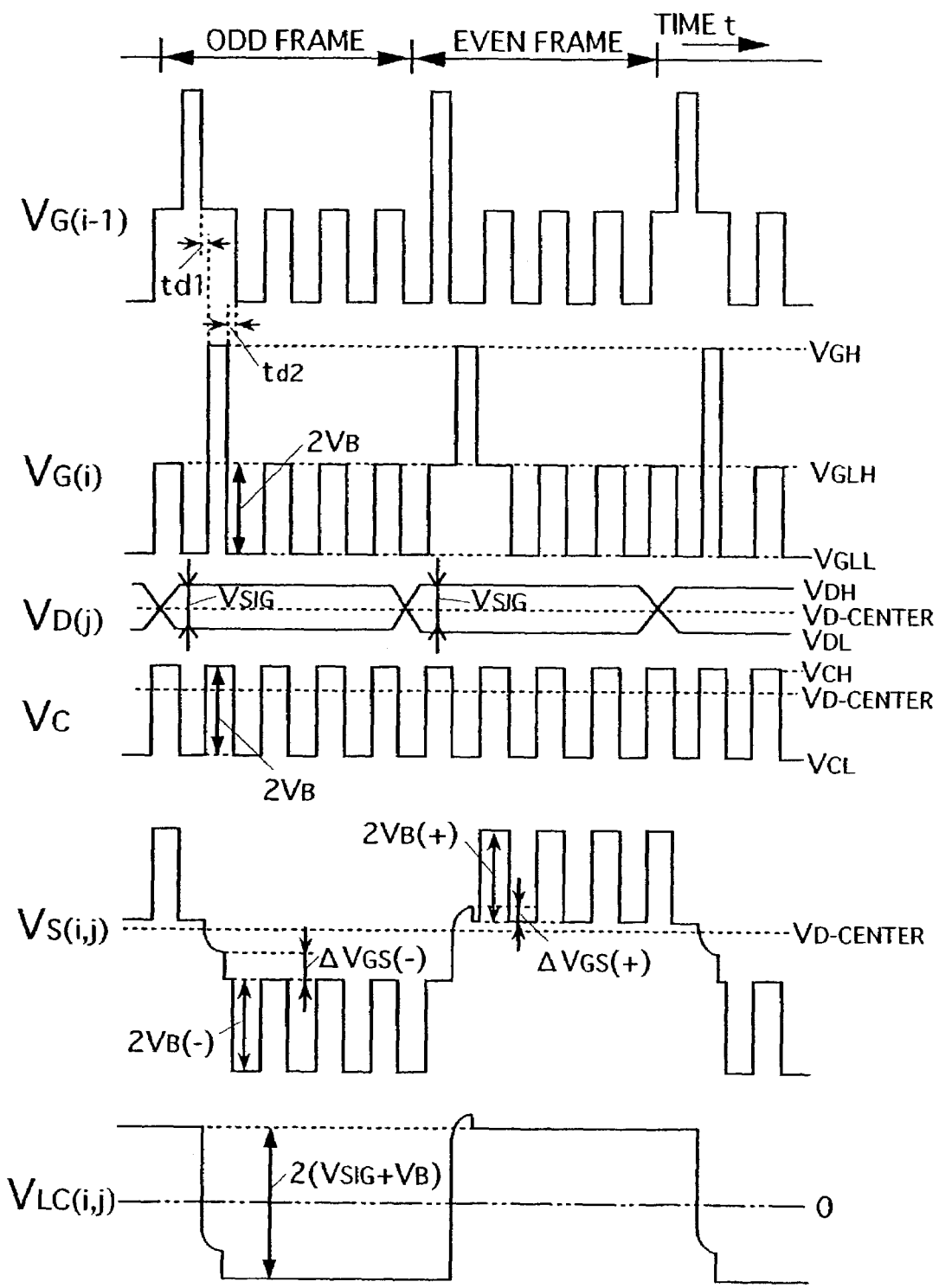
FIG. 40 is an illustration showing driving waveforms of the liquid crystal display device of each embodiment of the present invention at driving.

FIG. 40 is an illustration showing driving waveforms when driving the liquid crystal display device of the embodiment of the present invention. $V_G(i-1)$ and $V_G(i)$ denote the gate voltages (scanning signal voltages) applied to the (i-1)-th and (i)-th scanning signal lines (GL) respectively.

Moreover, $V_D(j)$ denotes a video signal voltage applied to video signal line (DL) and Vc denotes counter voltage (Vcom) applied to counter electrode (CT).

Furthermore, Vs(i,j) denotes a pixel electrode voltage applied to pixel electrode (PX) of the picture element at row (i) and column (j) and $V_{LC}(i,j)$ denotes a voltage applied to a liquid crystal layer of the picture element at row (i) and column (j).

The method for driving the liquid crystal display device of each embodiment of the present invention converts counter voltage (Vcom) applied to counter electrode (CT) to two AC rectangular waves of VCH and VCL as shown by Vc and changes non-selective voltages of gate voltage (VG) applied to gate electrode (GT) in two values of VGLH and VGLL for each scanning period synchronously with the AC rectangular waves.

In this case, the amplitude of counter voltage (Vcom) is made equal to that of non-selective voltages of gate voltage (VG).

Video signal voltage (VD) applied to video signal line (DL) is equal to voltage (VSIG) obtained by subtracting ½ of the amplitude of counter voltage (VC) from a voltage to be applied to a liquid crystal layer.

DC voltage, instead of AC voltage, can be used for counter voltage (Vcom) to be applied to counter electrode (CT). However, by using AC for counter voltage (Vcom), the maximum amplitude of video signal voltage (VD) can be reduced and a circuit with a low withstand voltage can be used for the video signal driving circuit (signal-side driver).

<<Functions of Storage Capacitance (Cstg)>>

Storage capacitance (Cstg) is used to store the video information written in picture elements for a long time after thin film transistor (TFT) is turned off.

In the case of an in-plane field type device, which is used for each embodiment of the present invention, video information cannot be stored in picture elements unless there is storage capacitance (Cstg) because a liquid crystal capacitance (Cpix) constituted between a pixel electrode (PX) and a counter electrode (CX) is so smaller than a capacitance (Cpix) of a vertical field type device that this capacitance (Cpix) can be hardly worked as. a holding capacitance.

Therefore, storage capacitance (Cstg) is an indispensable component for the in-plane field type device.

Moreover, storage capacitance (Cstg) operates so as to decrease influences of gate potential change OVG) on pixel electrode potential (Vs) when thin film transistor (TFT) is switched.

This state is shown by an expression below.

$$\Delta Vs = \{Cgs/(Cgs+Cstg+Cpix)\}X\Delta VG \quad \text{[Mathematical expression 1]}$$

In the above expression, Cgs denotes a parasitic capacitance formed between gate electrode (GT) and source electrode (SD1) of thin film transistor (TFT), Cpix denotes a capacitance formed between pixel electrode (PX) and counter electrode (CT), and ΔVs denotes a change of a pixel electrode potential due to ΔVG, that is, a so-called feed-through voltage.

Though the above change (ΔVs) is a cause of a DC component added to a liquid crystal layer, it can be decreased by increasing holding capacitance (Cstg).

Decrease of the DC component applied to liquid crystal layer (LCD) makes it possible to improve the life time of liquid crystal layer (LCD) and reduce the so-called sticking in which a latent image is left on a liquid crystal display screen.

As described above, because gate electrode (GT) is increased in size so as to cover i-type semiconductor layer (AS), the region overlapped with source electrode (SD1) and drain electrode (SD2) increases by the increased region of electrode (GT) and therefore, the disadvantages occur that parasitic capacitance (Cgs) increases and pixel electrode potential (Vs) is effected by gate voltage (scanning signal voltage)(VG).

However, by using storage capacitance (Cstg), the disadvantages can be settled.

<<Manufacturing Method>>

Then, a method for manufacturing the bottom transparent-glass substrate (SUB1) side of the liquid crystal display device described above is explained below by referring to FIGS. 36 to 38.

Figure 36:
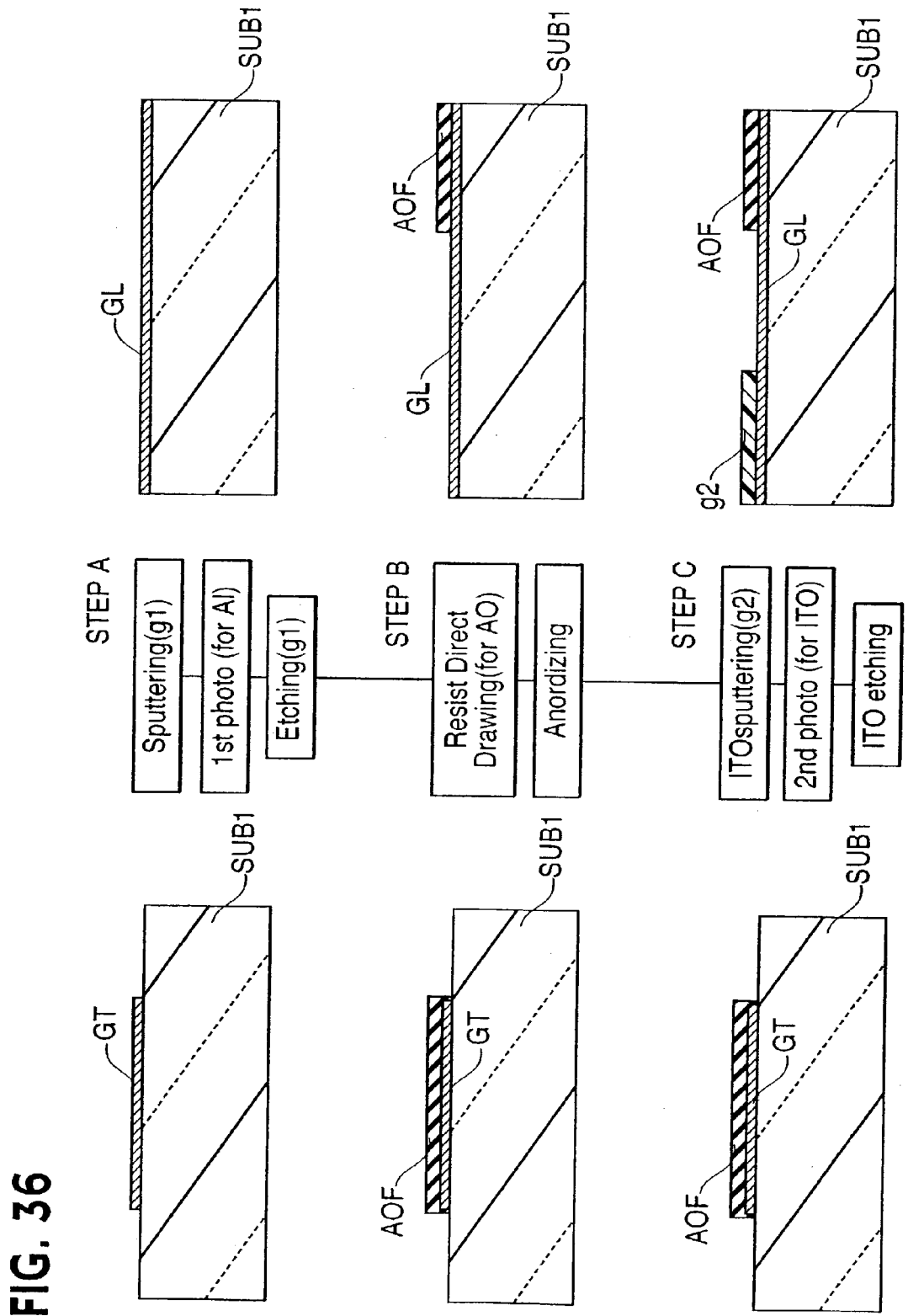
FIG. 36 is a flow chart of sectional views of a thin film transistor element portion and a gate terminal portion showing the manufacturing process of steps A to C at the transparent substrate (SUB1) of the liquid crystal display device of each embodiment of the present invention.
Figure 37:
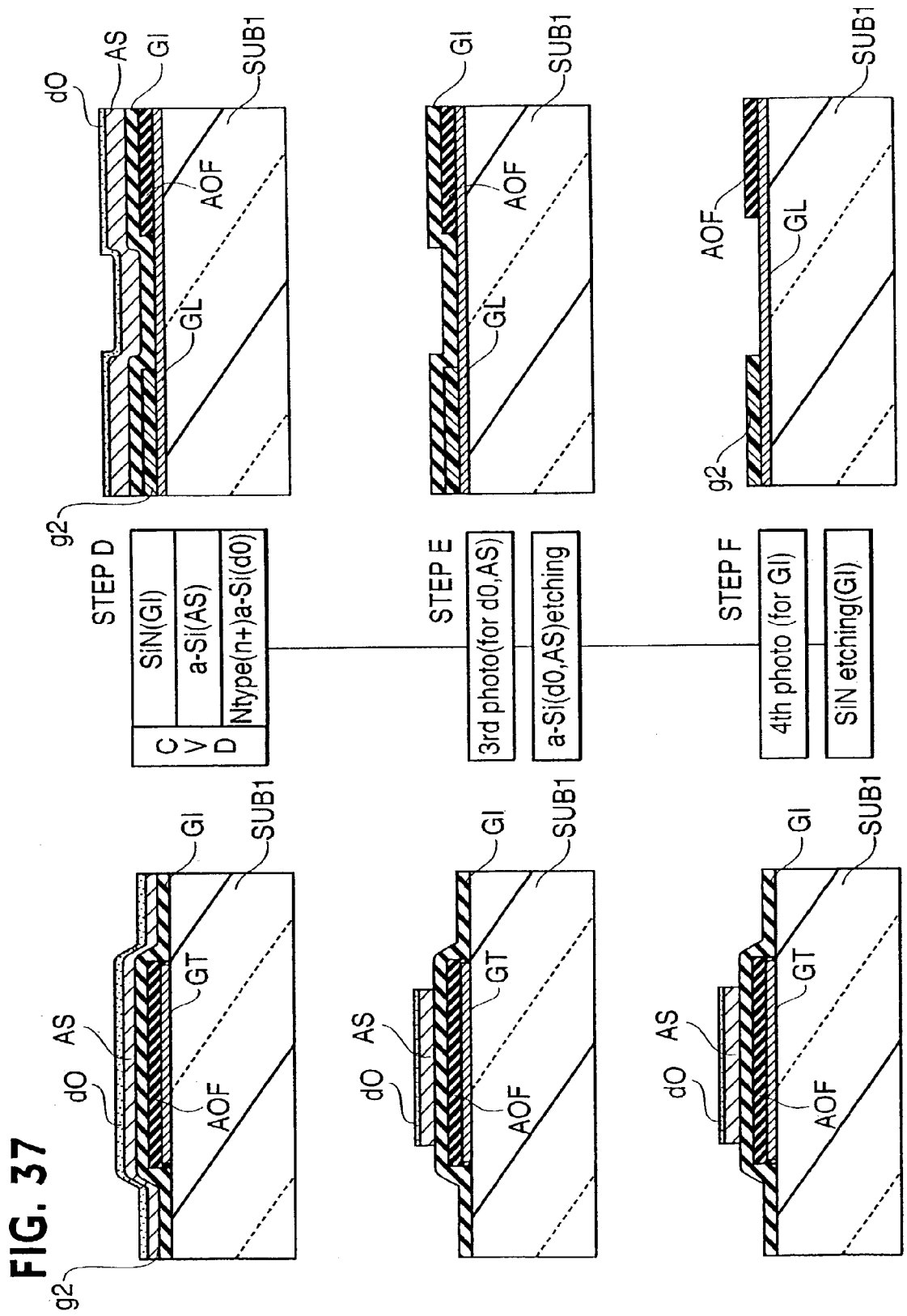
FIG. 37 is a flow chart of sectional views of a thin film transistor element portion and a gate terminal portion showing the manufacturing process of steps D to F at the transparent substrate (SUB1) of the liquid crystal display device of each embodiment of the present invention.
Figure 38:
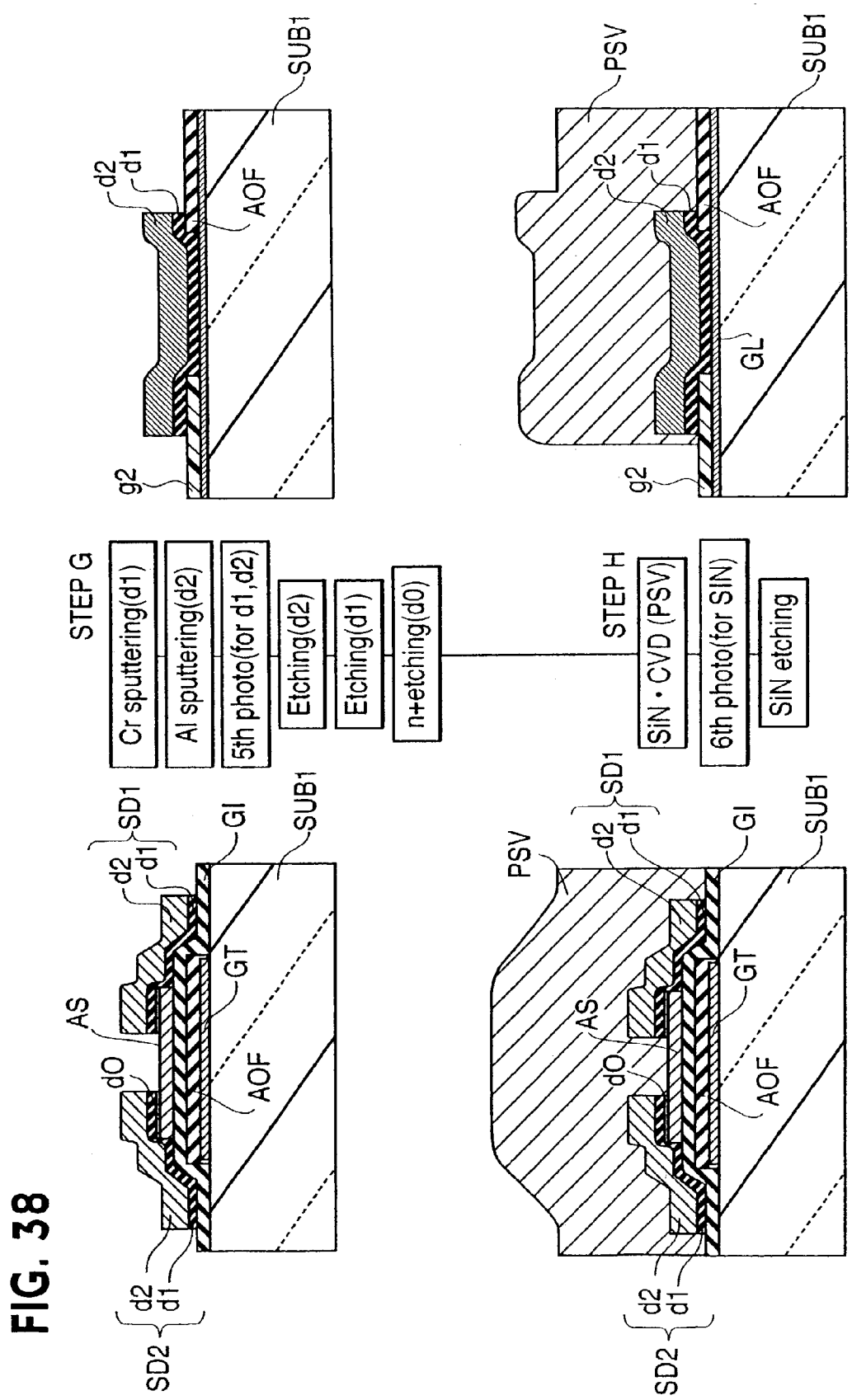
FIG. 38 is a flow chart of sectional views of a thin film transistor element portion and a gate terminal portion showing the manufacturing process of steps G to H at the transparent substrate (SUB1) of the liquid crystal display device of each embodiment of the present invention.

In FIGS. 36 to 38, characters at the center show abbreviations of step names, the left side shows the thin film transistor (TFT) portion shown in FIG. 32, and the right side shows the processing flow of sectional shapes nearby a gate terminal.

Steps A to I are classified correspondingly to each photographic processing except steps B and D. Any sectional view of each step shows a stage in which processing after photographic treatment is completed and photoresist is removed.

In the following description, photographic treatment is defined as a series of operations from application of photoresist to selective exposure using a mask and development of it and repetitive description is avoided.

Description is made below in accordance with classified steps.

(Step A, FIG. 36)

Conductive film (g1) with a thickness of 3,000 Å comprising aluminum(Al)-palladium(Pd), aluminum(Al)-silicon (Si), aluminum(Al)-tantalum(Ta), or aluminum(Al)-titanium(Ti)-tantalum(Ta) is formed on bottom transparent-glass substrate (SUB1) by sputtering.

After photographic treatment, conductive film (g1) is selectively etched by a mixed acid solution of phosphoric acid, nitric acid, glacial acetic acid, and water.

Thereby, anodic oxide bus line (SHg) (not illustrated) for connecting gate electrode (GT), scanning signal line (GL), counter electrode (CT), counter voltage signal line (CL), electrode (PL1), first conductive film of common bus line (CB), first conductive film of counter electrode terminal (CTM), and gate terminal (GTM) and anodic oxide pad (not illustrated) connected to anodic oxide bus line (SHg) are formed.

(Step B, FIG. 36)

Anodic oxide mask (AO) is formed by direct drawing and thereafter, bottom transparent-glass substrate (SUB1) is soaked in an anodic oxide solution obtained by diluting a solution which is obtained by preparing 3% tartaric acid with ammonia to PH of 6.25±0.05 with an ethylene glycol solution to 1:9 to make adjustment so that a formation-current density comes to 0.5 mA/cm$^2$ (constant current formation).

Then, anodizing is performed until a formation voltage of 125 V is reached which is necessary to obtain aluminum oxide film (AOF) with a predetermined thickness.

Thereafter, it is preferable to keep aluminum oxide film (AOF) under the above state for tens of minutes (constant voltage formation).

This is important to obtain homogeneous aluminum oxide film (AOF).

Thereby, conductive film (g1) is anode-oxidized and anodic oxide film (AOF) with a thickness of 1,800A is formed on gate electrode (GT), scanning signal line (GL), counter electrode (CT), counter voltage signal line (CL), and electrode (PL1).

(Step C, FIG. 36)

Transparent conductive film (g2) made of an ITO film with a thickness of 1,400 Å is formed by sputtering.

After photographic treatment, transparent conductive film (g2) is selectively etched by a mixed acid solution of hydrochloric acid and nitric acid as an etching solution to form the highest layer of gate terminal (GTM), drain terminal (DTM), and the second conductive film of counter electrode terminal (CTM).

(Step D, FIG. 37)

Ammonia gas, silane gas, and nitrogen gas are introduced into a plasma CVD system to form a silicon nitride film (SiNx) with a thickness of 2,200 Å and moreover, silane gas and hydrogen gas are introduced into the plasma CVD system to form an i-type amorphous silicon (Si) film with a thickness of 2,000 Å. Thereafter, hydrogen gas and phosphine gas are introduced into the plasma CVD system to form N(+)-type amorphous silicon (Si) film with a thickness of 300 Å.

(Step E, FIG. 37)

After photographic treatment, i-type semiconductor pattern (AS) is formed by using carbon tetrachloride (CCl$_4$) and sulfur hexafluoride (SF$_6$) as dry etching gases and thereby selectively etching an N(+)-type amorphous silicon (Si) film and i-type amorphous silicon (Si) film.

(Step F, FIG. 37)

After photographic treatment, a silicon nitride film is selectively etched by using sulfur hexafluoride (SF$_6$) as a dry etching gas.

(Step G, FIG. 38)

Conductive film (d1) made of chromium (Cr) with a thickness of 600 Å is formed by sputtering and moreover, conductive film (d2) comprising aluminum(Al)-tantalum (Ta) or aluminum(Al)-titanium(Ti)-tantalum(Ta) with a thickness of 4,000 Å is formed by sputtering.

After photographic treatment, conductive film (d2) is etched by a mixed acid solution of phosphoric acid, nitric acid, glacial acetic acid, and water and conductive film (dl) is etched by a cerium(II) nitrate ammonia solution to form video signal line (DL), source electrode (SD1), drain electrode (SD2), pixel electrode (PX), electrode (PL2), second and third conductive films of common bus line (CB), and bus line (SHd) for shorting drain terminal (DTM) (not illustrated).

The resist used for the embodiment of the present invention uses semiconductor resist OFPR800 (trade name) made by TOKYO OHKA KOGYO CO., LTD.

Then, N(+)-type semiconductor layer (d0) between the source and drain is selectively removed by introducing carbon tetrachloride (CCl$_4$) and sulfur hexafluoride (SF$_6$) into a dry etching system and thereby etching an N(+)-type amorphous silicon (Si) film.

(Step H, FIG. 38)

Ammonia gas, silane gas, and nitrogen gas are introduced into a plasma CVD system to form a silicon nitride film with a thickness of 1 μm.

After photographic treatment, protective coat (PSV) is formed by selective etching the silicon nitride film by the photolithography using sulfur hexafluoride (SF$_6$) as a dry etching gas.

<<Display Panel (PNL) and Driving-circuit Substrate PCB1>>

Figure 41:
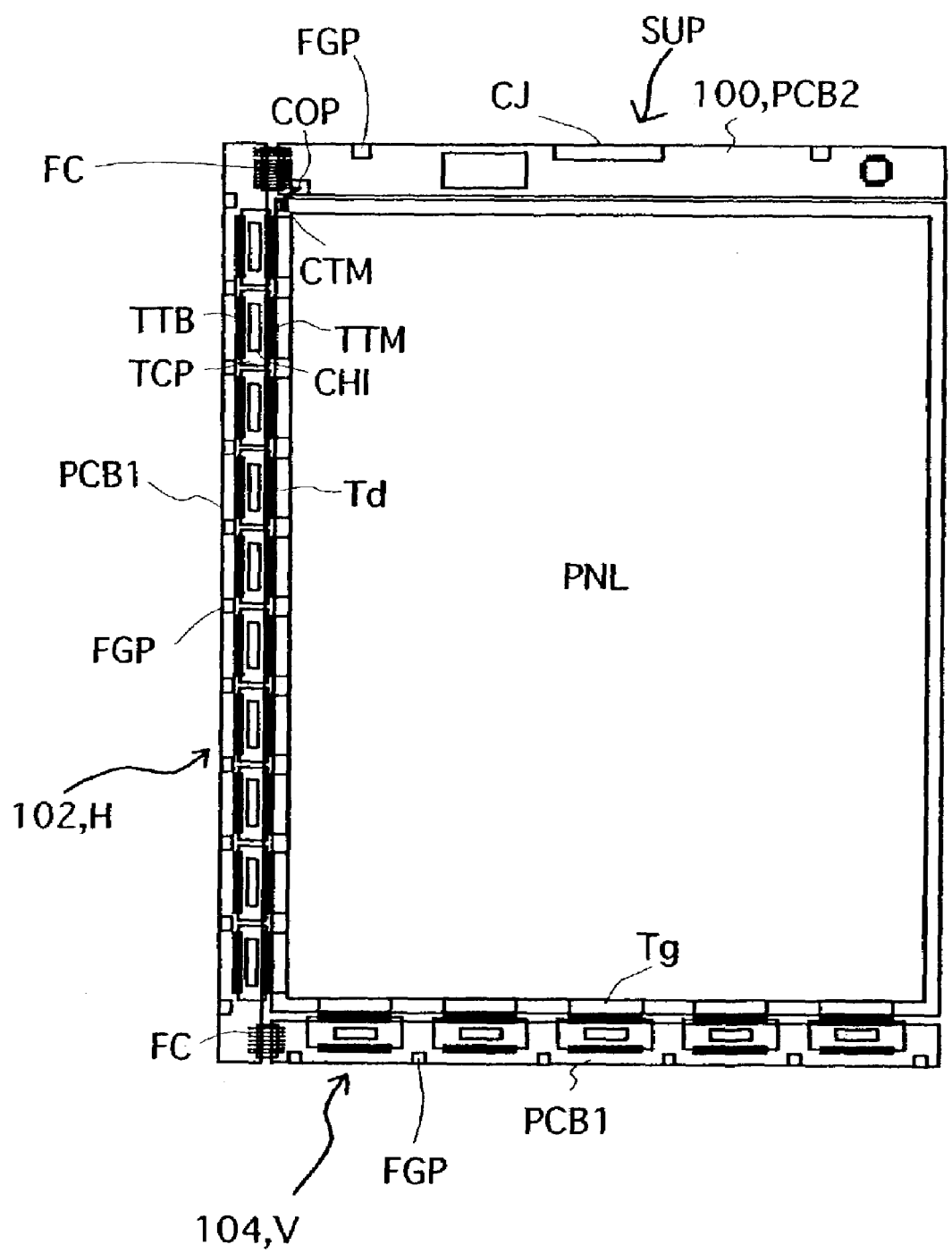
FIG. 41 is a top view showing the state in which peripheral driving circuits are mounted on the liquid crystal panel of each embodiment of the present invention.

FIG. 41 is a top view showing a state in which video-signal driving circuit (H) and vertical scanning circuit (V) are connected to display panel (PNL) shown in FIG. 34 and the like.

In FIG. 41, CHI denotes a driving IC chip for driving display panel (PNL). Five driving IC chips of the vertical scanning circuit side are shown at the bottom of FIG. 41 and ten driving IC chips of the video-signal driving circuit side are shown at the left of FIG. 41.

TCP denotes a tape carrier package on which driving, IC chip (CHI) is mounted by tape automated boding (TAB) and PCB1 denotes a driving circuit substrate with tape carrier package (TCP) and capacitors mounted. PCBL is divided into a video-signal driving circuit portion and a scanning-signal driving circuit portion.

FGP denotes a frame ground pad to which a spring-shaped fragment cut deep into shield case (SHD) is soldered.

FC denotes a flat cable for electrically connecting bottom driving-circuit substrate (PCB1) with left driving-circuit substrate (PCB1).

Flat cable (FC) uses a cable obtained by sandwiching and supporting a plurality of lead wires obtained by plating phosphor bronze wires with tin (Sn)} by striped polyethylene layer and polyvinyl alcohol layer.

<<General Structure of Liquid Crystal Display Module (MDL)>>

Figure 42:
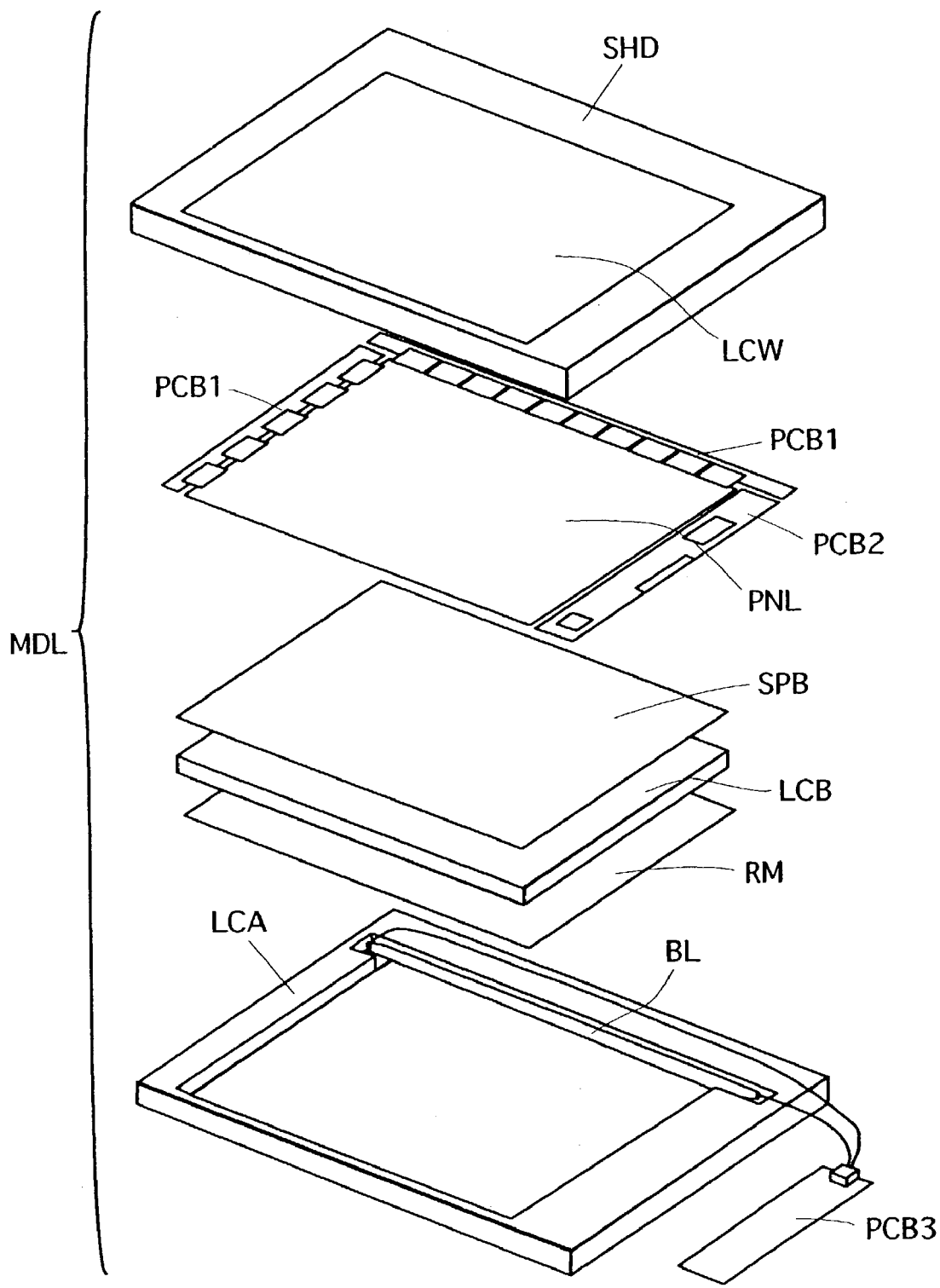
FIG. 42 is an exploded perspective view of a liquid crystal module of the liquid crystal display device of each embodiment of the present invention.

FIG. 42 is an exploded perspective view showing each components of liquid crystal display module (MDL).

SHD denotes a frame-like shield case made of a metallic plate (metal frame), LCW denotes a display window of the case, PNL denotes a liquid crystal display panel, SPB denotes a light diffusing plate, LCB denotes a light guiding body, RM denotes a reflector, BL denotes a backlight fluorescent tube, and LCA denotes a backlight case. Module MDL is fabricated by superposing various members according to the vertical arrangement shown in FIG. 42.

The whole of module (MDL) is secured by pawls and hooks provided for shield case (SHD).

Backlight case (LCA) is formed so as to house backlight fluorescent tube (BL), light diffusing plate (SPB), light guiding body (LCB), and reflector (RM), which changes the light emitted from backlight fluorescent tube (BL) arranged at the side of light guiding body (LCB) to homogeneous backlight on the display surface by light guiding body (LCB), reflector (RM), and light diffusing plate (SPB) and emits the homogeneous backlight toward liquid crystal panel (PNL).

Backlight fluorescent tube (BL) connects with inverter substrate (PCB3) which serves as a power supply of tube (BL).

<<Liquid Crystal Layer and Polarizing Plate>>

Then, a liquid crystal layer, orientation films, and polarizing plates are described below.

<<Liquid Crystal Layer>>

Liquid crystal layer (LCD) uses nematic liquid crystal with a positive dielectric anisotropy $\Delta\epsilon$ of 13.2 and a refractive index anisotropy $\Delta n$ of 0.081 (589 nm, 20° C.).

The thickness (gap) of the liquid crystal layer is set to 3.9 μm and the retardation $\Delta n \times d$ is set to 0.316.

The value of the retardation $\Delta n \times d$ is set so as to be half of the approximately average wavelength of the wavelength characteristic of backlight and so that the color tone of the transmitted light of the liquid crystal layer becomes white © light source, chromaticity coordinates x=0.3101, y=0.3163).

In other words, this value of the retardation $\Delta n \times d$ is set to a so-called first minimum mode of birefringence effect.

When the angle between the polarized-light transmission axis of a polarizing plate and the major-axis direction of liquid crystal molecules is equal to about 45□, the maximum transmittance can be obtained and transmitted light hardly having waveform dependency in a range of visible light can be obtained.

The thickness (gap) of the liquid crystal layer is controlled by polymer beads.

Moreover, as the dielectric anisotropy $\Delta\epsilon$ increases, a driving voltage can be lowered. Furthermore, as the refractive index anisotropy $\Delta n$ decreases, it is possible to increase the thickness (gap) of the liquid crystal layer, shorten the liquid-crystal sealing time, and decrease gap fluctuation.

<<Orientation Film>>

Orientation films (ORI1, ORI2) are made from polyimide.

In the case of rubbing method, rubbing directions of orientation films determine initial orientation directions (RDR) of liquid crystal molecules (LC) at both surfaces of a liquid crystal layer.

In embodiment 1 of the present invention, orientation films (ORI1, ORI2) are rubbed in parallel or anti-parallel directions with each other.

Moreover, in the embodiment 1, orientation films (ORI1, ORI2) are rubbed in parallel with video signal lines (DL) or vertical to scanning signal lines (GL), as shown in FIG. 1.

There are two kinds of initial arrangements of liquid crystal molecules between orientation films (ORI1, ORI2) when no voltage is applied between the electrodes (PX) and (CX).

The first kind of initial arrangement is formed by rubbing orientation films (ORI1, ORI2) in the same (parallel) directions so that tilt angles are distributed in such a form that liquid crystal molecules around the center of the liquid layer have almost zero tilt angles, while liquid crystal molecules at the near surface of the liquid crystal layer have a tilt angle almost equal to a pretilt angle.

This arrangement of molecules is called a splay state, and is suitable to attain wide viewing characteristics because the molecules near the top and bottom surfaces of the liquid crystal layer work to compensate their optical characteristics each other.

The second kind of initial arrangement is formed by rubbing orientation films (ORI1, ORI2) in the anti-parallel directions, that means a rubbing direction of bottom orientation film (ORI1) is opposite to a rubbing direction of top orientation film (ORI2), so that tilt angles are distributed, in such a form that almost all liquid crystal molecules between orientation films (ORI1, ORI2) are tilted in parallel by an angle almost equal to a pretilt angle.

The second arrangement of molecules is called a parallel state.

In this specification, if not specified, the first initial arrangement a splay state is formed as an initial state, but the second initial arrangement (a parallel state) is also applicable to the present invention.

Especially, for embodiment 6 described later, a parallel state is more suitable to create two driving directions easily and uniformly.

<<Direction (EDR) of Applied Electric Field>>

In this specification, a direction (EDR) of an applied electric field is defined as the direction of a component parallel with the surfaces of a liquid crystal layer between a pixel electrode (PX) and a counter electrode (CX) of an applied electric field in a gap between a pixel electrode (PX) and a counter electrode (CX).

In the case of line or stripe electrodes, the direction (EDR) is the direction perpendicular to the extended directions of the electrodes (PX) and (CX).

<<Initial Orientation Angle φLC>>

In this specification, an initial orientation direction RDR is defined as the direction parallel with a surface of a liquid crystal layer between a pixel electrode (PX) and a counter electrode (CX), of an initial direction of major axes of liquid crystal molecules at the surface of the liquid crystal layer.

More specifically, an initial orientation direction RDR is defined as a rubbing direction or an opposite direction of the rubbing direction.

Figure 29:
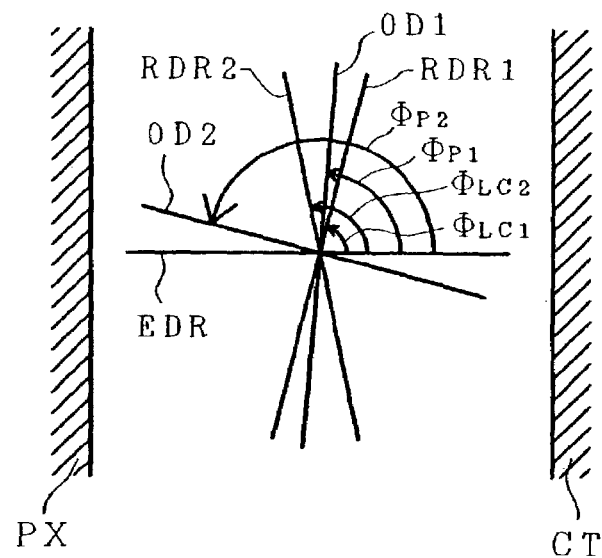
FIG. 29 is an illustration showing the relation between the directions (EDR) of the applied electric field, initial orientation directions (RDR1 and RDR2), and polarized-light transmission axes (OD1 and OD2).

And, in this specification, an initial orientation angle φLC is defined as the angle of an initial orientation direction RDR from a direction (EDR) of an applied electric field, is positive when an initial orientation direction RDR rotates counter-clockwise from the direction (EDR) of an applied electric field, and is defined in the range of 0°≦LC<180° as shown in FIG. 29.

<<Initial Twist Angle>>

In each embodiments of the present invention, the initial orientation angles φLC-b on a bottom orientation film ORI1 side and φLC-t on a top orientation film ORI2 side are set to almost the same value so that liquid crystal molecules are free from twisting when no voltage is applied between the electrodes (PX) and (CX).

For convenience sake, φLC means the same angles of φLC-b and φLC-t, and φLC is only shown in the figures.

However, a twist angle within 5 degrees of zero degrees, or |φLC−φLC-t|≦5°, is also applied to each embodiment of this invention in order to shift a driving voltage range to a more suitable range, or to improve contrast of a image in a fixed driving voltage range.

<<Polarizing Plate>>

FIGS. 2A to 2D are illustrations showing the directions of the applied electric field of the liquid crystal display device of the embodiment 1 of the present invention, the directions of polarized-light transmission axes (OD1 and OD2) of polarizing plates (POLL and POL2), and driving directions of liquid crystal molecules (LC).

Figure 2A:
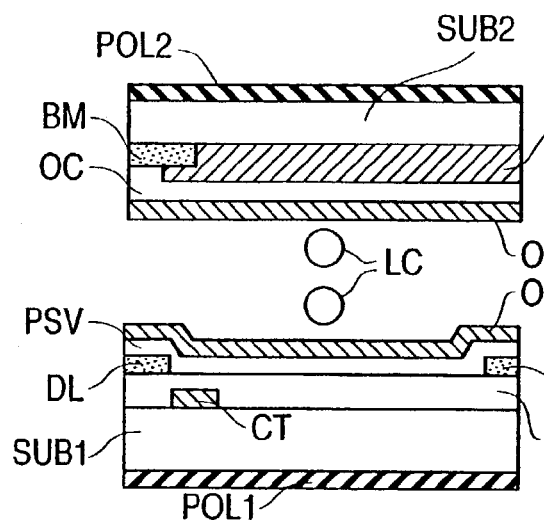
FIGS. 2A to 2D are illustrations showing the directions (EDR) of applied electric field, the initial orientation direction (RDR), transmission axes directions (OD1 and OD2) of polarizing plates (POLL and POL2), and driving directions of liquid crystal molecules (LC) of the liquid crystal display device of embodiment 1 of the present invention.
Figure 2B:
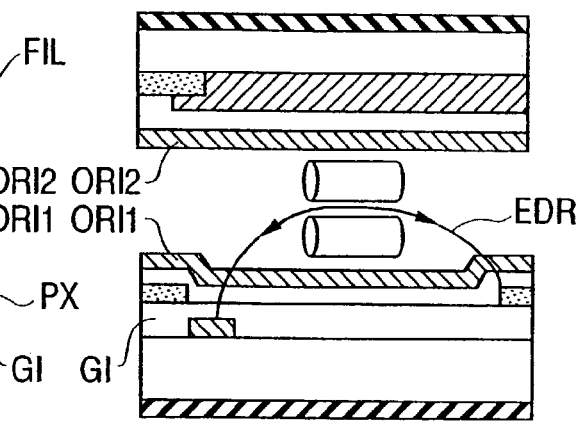
Figure 2C:
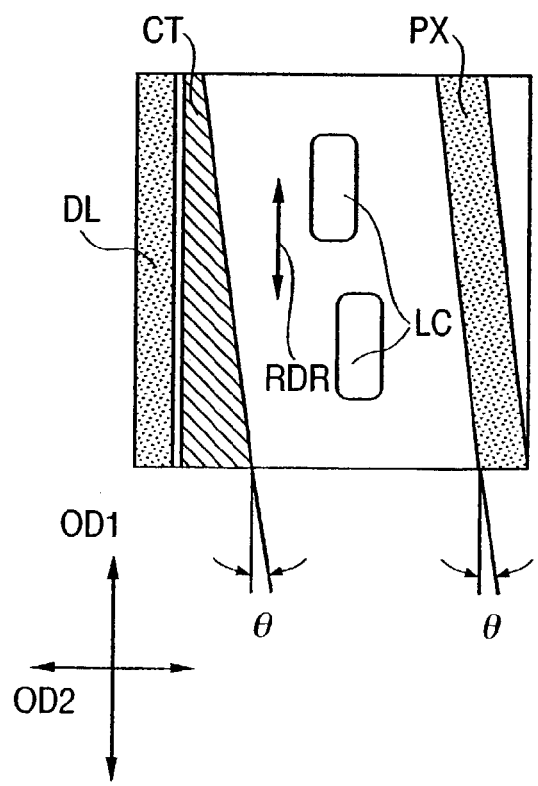

As shown in FIG. 2C, the polarized-light transmission axis (ODI) of bottom polarizing plate (POL1) and polarized-light transmission axis (OD2) of polarizing plate (POL2) are perpendicular to each other and the direction of either polarized-light transmission axis (OD1) or (OD2) is made parallel with initial orientation direction (RDR) of liquid crystal layer.

Thereby, the embodiment 1 of the present invention makes it possible to obtain the characteristic of the normally black mode.

Also, the normally white mode in which the transmittance decreases as the voltage applied to a picture element increases can be obtained by making the directions of polarized-light transmission axis (OD1) and polarized-light transmission axis (OD2) parallel with the initial orientation direction (RDR).

As shown in FIG. 1, in the case of the embodiment 1 of the present invention, the facing sides of a pixel electrode (PX) and two counter electrodes (CT) are tilted from initial orientation direction (RDR) so as to be tilted by a tilt angle of θ (or −θ).

For each embodiment in this specification, a tilt angle of θ is defined as a tilt angle of a facing side from initial orientation direction (RDR), and is positive when a facing side is tilted counter-clockwise from initial orientation direction (RDR).

Figure 2D:
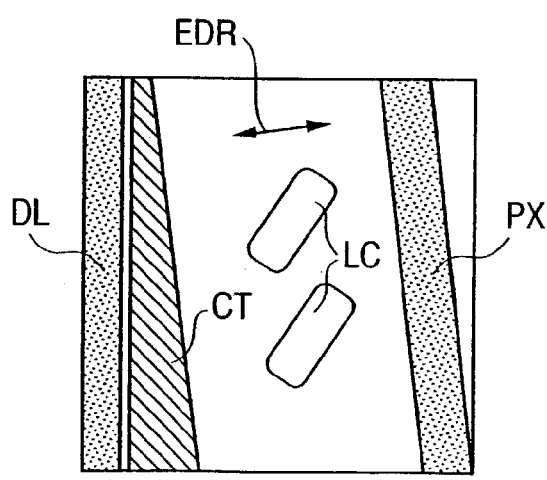

Thereby, the initial orientation angle φLC is set to 90° −θ so that the driving direction of liquid crystal molecules (LC) in the liquid crystal driving region, which is a region formed between a counter electrode (CT) and a pixel electrode (PX), is determined as a clockwise rotation as shown in FIG. 2D.

The embodiment of the present invention makes it possible to decrease a driving voltage and increase a response speed by arranging the driving (reorientation) directions of liquid crystal molecules to a single reorientation direction in the liquid crystal driving region.

Figure 3:
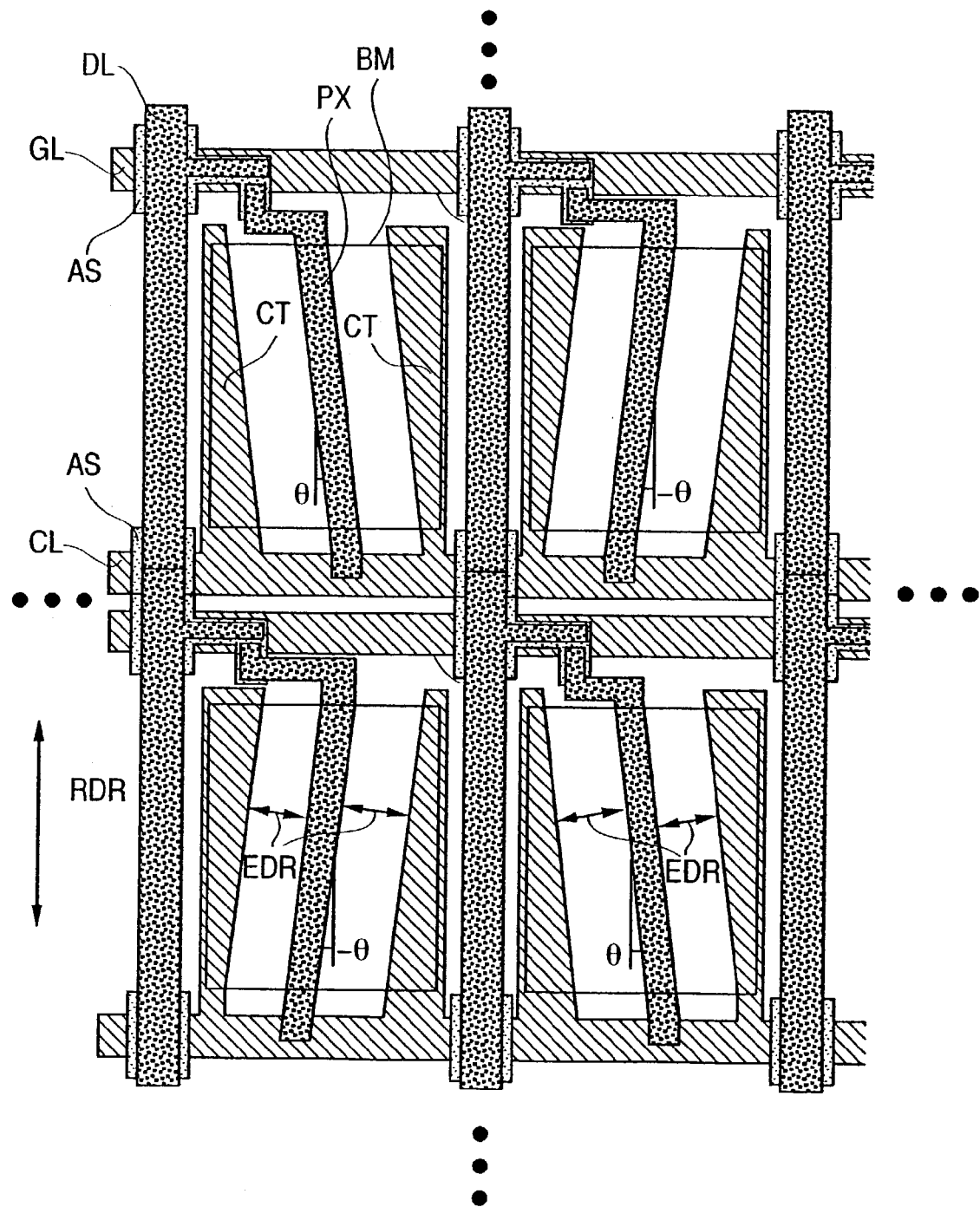
FIG. 3 is an illustration showing an example of arranging the picture element shown in FIG. 1 or a similar picture element into a matrix.

FIG. 3. is an illustration showing an example of arranging the picture element shown in FIG. 1 or similar picture element into a matrix.

The embodiment 1 of the present invention makes it possible to vary the driving direction of liquid crystal molecules (LC) to clockwise or to counter-clockwise rotation by forming picture elements including counter electrodes (CT) and pixel electrodes (PX) whose facing sides have a tilt angle of θ or −θ to initial orientation direction (RDR) and arranging them into a matrix as shown in FIG. 3.

Thereby, the embodiment 1 of the present invention makes it possible to compensate the heterogeneity of white color tone due to a viewing angle caused by a unified driving direction in homogeneously-oriented liquid crystal layer (LCD), improve the display quality, and obtain a high-quality display image.

It is most suitable to set a tilt angle θ between 10° and 20° to compensate optical characteristics in the major axis and in the minor axis.

FIG. 3 shows an example of alternately arranging picture elements including counter electrodes (CT) and pixel electrodes (PX) whose facing sides have a tilt angle of θ or −θ to initial orientation direction (RDR), which is parallel with video signal line (DL) or vertical to scanning signal line (GL).

Because the driving direction of liquid crystal molecules (LC) differs in adjacent picture elements, it is possible to improve the optical compensation effect for the heterogeneity of white color tone due to a viewing angle.

Figure 30:
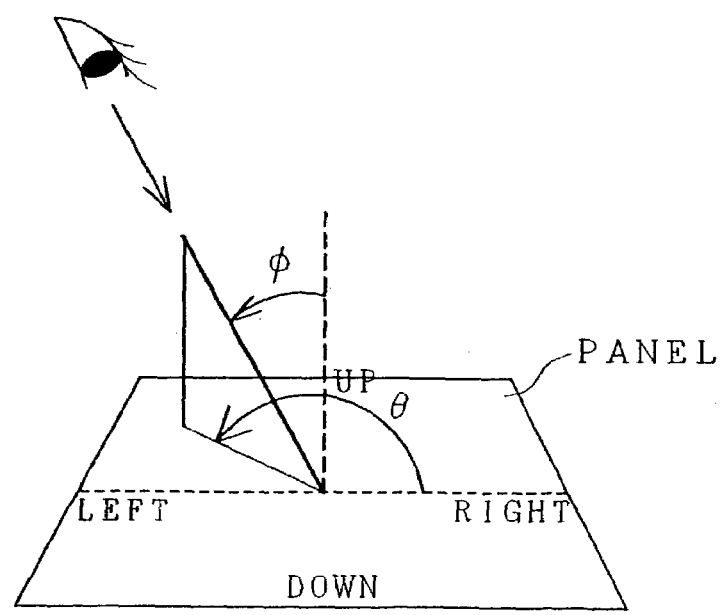
FIG. 30 is an illustration showing the definition of the viewing angle ($\theta$, $\phi$) of each embodiment of the present invention.

The embodiment 1 of the present invention makes it possible to completely homogenize the white color tone in a range up to 50° of φ in every direction of θ in the viewing angle (θ, φ) defined in FIG. 30.

Embodiment 2

Figure 4:
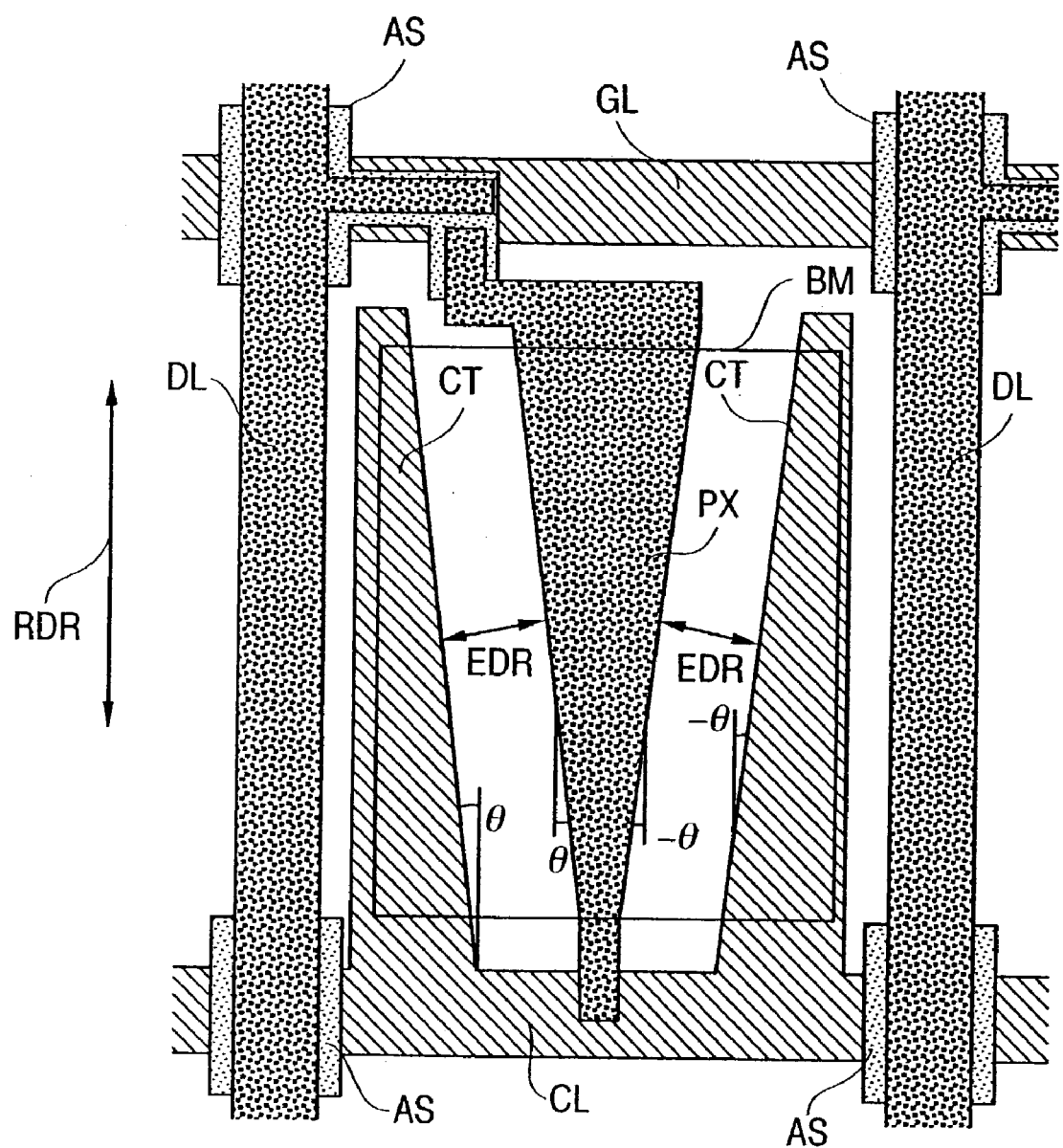
FIG. 4 is a top view showing one picture element and its neighborhood of the active-matrix color liquid crystal display device of embodiment 2 of the present invention.

FIG. 4 is a top view showing one picture element and its neighborhood of the active-matrix color liquid crystal display device of embodiment 2 of the present invention.

Figure 5A:
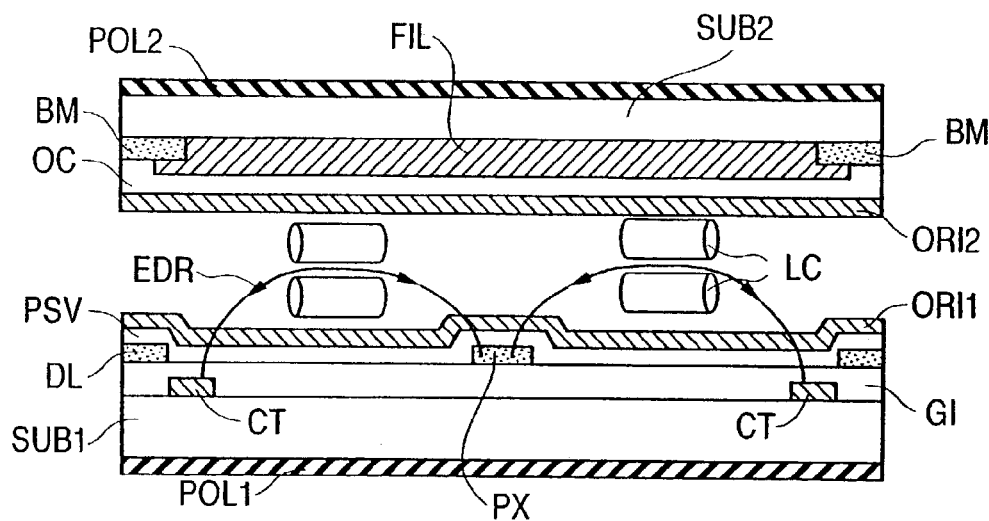
FIGS. 5A and 5B are illustrations showing the directions (EDR) of applied electric field, the initial orientation direction (RDR), transmission axes directions (OD1 and OD2) of polarizing plates (POLL and POL2), and driving directions of liquid crystal molecules (LC) of the liquid crystal display device which is embodiment 2 of the present invention.
Figure 5B:
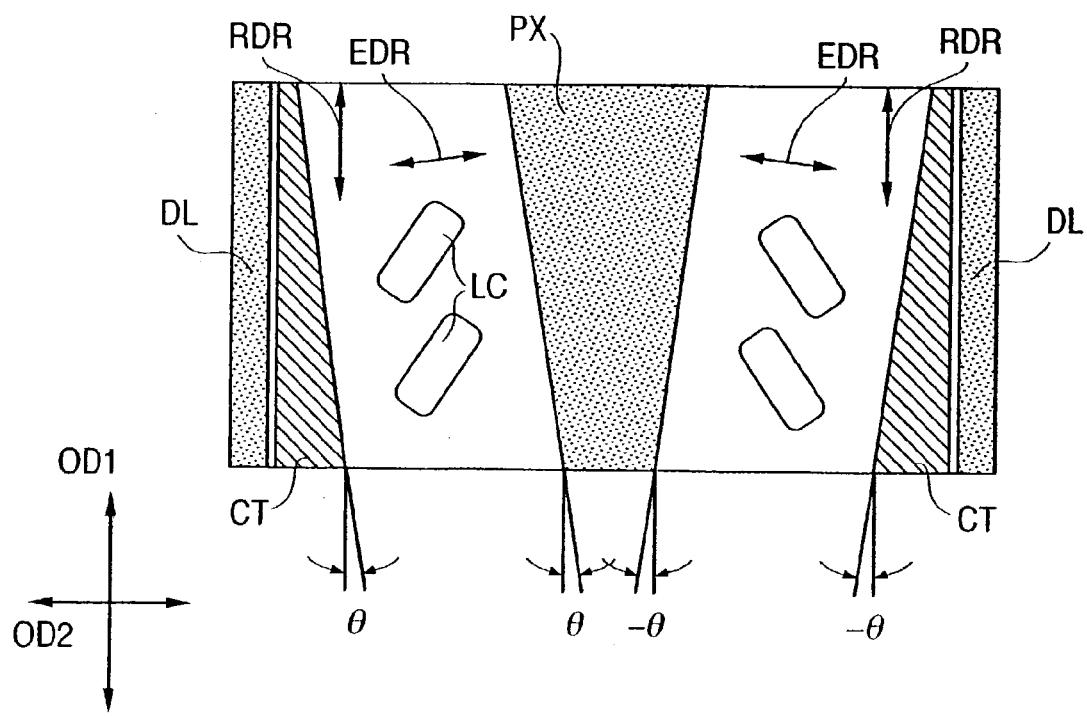

FIGS. 5A and 5B are illustrations showing the directions (EDR) of applied electric fields, the directions of polarized-light transmission axes (OD1 and OD2) of polarizing plates (POL1 and POL2), and driving directions of liquid crystal molecules (LC) in the liquid crystal display device of the embodiment 2 of the present invention. The structure of the embodiment 2 of the present invention is the same as that of embodiment 1 of the present invention except the shapes of a pixel electrode (PX) and two counter electrodes (CT).

In the case of the embodiment 2 of the present invention, as shown in FIG. 4, a pixel electrode (PX) forms an approximately triangular shape extending diagonally downward, two counter electrodes (CT) protruding upward from a counter voltage signal line (CL) form a comb tooth shape extending diagonally upward, and the region between a pixel electrode (PX) and two counter electrodes (CT) is divided into two parts in one picture element. In the case of the embodiment 2 of the present invention, rubbing directions of liquid crystal molecules (LC) at top and bottom orientation films sides are parallel each other and also parallel with video signal lines (DL) or vertical to scanning signal lines (GL) as shown in FIG. 4.

Moreover, in the case of the embodiment 2 of the present invention, the facing sides of pixel electrodes (PX) and counter electrodes (CT) are tilted as shown in FIG. 4 so that they are tilted by an angle of θ for one pair of facing sides and −θ for the other pair of facing sides in one picture element.

Thereby, the initial orientation angles φLC are set to 90°−θ and 90°+θ in one picture element so that the driving directions of liquid crystal molecules (LC) are fixed to a clockwise rotation and a counter-clockwise rotation, respectively, as shown in FIG. 5B.

Therefore, the embodiment 2 of the present invention makes it possible to use two driving directions of liquid crystal molecules (LC) in one picture element so that this embodiment is possible to further improve the compensation effect for the heterogeneity of white color tone due to a viewing angle.

Further, it is desirable to set a tilt angle θ between 10° and 20° to compensate optical characteristics more effectively.

Figure 6:
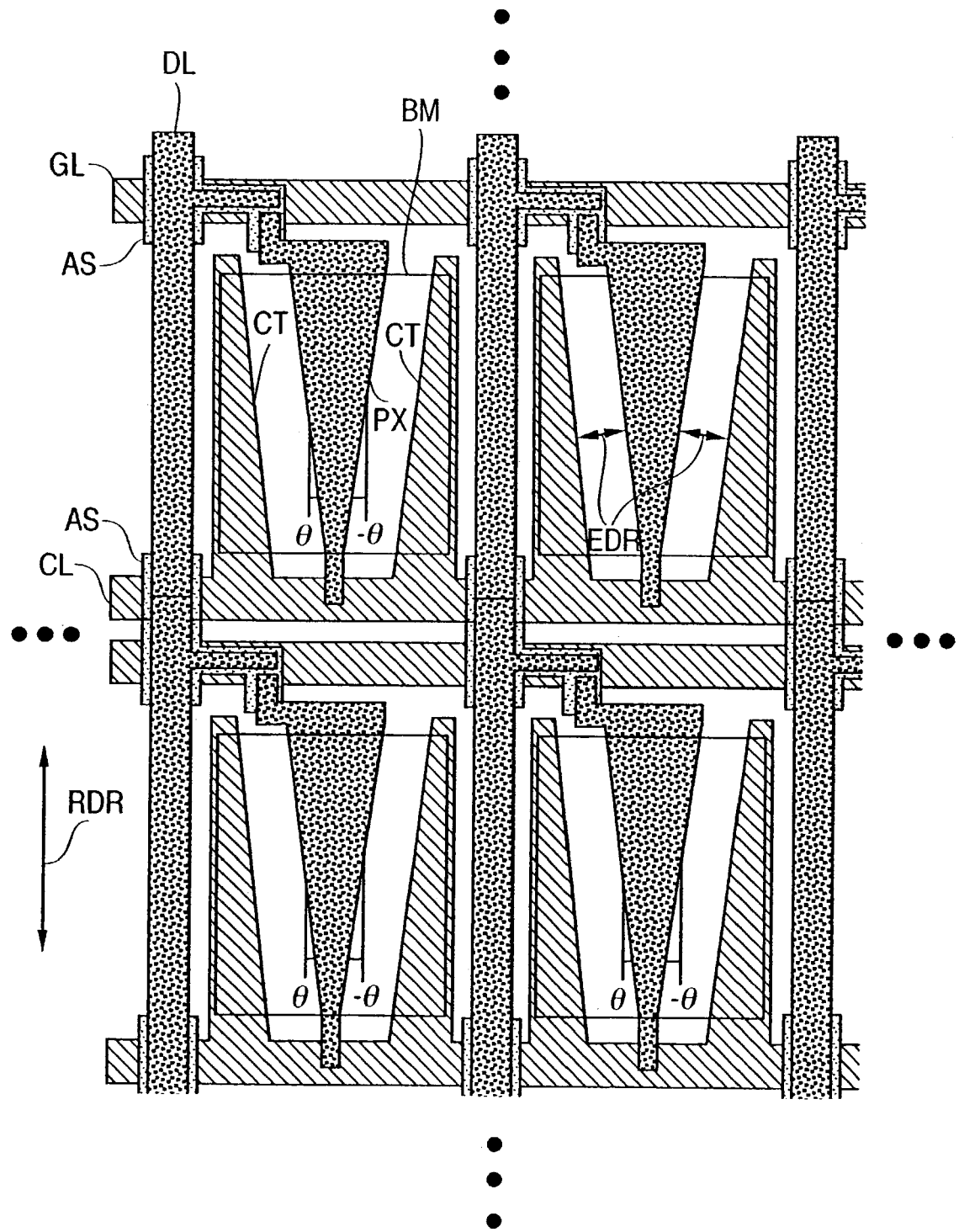
FIG. 6 is an illustration showing an example of arranging the picture element shown in FIG. 4 or a similar picture element into a matrix.

The arrangement shown in FIG. 6 is an example of arranging the picture element shown in FIG. 4 into a matrix.

Embodiment 3

Figure 7:
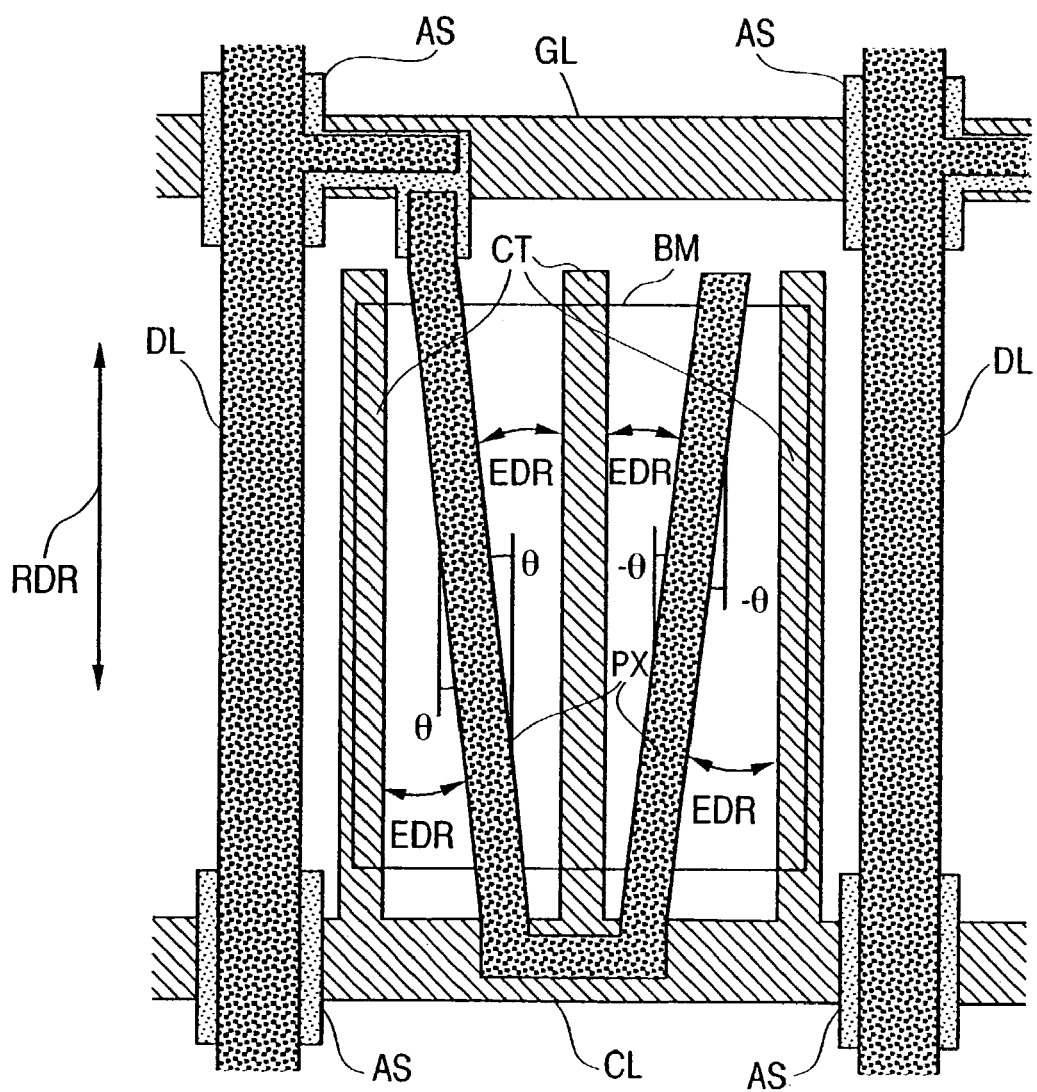
FIG. 7 is a top view showing one picture element and its neighborhood of the active-matrix color liquid crystal display device which is embodiment 3 of the present invention.

FIG. 7 is a top view showing one picture element and its neighborhood of the active-matrix color liquid crystal display device of embodiment 3 of the present invention.

Figure 8A:
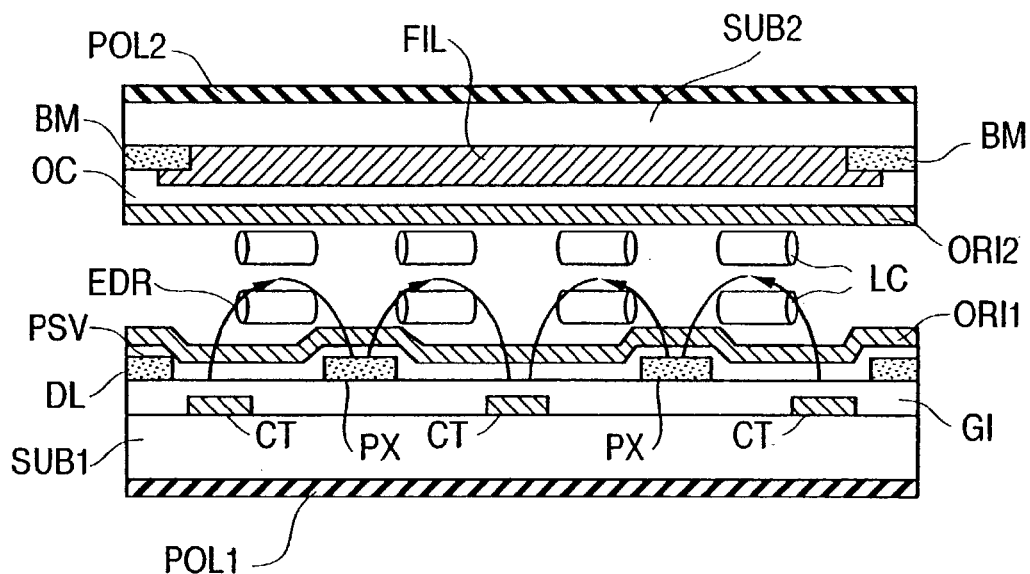
FIGS. 8A and 8B are illustrations showing the directions (EDR) of applied electric field, the initial orientation direction (RDR), transmission axes directions (OD1 and OD2) of polarizing plates (POL1 and POL2), and driving directions of liquid crystal molecules (LC) of the liquid crystal display device of embodiment 3 of the present invention.
Figure 8B:
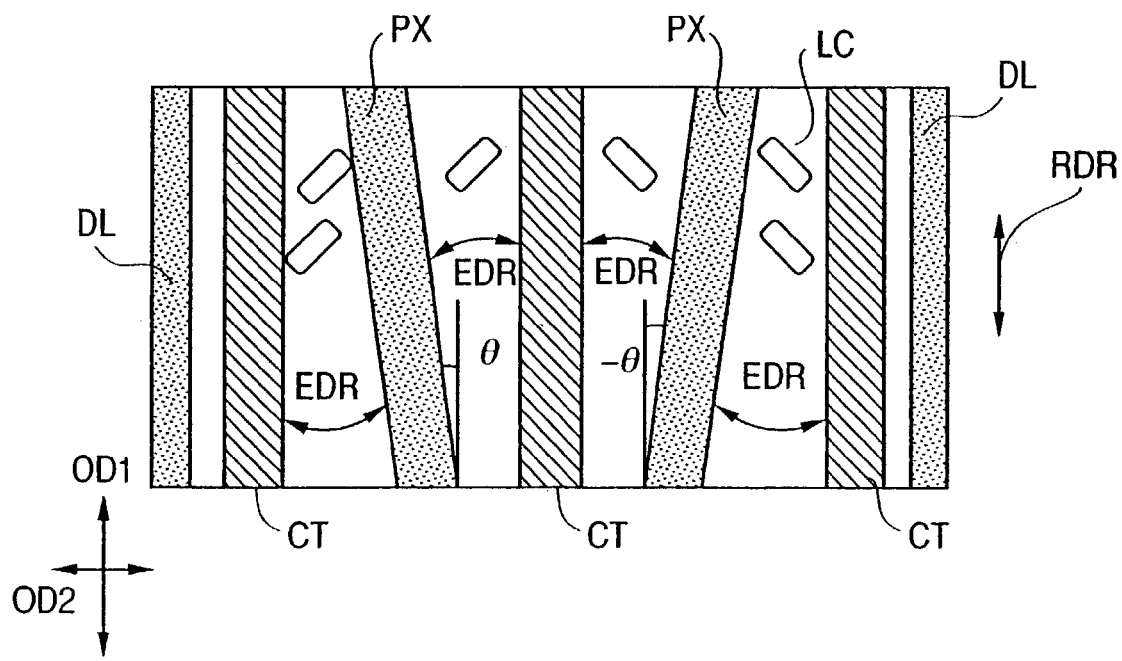

FIGS. 8A and 8B are illustrations showing the directions (EDR) of applied electric field, the directions of polarized-light transmission axes (OD1 and OD2) of polarizing plates (POL1 and POL2), and driving directions of liquid crystal molecules (LC).

The structure of the embodiment 3 of the present invention is the same as that of embodiment 1 of the present invention except the shapes of two pixel electrodes (PX) and three counter electrodes (CT).

In the case of the embodiment 3 of the present invention, as shown in FIG. 7, two pixel electrode (PX) are tilted inside an opening region of light shielding film (BM) of one picture element and formed into a V shape, three counter electrodes (CT) form a comb tooth shape protruding upward from a counter voltage signal line (CL), and the region between two pixel electrodes (PX) and three counter electrodes (CT) is divided into four parts in one picture element.

In the case of the embodiment 3 of the present invention, the rubbing directions of the orientation films, that is, initial orientation directions (RDR) are parallel each other at top and bottom surfaces of the liquid crystal layer and moreover parallel with video signal lines (DL) or vertical to scanning signal lines (GL), as shown in FIG. 7.

Moreover, three counter electrodes (CT) are parallel with initial orientation direction (RDR) and two pixel electrodes (PX) are tilted to form a zigzag shape so that each pixel electrode (PX) is tilted by an angle of θ or −θ from initial orientation direction (RDR).

Thereby, the initial orientation angles φLC near facing sides of pixel electrodes (PX) are set to 90°−θ and 90°+θ, in one picture element so that the driving directions of liquid crystal molecules (LC) are fixed to a clockwise rotation and a counter-clockwise rotation, respectively, as shown in FIG. 8B.

Therefore, the embodiment 3 of the present invention makes it possible to use two driving direction of liquid crystal molecules (LC) in one picture element.

Further, it is desirable to set tilt angle θ between 10° and 20° to compensate optical characteristics more effectively.

Figure 9:
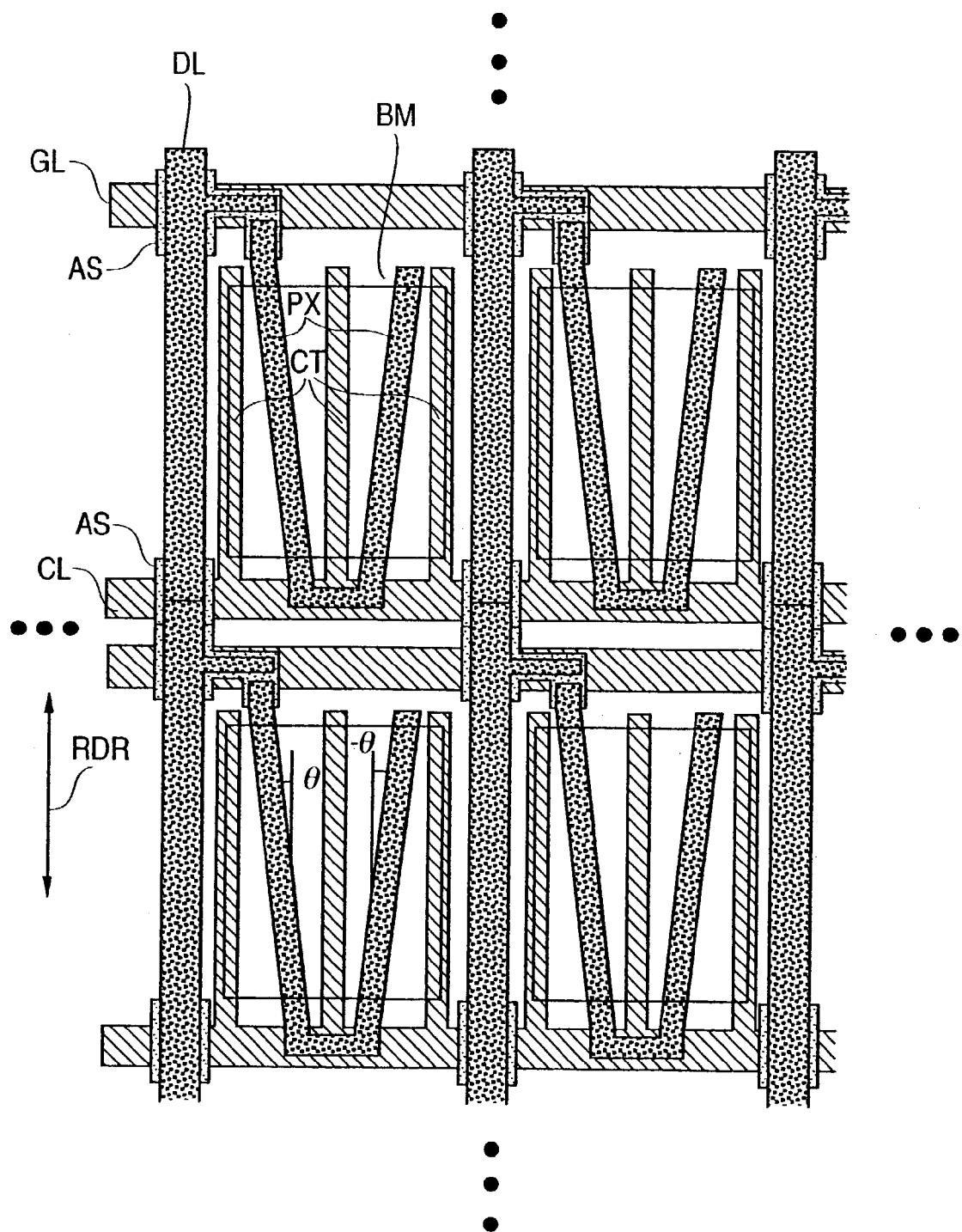
FIG. 9 is an illustration showing an example of arranging the picture element shown in FIG. 7 and a similar picture element into a matrix.
Figure 10:
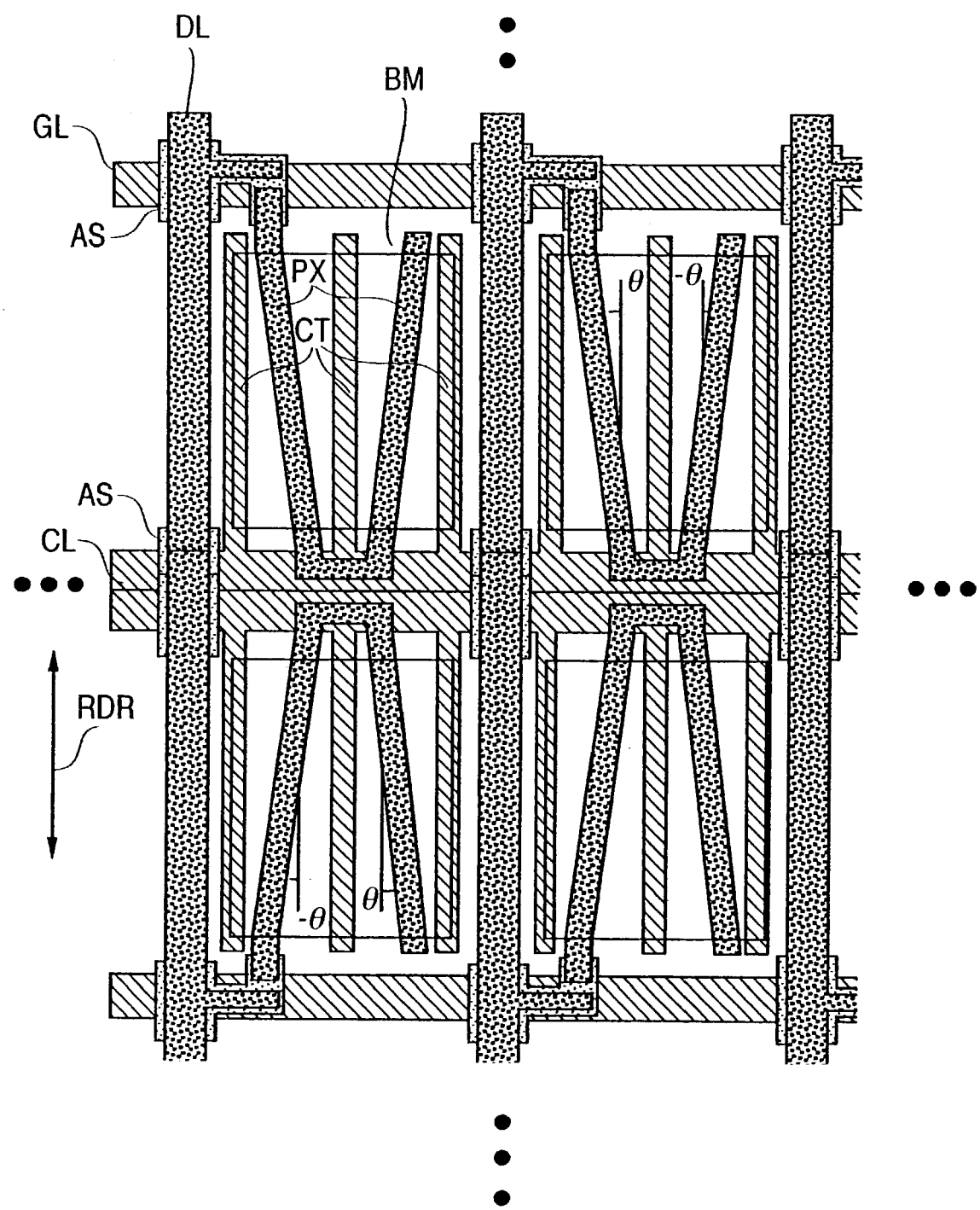
FIG. 10 is an illustration showing an example of arranging the picture element shown in FIG. 7 and a similar picture element into a matrix.

FIGS. 9 and 10 are illustrations showing examples of arranging the picture element shown in FIG. 7 into a matrix.

FIG. 9 shows an example of arranging the picture element shown in FIG. 7 into a matrix and FIG. 10 shows an example of alternately arranging the picture element shown in FIG. 7 and a picture element symmetric to the picture element in FIG. 7 for the direction of scanning signal line (GL) into a matrix in the direction parallel with video signal line (DL) while sharing counter voltage signal line (CL) by two picture elements.

In the case of the arrangement shown in FIG. 10, it is possible to further improve the heterogeneity due to the viewing angle of white color tone because the driving direction of liquid crystal molecules (LC) differs not only in one picture element but also in adjacent picture elements along video signal line.

Moreover, it is possible to increase the display region per picture element compared with the cases of the above embodiments 1 and 2 of the present invention and display a brighter image with lower power consumption.

Embodiment 4

Figure 11:
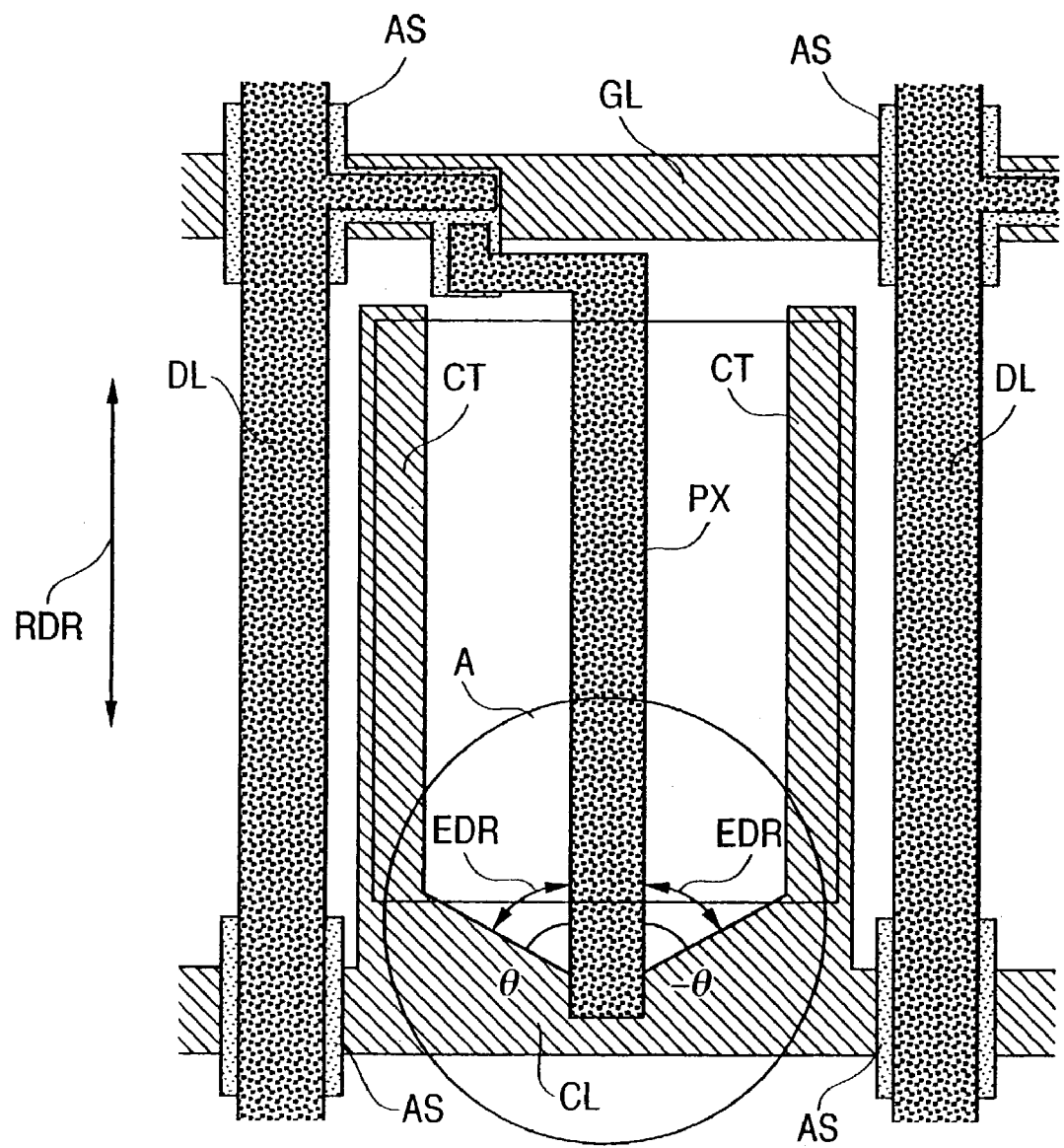
FIG. 11 is a top view showing one picture element and its neighborhood of the active-matrix color liquid crystal display device which is embodiment 4 of the present invention.

FIG. 11 is a top view showing one picture element and its neighborhood of the active-matrix color liquid crystal display device of embodiment 4 of the present invention.

Figure 12A:
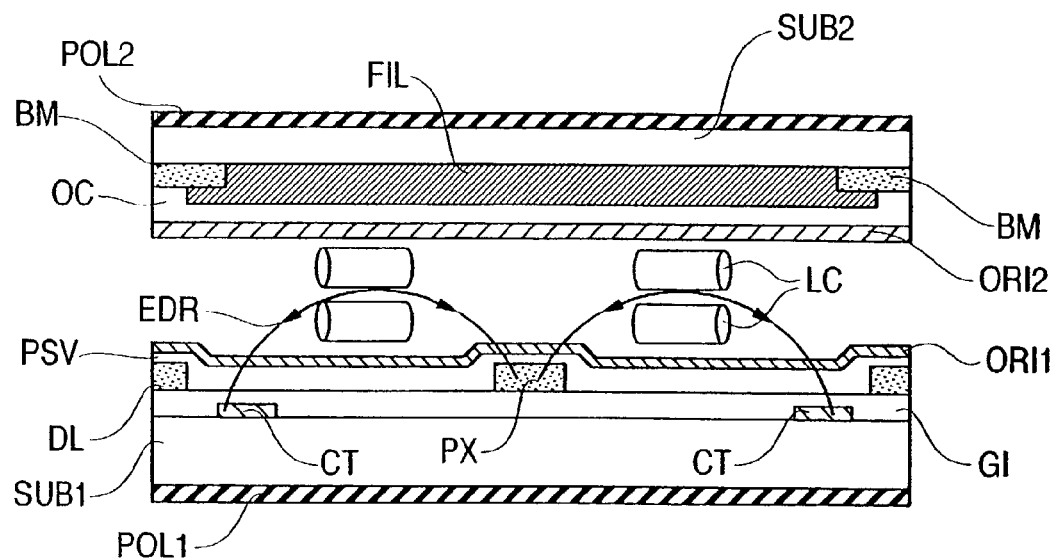
FIGS. 12A and 12B are illustrations showing the directions (EDR) of applied electric field, the initial orientation direction (RDR), transmission axes directions (OD1 and OD2) of polarizing plates (POLL and POL2), and driving directions of liquid crystal molecules (LC) of the liquid crystal display device of embodiment 4 of the present invention.
Figure 12B:
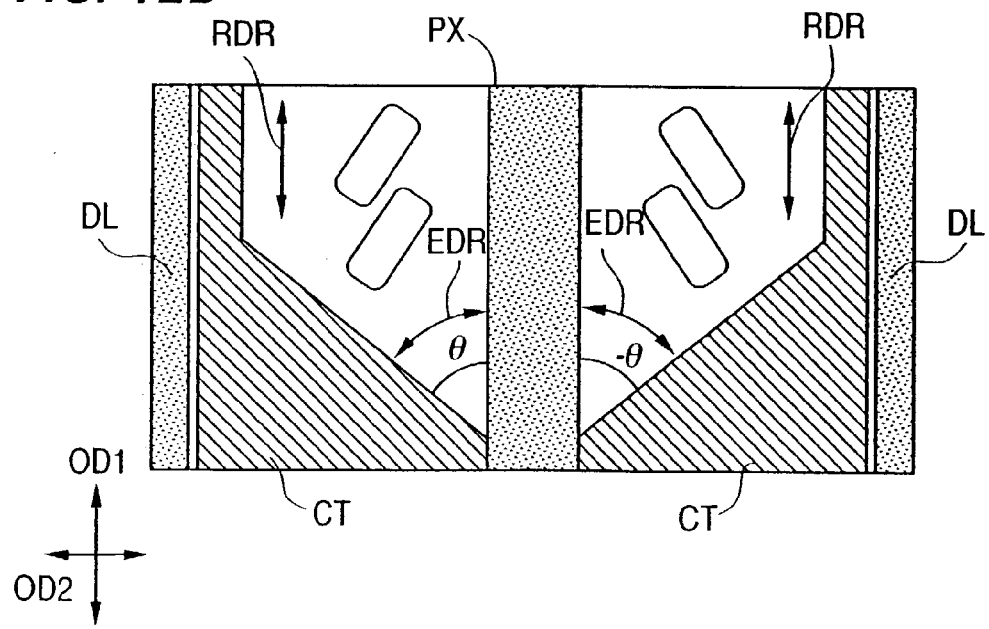

FIGS. 12A and 12B are the directions of the applied electric field, the directions of polarized-light transmission axes (OD1 and OD2), and driving directions of liquid crystal molecules (LC) in the liquid crystal display device of the embodiment 4 of the present invention.

The structure of the embodiment 4 of the present invention is the same as that of embodiment 1 of the present invention except the shapes of a pixel electrode (PX) and two counter electrodes (CT).

In the case of the embodiment 4 of the present invention, as shown in FIG. 11, a pixel electrode (PX) extends straight downward, two counter electrodes (CT) form a comb tooth shape which protrudes upward from a counter voltage signal line (CL) and the region between a pixel electrode (PX) and two counter electrodes (CT) is divided into two parts in one picture element.

Moreover, in the case of the embodiment 4 of the present invention, as shown in portion A in FIG. 11, each of two counter electrodes (CT) inside the portion A is tapered.

Thereby, a counter electrode (CT) and a pixel electrode (PX) are intersected each other at an angle of θ or −θ through an insulating film (GI).

The distance between a counter electrode (CT) and a pixel electrode (PX) is narrowed at the intersecting portion and the strongest electric field is applied to the tapered region.

Therefore, when a voltage is applied between the electrodes (PX) and (CX), liquid crystal molecules (LC) of liquid crystal layer (LCD) at the intersecting portion are first driven.

Thereby, liquid crystal molecules (LC) in the liquid crystal driving region between a counter electrode (CT) and a pixel electrode (PX) in the image display region are influenced by the initial driving direction of liquid crystal molecules (LC) at the intersection portion and driven in the same direction as liquid crystal molecules (LC) at the intersecting portion.

Therefore, in the case of the embodiment 4 of the present invention, the driving direction of liquid crystal molecules (LC) is determined by the intersecting angle.

That is, in the embodiment 4 of the present invention, two intersecting angles formed between two counter electrode (CT) and a pixel electrode (PX) are set to θ and −θ, as shown in FIG. 12B.

Therefore, the embodiment 4 of the present invention also makes it possible to use two driving direction of liquid crystal molecules (LC) in one picture element.

Though it is possible to set angle θ greater than zero degrees but smaller than 90 degrees, it is most preferable to set the angle θ between 30° and 60°.

Figure 13:
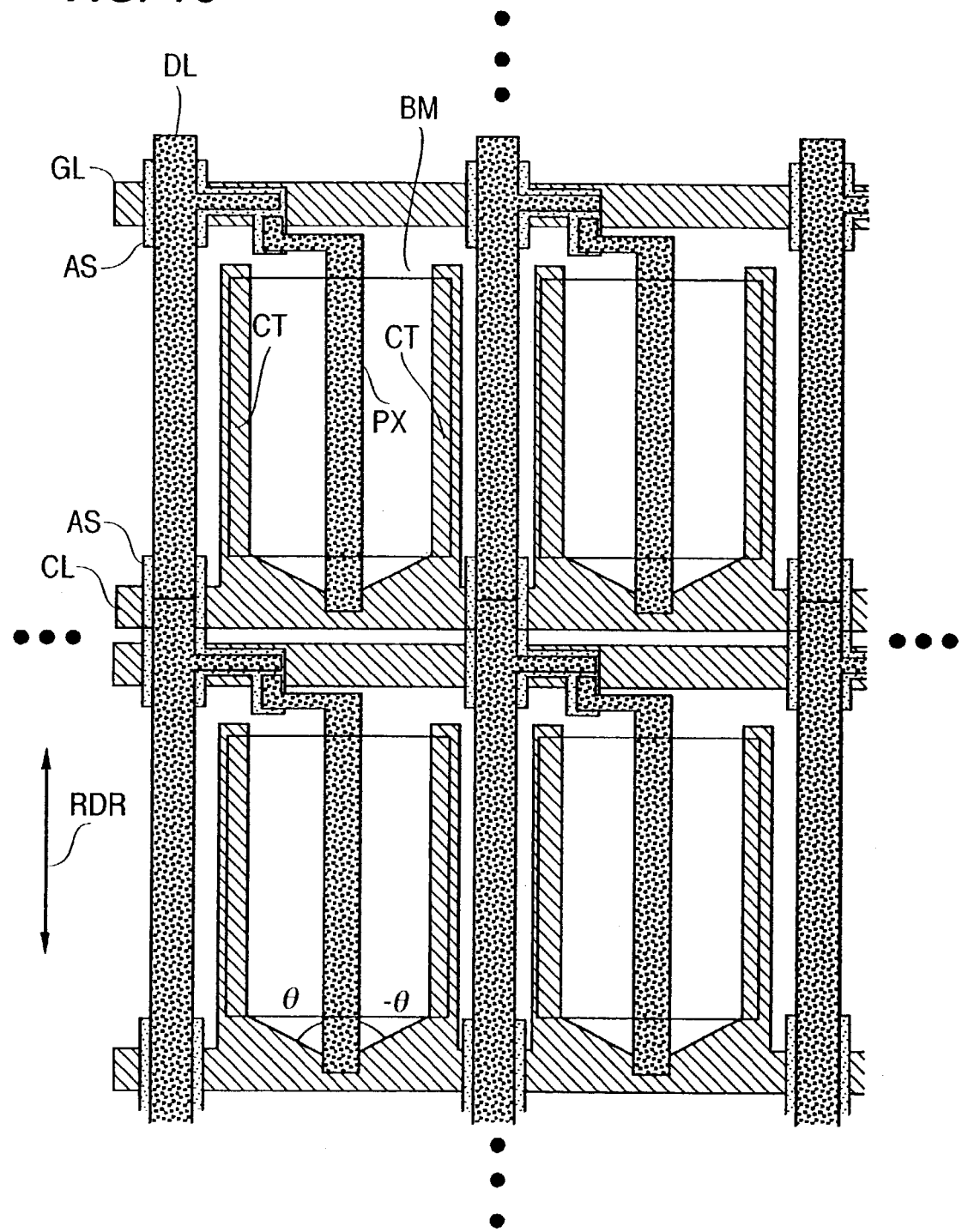
FIG. 13 is an illustration showing an example of arranging the picture element shown in FIG. 7 or a similar picture element into a matrix.

FIG. 13 is an illustration showing a case of arranging the picture element in FIG. 11 into a matrix.

Moreover, in the case of the embodiment 4 of the present invention, a pixel electrode (PX) and two counter electrodes (CT) are formed in parallel with the rubbing directions of orientation films (ORI1, ORI2).

Therefore, when rubbing the orientation films, it is possible to smoothly apply a buffing cloth to the sides of each electrode in a picture element display region so that the orientation of liquid crystal molecules at the sides of the electrode can be improved to prevent domains from appearing.

Embodiment 5

Figure 14:
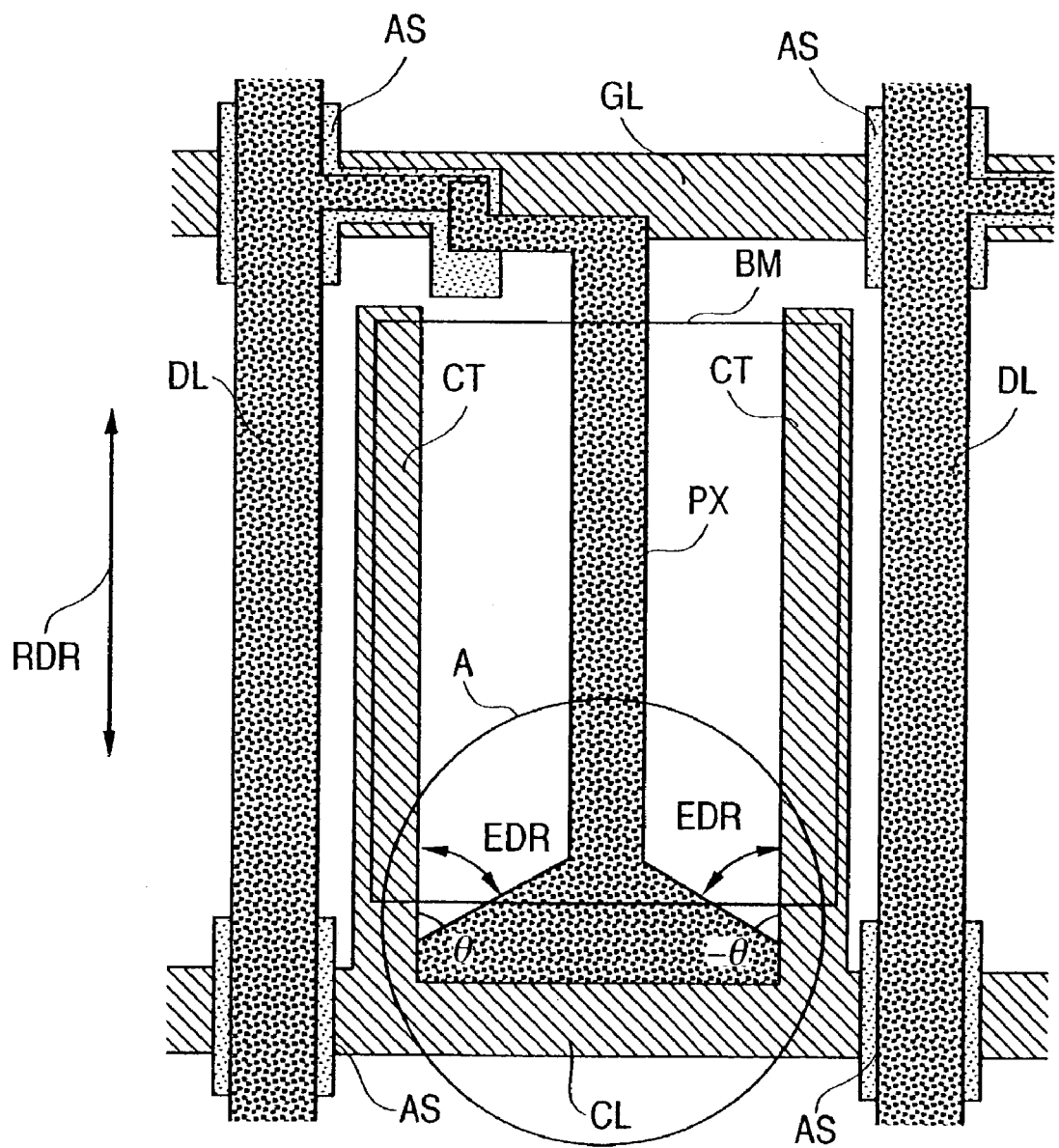
FIG. 14 is an illustration showing one picture element and its neighborhood of the active-matrix color liquid crystal display device which is embodiment 5 of the present invention.

FIG. 14 is a top view showing one picture element and its neighborhood of the active-matrix liquid crystal display device of embodiment 5 of the present invention.

Figure 15A:
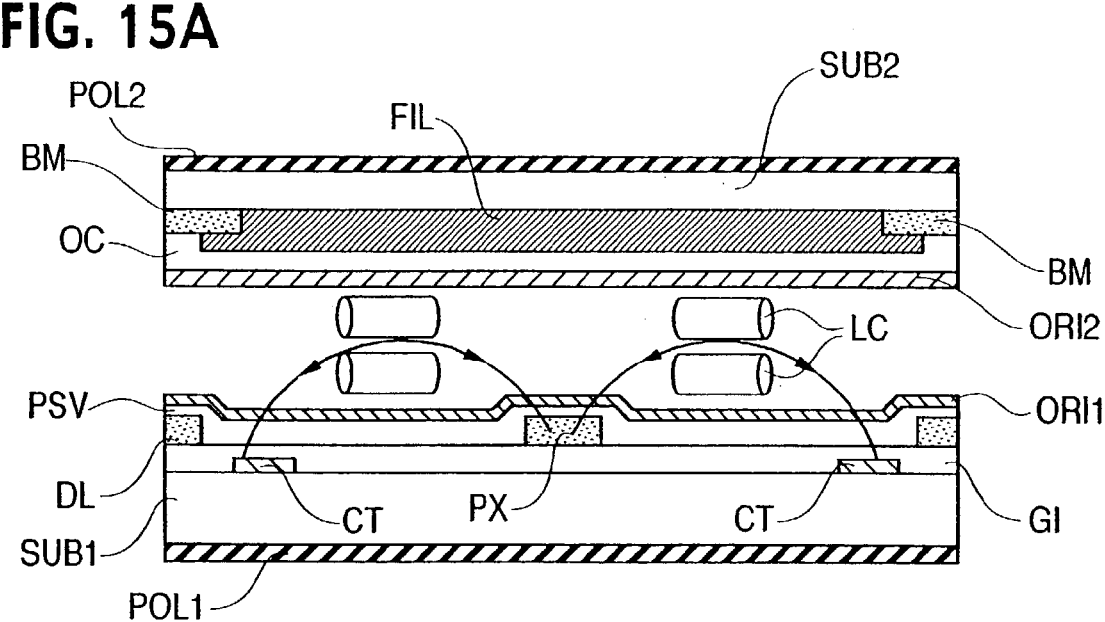
FIGS. 15A and 15B are illustrations showing the directions (EDR) of applied electric field, the initial orientation direction (RDR), transmission axes directions (OD1 and OD2) of polarizing plates (POL1 and POL2), and driving directions of liquid crystal molecules (LC) of the liquid crystal display device of embodiment 5 of the present invention.
Figure 15B:
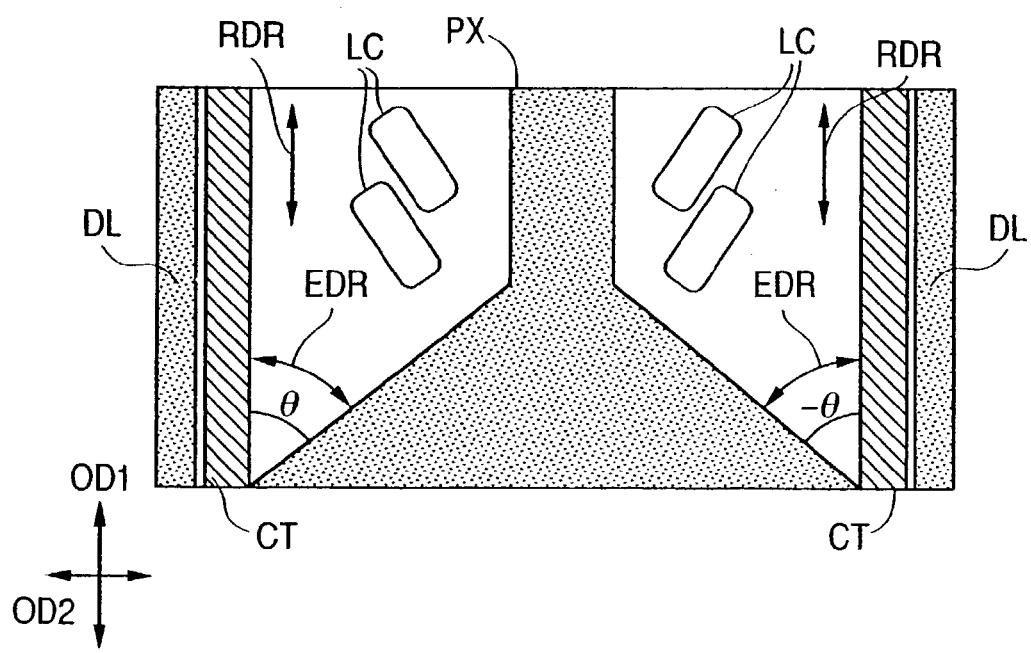

FIGS. 15A and 15B are illustrations showing the directions of the applied electric field, the directions of polarized-light transmission axes (OD1 and OD2) of polarizing plates (POL1 and POL2), and driving directions of liquid crystal molecules (LC) of the liquid crystal display device of the embodiment 5 of the present invention.

The structure of the embodiment 5 of the present invention is the same as that of embodiment 1 of the present invention except the shapes of a pixel electrode (PX) and two counter electrodes (CT).

In the case of the embodiment 5 of the present invention, as shown in FIG. 14, a pixel electrode (PX) extends straight downward in the image display region, two counter electrodes (CT) have a comb tooth shape protruding upward from a counter voltage signal line (CL), and the region between a pixel electrode (PX) and two counter electrodes (CT) is divided into two parts in one picture element.

In the case of the embodiment 5 of the present invention, as shown in portion A in FIG. 14, a pixel electrode (PX) inside the portion A is formed into a trapezoid, and two counter electrodes (CT) and a pixel electrode (PX) are intersected each other at angles of θ and −θ through an insulating film (GI) inside a portion A and outside of the image display region.

Also, in the case of the embodiment 5 of the present invention, the driving directions of liquid crystal molecules (LC) are determined by the intersecting portion as shown in FIG. 15B.

That is, in the case of embodiment 4, the initial driving directions of liquid crystal molecules (LC) are determined by two counter electrodes (CT) tilted from a linear pixel electrode (PX).

In the case of the embodiment 5, however, the initial driving directions of liquid crystal molecules (LC) are determined by a pixel electrode (PX) tilted from two linear counter electrodes (CT).

Therefore, the embodiment 5 of the present invention also makes it possible to use two driving direction of liquid crystal molecules (LC) in one picture element.

Though it is possible to set angle θ greater than zero degrees but smaller than 90 degrees, it is most preferable to set the angle θ between 30° and 60°.

In the case of the embodiment 5 of the present invention, the rubbing directions of orientation films are parallel each other and moreover parallel with video signal line (DL) or vertical to scanning signal line (GL), as shown in FIG. 14.

Embodiment 6

Figure 16:
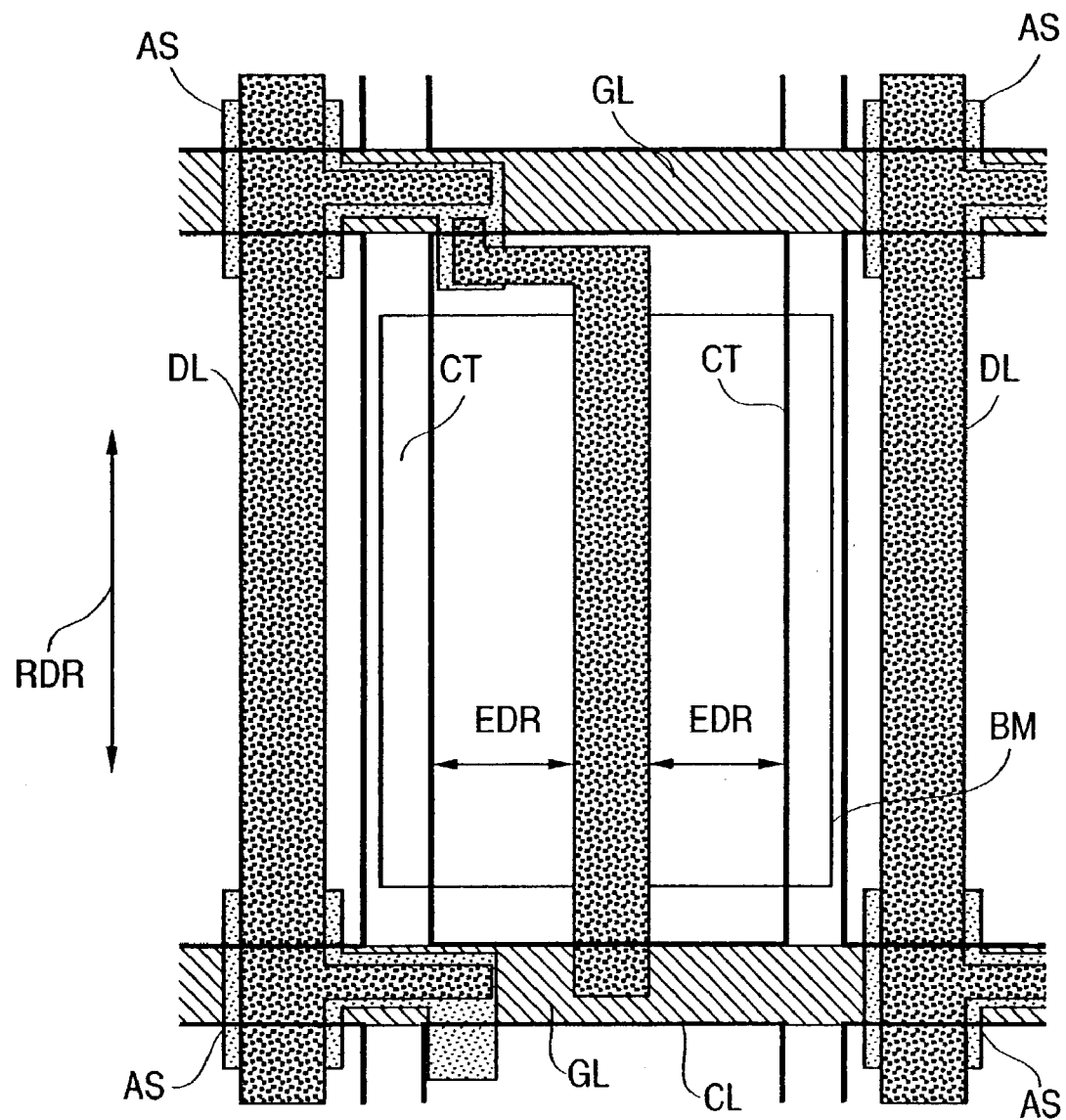
FIG. 16 is a top view showing one picture element and its neighborhood of the active-matrix color liquid crystal display device which is embodiment 6 of the present invention.

FIG. 16 is a top view showing one picture element and its neighborhood of the active-matrix liquid crystal display device of embodiment 6 of the present invention.

Figure 17A:
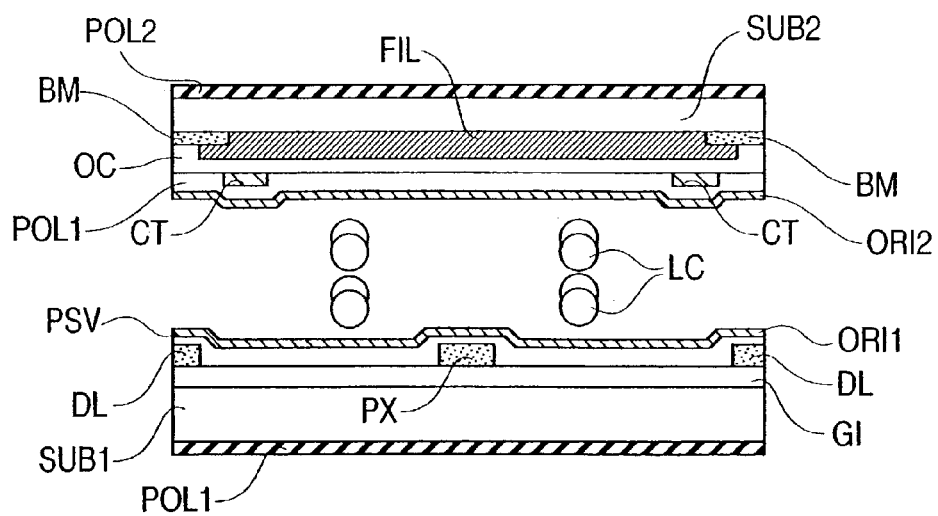
FIGS. 17A, 17B, and 17C are illustrations showing the directions (EDR) of applied electric field, the initial orientation direction (RDR), transmission axes directions (OD1 and OD2) of polarizing plates (POL1 and POL2), and driving directions of liquid crystal molecules (LC) of the liquid crystal display device of embodiment 6 of the present invention.
Figure 17B:
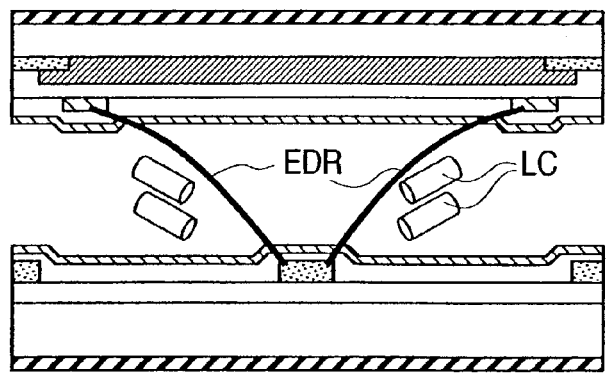
Figure 17C:
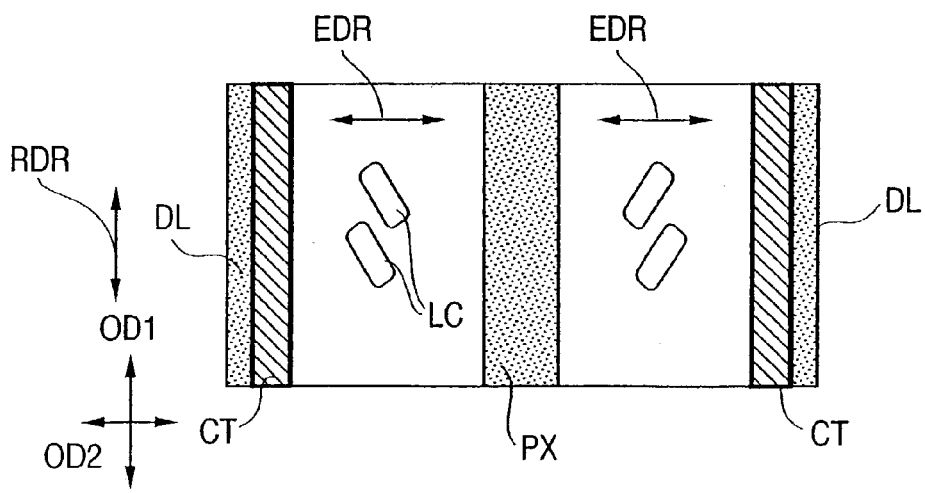

FIGS. 17A to 17C are illustrations showing the directions (EDR) of applied electric field, the directions of polarized-light transmission axes (OD1 and OD2) of polarizing plates (POLL and POL2), and driving directions of liquid crystal molecules (LC) of the active-matrix color liquid crystal display device of the embodiment 6 of the present invention.

The embodiment 6 of the present invention is the same as the embodiment 1 except the following structures.

In the case of the embodiment 6 of the present invention, as shown in FIGS. 17A and 17B, a top orientation film (ORI2), a protective coat (PSVI), counter voltage signal lines (CL) and counter electrodes (CT), an overcoat film (OC), color filter (FIL), and light shielding black matrix (BM) are formed over the top transparent-glass substrate (SUB2).

Moreover, a storage capacitance (Cstg) is constituted by superposing one end of a pixel electrode (PX) and a scanning gate line (GL) at the forward or next scanning stage through an insulating film (GI).

In the case of the embodiment 6 of the present invention, the rubbing directions of orientation films are parallel each other and moreover parallel with counter electrodes (CT), pixel electrodes (PX), and video signal lines (DL), or vertical to scanning signal lines (GL), as shown in FIG. 16.

Moreover, counter voltage signal lines (CL) and counter electrodes (CT) are arranged on a top transparent-glass substrate (SUB2) and, as shown in FIG. 17B, an electric field between a pixel electrode (PX) and a counter electrode (CT) is formed to be slightly tilted from the substrate.

In this case, the driving direction of liquid crystal molecules is determined by a first angle between a direction of a slightly tilted electrical field and a pretilt direction of liquid crystal molecules (LC) at bottom surface of a liquid crystal layer in a portion close to pixel electrode (PX), and by a second angle between a direction of a slightly tilted electrical field and a pretilt direction of liquid crystal molecules (LC) in a portion close to counter electrode (CT), as shown in FIG. 17C.

To match the first and second angles more effectively the rubbing directions of orientation films (ORI1, ORI2) are selected to establish a parallel molecules arrangement. However, a so-called splay molecules arrangement is also applicable to this embodiment.

In the case of the embodiment 6 of the present invention, as shown in FIG. 17B, counter electrodes (CT) formed on a top transparent-glass substrate (SUB2) and pixel electrodes (PX) formed on a bottom transparent-glass substrate (SUB1) are alternately arranged.

Therefore, tilting directions of electrical fields between the counter electrodes (CT) and pixel electrodes (PX) from the substrate are opposite each other in the liquid crystal driving region.

Therefore, in the embodiment 6 of the present invention, two different driving directions are created in one picture element.

Also in the case of the embodiment 6 of the present invention, rubbing is smoothly and securely performed nearby sides of an electrode in the image display region when rubbing an orientation film.

Therefore, it is possible to improve the orientation of liquid crystal molecules of a liquid crystal layer at the sides of an electrode.

Embodiment 7

Figure 18:
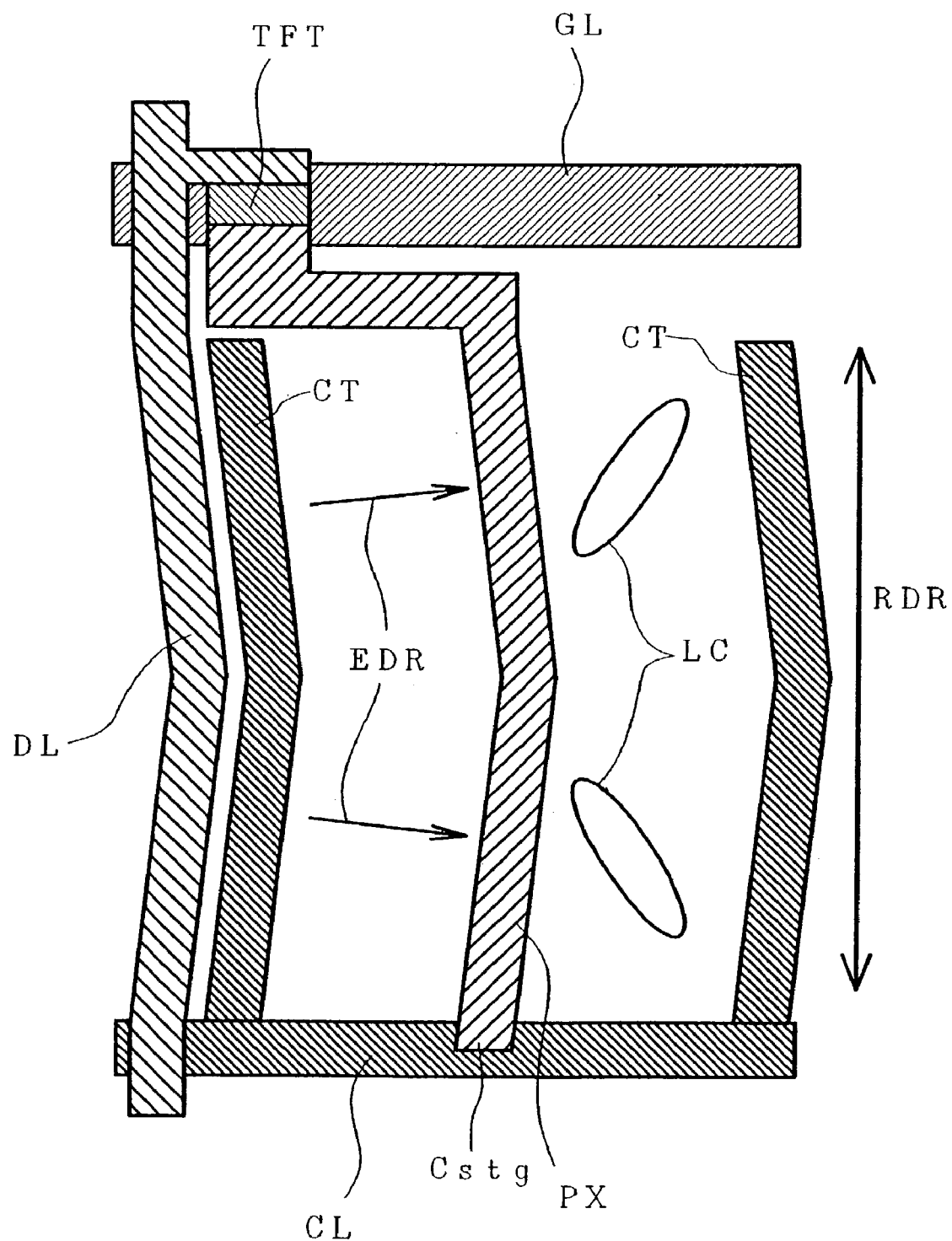
FIG. 18 is a top view of an unit picture element of example 1 in the liquid crystal display device of embodiment 7 of the present invention.

FIG. 18 shows a schematic view of an liquid crystal display device of embodiment 7 of the present invention. When a pixel electrode PX and two counter electrodes CT have a bent structure or zigzag shape as shown in FIG. 18, two electric field directions EDR are generated in one picture element.

Liquid crystal molecules arranged along parallel rubbing directions are different in their rotational directions due to two electric field directions (EDR) and a single initial orientation direction (RDR) of liquid crystal molecules LC when a voltage is applied between the electrodes PX and CT.

Moreover, the liquid crystal display device can be manufactured by making a pixel electrode unparallel with a counter electrode.

Though the angle of a bent portion is not restricted, it is more preferable to set the angle in a range not less than 120° but less than 180° because the bend of a picture element is not observed by the naked eye.

If the angle formed between an electrode and a rubbing direction is too small, a problem occurs that a multiple-gradation display cannot be made because the voltage-transmittance characteristic of a liquid crystal device becomes extremely steep. This problem can be solved by setting two or more different inter-electrode distances in one picture element.

Threshold voltages of the voltage-transmittance characteristics of this embodiment can be changed in accordance with inter-electrode distances so-that the voltage-transmittance characteristics of one picture element are averaged under the two or more gap distances, becomes gradual, and, thereby, multiple-gradation display can be made.

Moreover, when using the structure in which only a pixel electrode and a counter electrode are bent as shown in FIG. 18, a region between a video signal line and a counter electrode increases and the opening ratio decreases.

This problem can be solved by also forming the video signal line or scanning signal line into an analogous bent structure.

EXAMPLE 1

In the case of this embodiment, both angles of the bent portions of the pixel electrodes and counter electrodes are set to 170° as shown in FIG. 18.

The gap distance between a pixel electrode and a counter electrode is the same in all picture element and it is set to 30 µm.

Rubbing directions on top and bottom orientation films sides are almost parallel each other and also vertical to scanning signal lines.

The polarized-light transmission axis of one polarizing plate is made almost parallel with the rubbing direction and that of the other polarizing plate is made perpendicular to the rubbing direction. Thereby, the normally black mode is obtained.

Viewing angle characteristics of the panel thus manufactured are evaluated within ±60° of $\phi$ by using an inspection apparatus (Model C5718 made by HAMAMATSU PHOTONICS Co., Ltd.).

By displaying images of eight gradations and measuring the viewing angle dependency of brightness at each gradation, no tone reversal occurred in the manufactured panel at any angle within ±60° of $\phi$.

EXAMPLE 2

Figure 19:
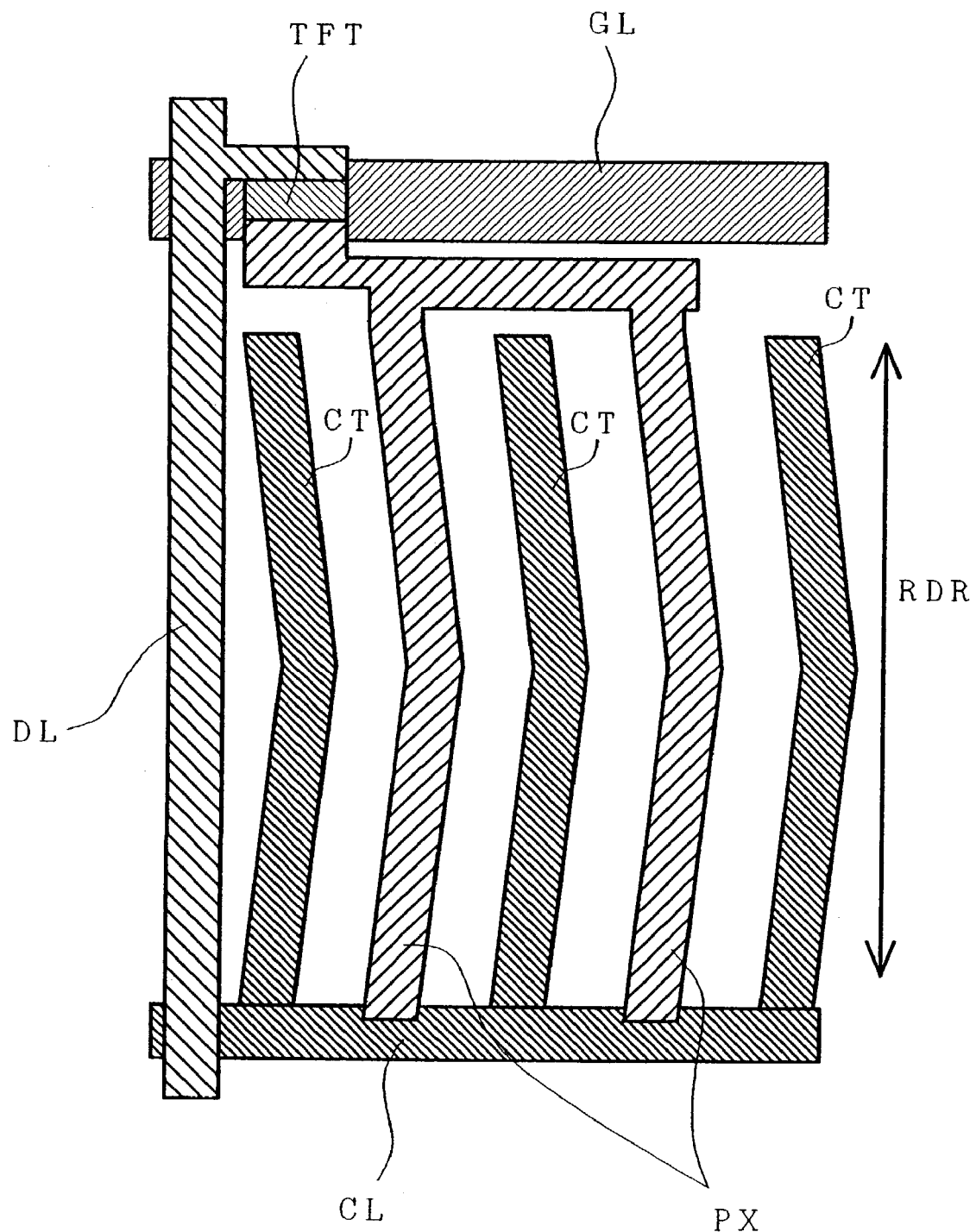
FIG. 19 is a top view of an unit picture element of example 2 in the liquid crystal display device of embodiment 7 of the present invention.

FIG. 19 is an illustration showing another example of this embodiment in the unit picture element.

The liquid crystal display device is manufactured similarly to example 1 except that shapes of two pixel electrode and three counter electrodes are changed as shown in FIG. 19 and the gap distance between pixel electrodes and counter electrodes is changed to 15 µm.

As the result of measuring viewing angle characteristics similarly to the case of example 1, no tone reversal occurred at any angle within ±60° of $\phi$.

EXAMPLE 3

The liquid crystal display device is manufactured similarly to example 2 except that angles of the bent portions of pixel electrodes and counter electrodes are changed to 178°.

As the result of measuring viewing angle characteristics similarly to the case of example 1, no tone reversal occurred at any angle within ±60 of $\phi$.

As the result of measuring a voltage at which the transmittance is maximized and a voltage at which the transmittance is equal to 1% of the maximum transmittance, voltages of 2.5 V and 1.5 V are obtained respectively. The difference between the voltages is 1.0 V, which is remarkably small.

EXAMPLE 4

Figure 20:
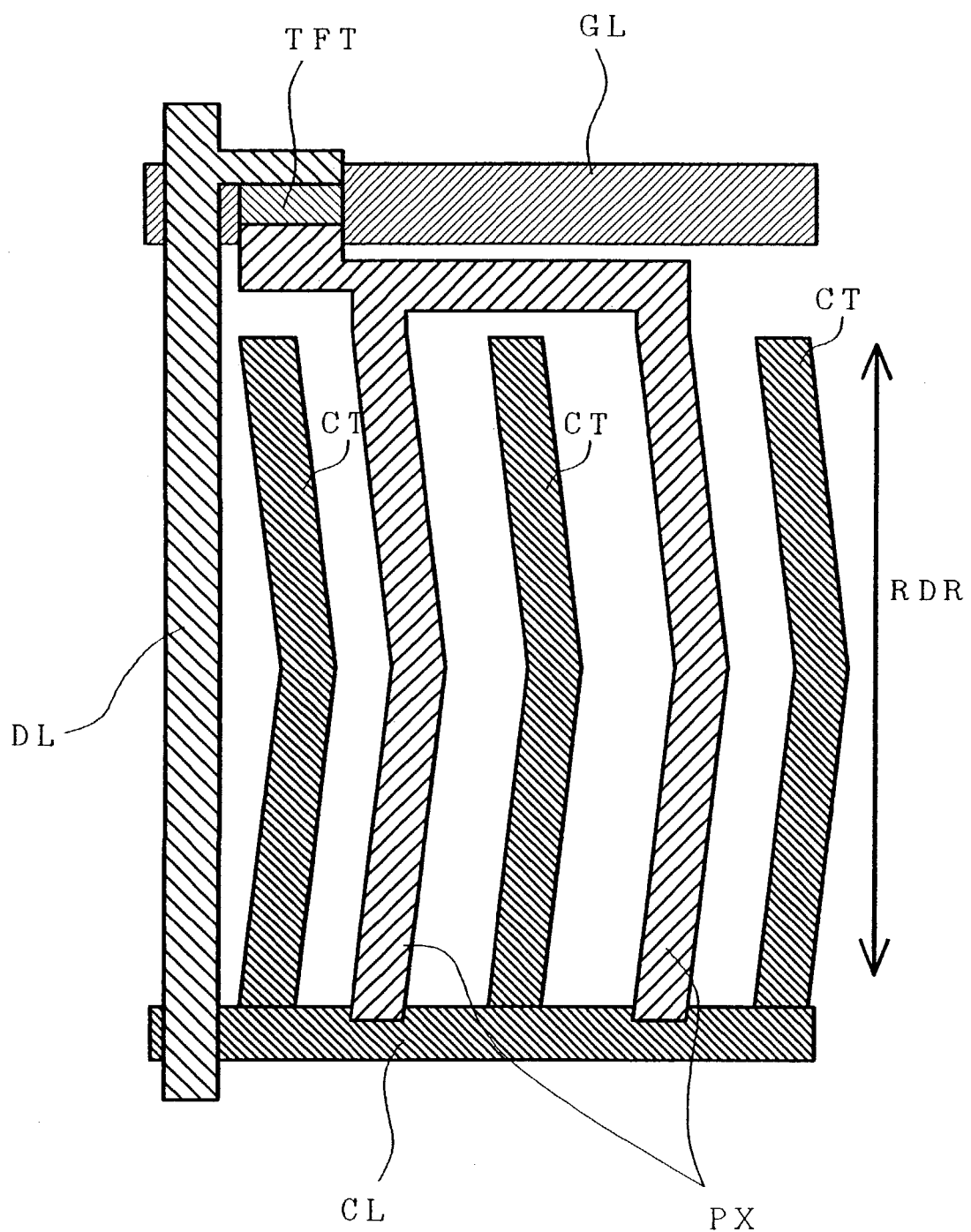
FIG. 20 is a top view of an unit picture element of example 4 in, the liquid crystal display device of embodiment 7 of the present invention.

FIG. 20 is an illustration showing example 4 of this embodiment in one picture element.

The liquid crystal display device is manufactured similarly to example 3 except that two types of gap distances of 20 µm and 10 µm are formed between pixel electrodes and counter electrodes in one picture element.

As the result of measuring viewing angle characteristics similarly to example 1, no tone reversal occurred at any angle within ±60° of $\phi$.

As the result of measuring a voltage at which the transmittance is maximized and a voltage at which the transmittance is equal to 1% of the maximum transmittance, voltages of 3.4 V and 1.0 V are obtained, respectively. The difference between the voltages is 2.4 V, which is large and suitable for displaying multiple gradation levels.

EXAMPLE 5

Figure 21:
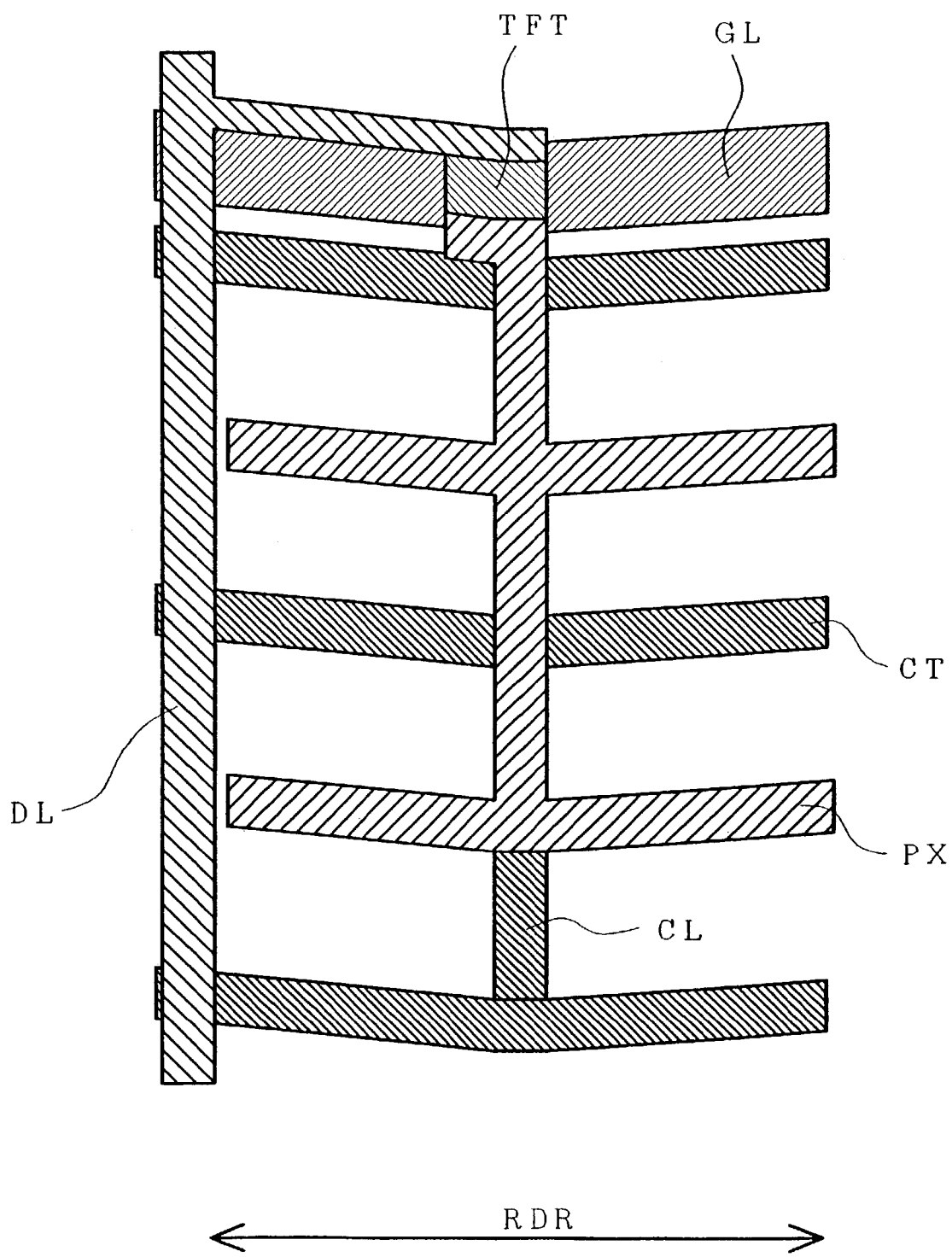
FIG. 21 is a top view of an unit picture element of example 5 in the liquid crystal display device of embodiment 7 of the present invention.

FIG. 21 is an illustration showing example 5 of this embodiment in one picture element.

The liquid crystal display device is manufactured similarly to example 2 except that an electrode has a structure in which a driving direction differs at right-hand side and left-hand side as shown in FIG. 21 and the initial orientation direction of liquid crystal molecules is parallel with scanning signal lines.

The same result of viewing angle characteristics as example 1 has been obtained.

EXAMPLE 6

Figure 22:
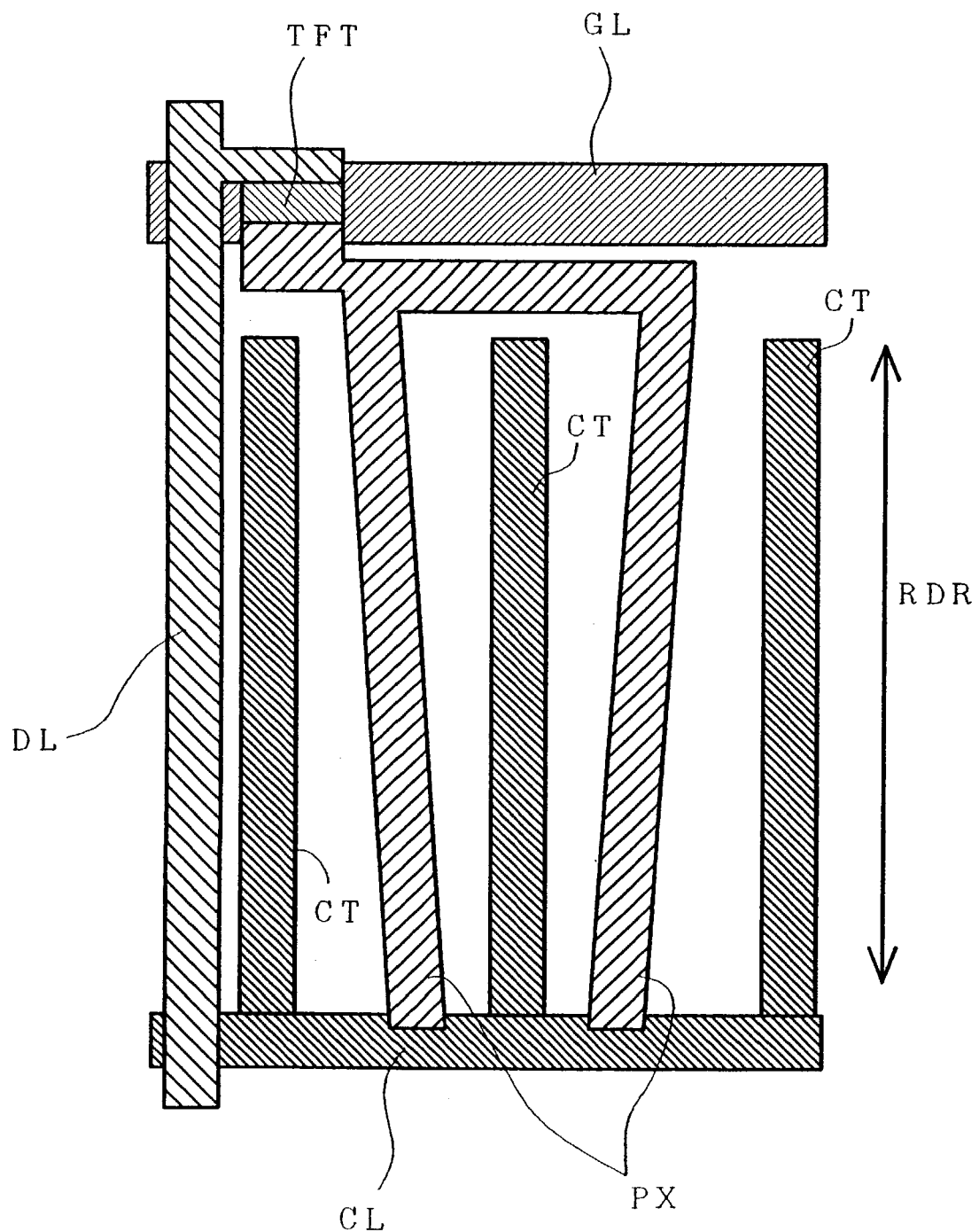
FIG. 22 is a top view of an unit picture element of example 6 in the liquid crystal display device of embodiment 7 of the present invention.

FIG. 22 is an illustration showing example 6 of this embodiment in the unit picture element.

The liquid crystal display device is manufactured similarly to example 2 except that two pixel electrodes are not parallel with three counter electrodes as shown in FIG. 22 and the angle formed between the electrodes is 5°.

The same result of viewing angle characteristics as example 1 has been obtained.

Embodiment 8

In the case of the embodiment 8 of the present invention, the steps of forming a thin film transistor and electrodes are the same as those of embodiment 1 of the present invention.

<<Initial Orientation Direction>>

In the embodiment 8 of the present invention, initial orientation directions ($\phi$LC1 and $\phi$LC2) of liquid crystal molecules are controlled by rubbing top orientation film (ORI2) and bottom orientation film (ORI1) so that rubbings are performed in two directions ($\phi$LC1 and $\phi$LC2) for each picture element.

Figure 23:
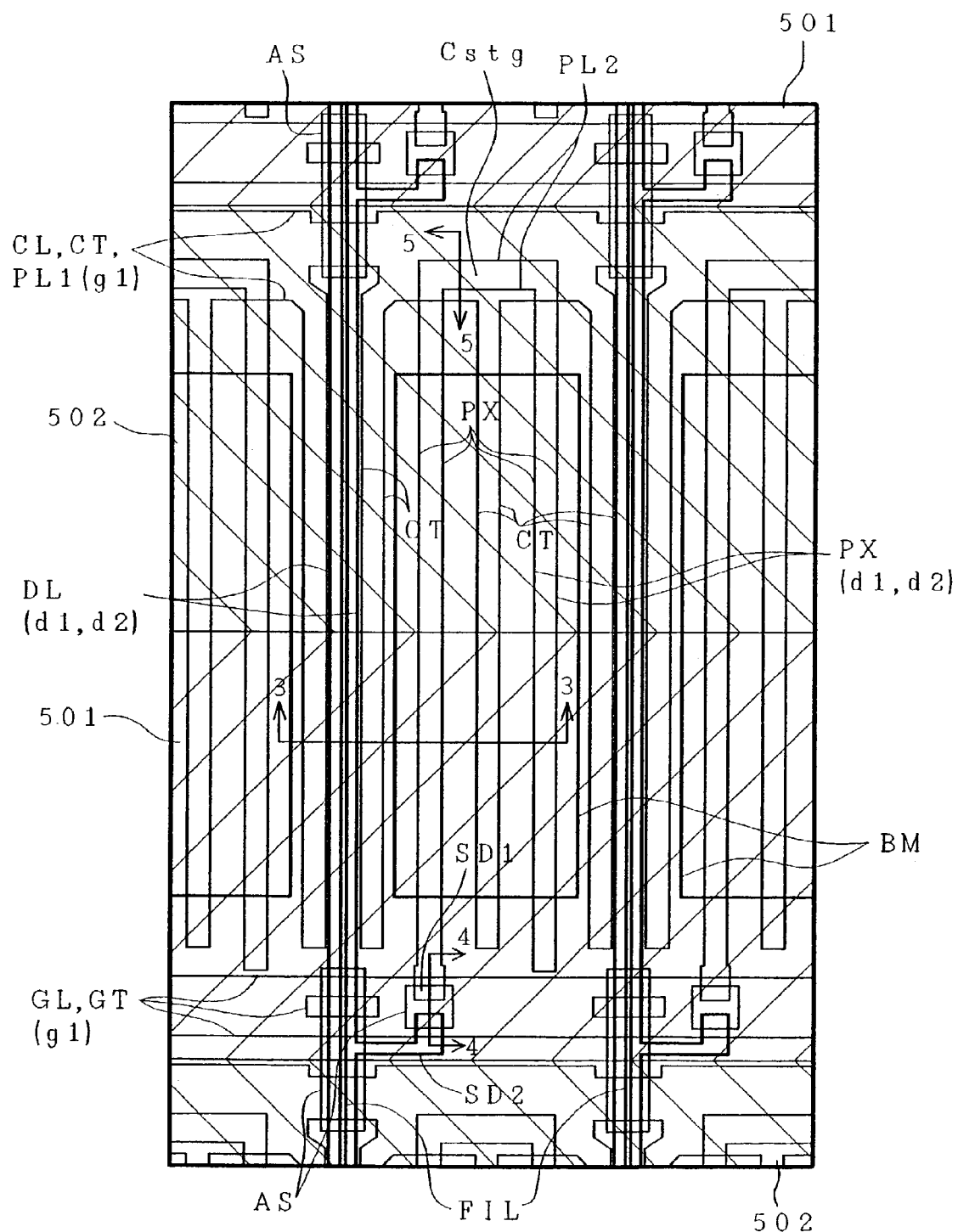
FIG. 23 is a top view showing one picture element and its neighborhood of the active-matrix color liquid crystal display device of embodiment 8 of the present invention.

FIG. 23 shows divided rubbing regions, in which region 501 and region 502 are rubbed in different directions (RDR1 and RDR2), respectively.

Figure 25:
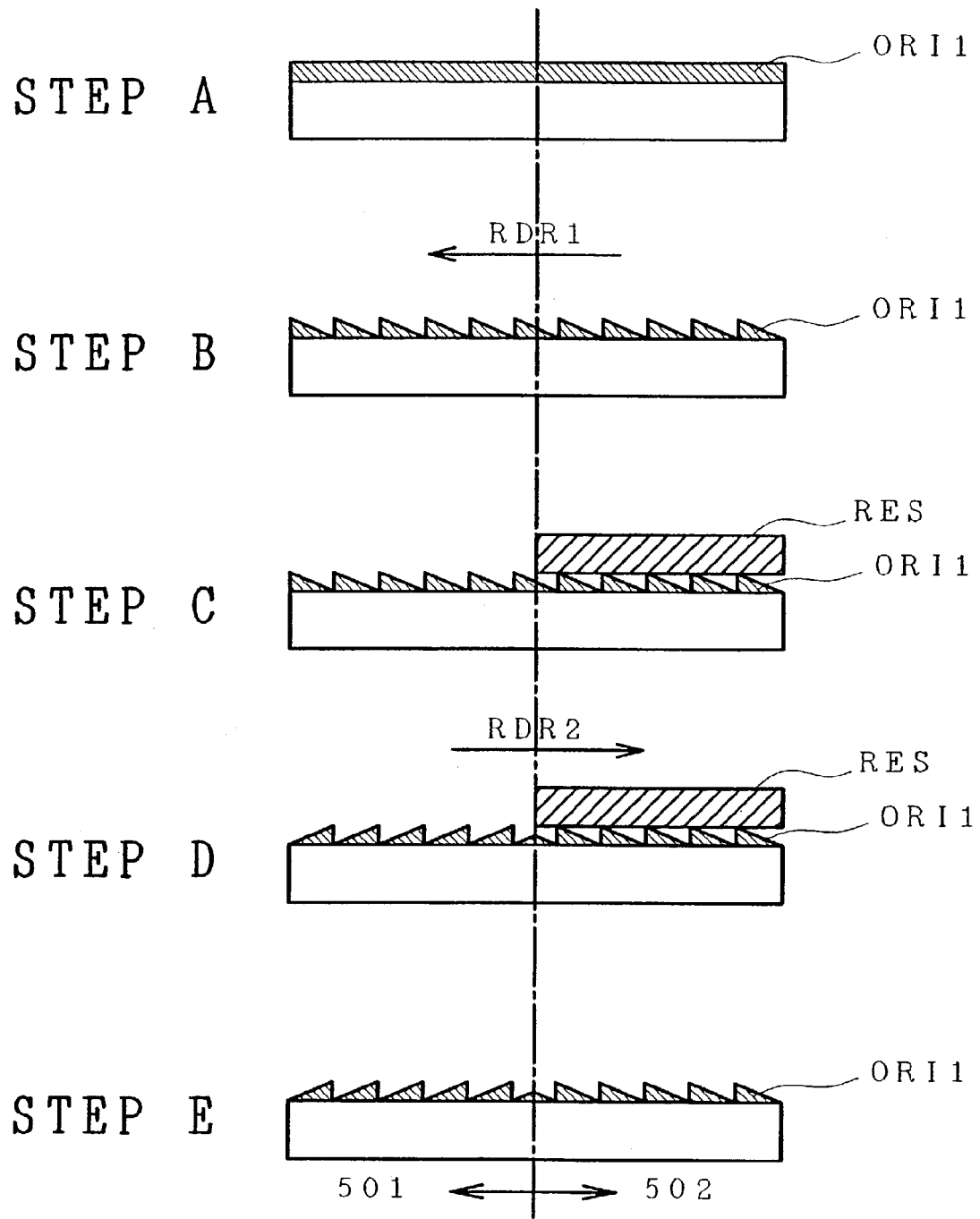
FIG. 25 is an illustration showing a method for rubbing a bottom orientation film (ORT1) of the active-matrix color liquid crystal display device of embodiment 8 of the present invention.

FIG. 25 is an illustration showing a method for rubbing bottom orientation film (ORI1) in the embodiment 8 of the present invention.

As shown in FIG. 25, because two initial orientation directions are provided for liquid crystal molecules at the surfaces of a liquid crystal layer in one picture element, the whole surface of bottom orientation film (ORI1) is rubbed in the RDR1 direction and thereafter, rubbed again in the RDR2 direction in the photoresist process by masking the surface with resist (RES).

Portions not masked with resist (RES) are re-rubbed in the RDR2 direction.

Thereafter, rubbings can be performed in two directions by removing resist (RES) from the surface.

The process of rubbings in FIG. 25 is also applied to top orientation film (ORI2) in each direction so that the rubbing directions for both transparent-glass substrates (SUB1 and SUB2) are almost parallel each other.

FIG. 29 is an illustration showing the relation between the direction (EDR) of the applied electric field, initial orientation directions (RDR1 and RDR2), and polarized-light transmission axes (OD1 and OD2).

In FIG. 29, $\phi$LC1 and $\phi$LC2 show the initial orientation angles formed between the direction of the applied electric field (EDR) and initial orientation directions (RDR1 and RDR2) in regions 501 and 502.

In the case of the embodiment of the present invention, LC1 is set to 75° and $\phi$LC2 is set to 105 □.

The initial orientation angles $\phi$LC1 and $\phi$LC2 must be kept between 45° and 90° (90° excluded) and between 90° and 135° (90° excluded), respectively, when dielectric anisotropy $\Delta\in$ of a liquid crystal is positive, while the initial orientation angles $\phi$LC1 and $\phi$LC2 must be kept between 0° and 45° (0° excluded) and between 145° and 180° (180° excluded), respectively, when the dielectric anisotropy $\Delta\in$ is negative.

Therefore, when liquid crystal with a negative dielectric anisotropy is used for the embodiment 8 of the present invention, it is necessary to set $\phi$LC1 to 15° and $\phi$LC2 to 165°.

<<Polarizing Plate>>

As shown in FIG. 29, the angle $\phi$P1 is set to 90° and the angle $\phi$P2 is set perpendicular to it so that $\phi$P2 is equal to 0°.

Thereby, it is possible to obtain the normally black mode.

Comparative Example

The liquid crystal display device of the comparative example is the same as embodiment 8 except the fact of only one direction of $\phi$LC1=$\phi$LC2 =75°, $\phi$P1=75° and $\phi$P2=165°.

Figure 27A:
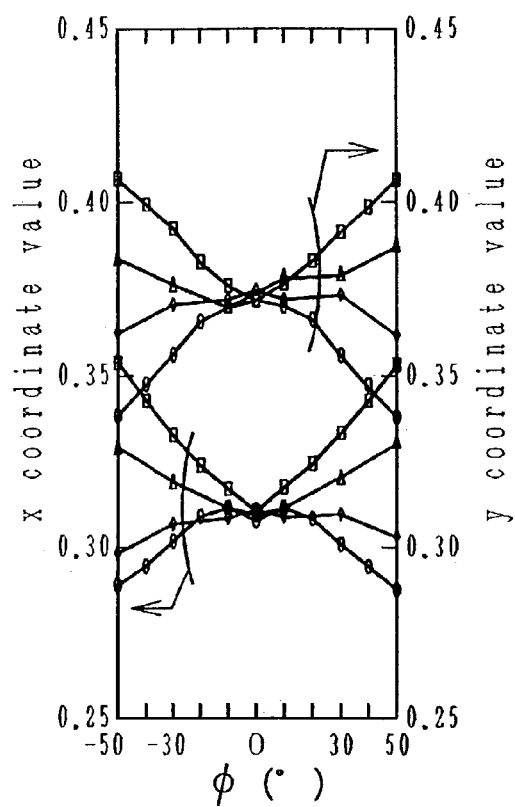
Figure 27B:
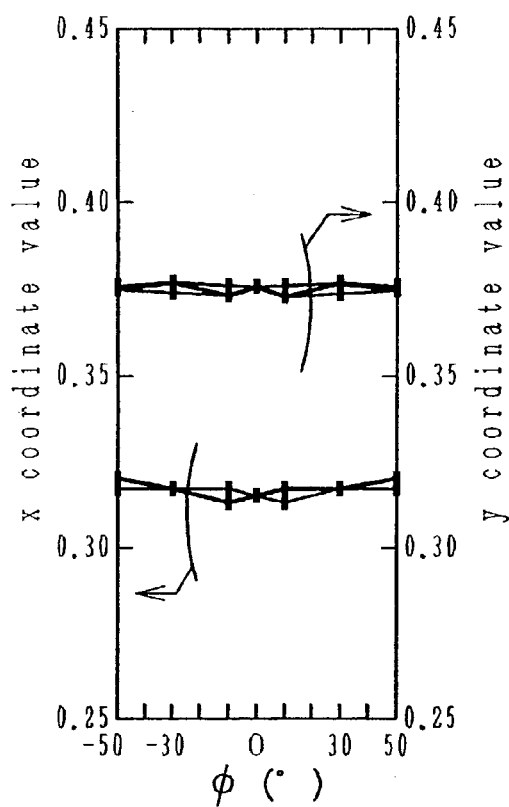

FIGS. 27A and 27B are graphs showing the azimuthal angle ($\phi$) dependent characteristics of white color tone when driving the liquid crystal display device of the embodiment 8 of the present invention and the liquid crystal display device of the comparative example, in which FIG. 27A shows the case of the comparative example and FIG. 27B shows the case of the embodiment 8 of the present invention.

X-coordinate and y-coordinate are chromaticity coordinates according to the CIE1931 X-Y-coordinate system.

These are measured at four azimuthal angles θ defined in FIG. 30 which are 0°, 40°, 90°, and 150°.

Moreover, a symbol θ denotes an aximuthal angle of a viewing direction in its circumferential direction parallel with the panel surface, and a symbol θ denotes a polar angle of a viewing direction from the direction vertical to the panel surface.

From the results of the comparative example shown in FIG. 27A, it is found that the white color tone greatly differs depending on a viewing angle.

In the case of the embodiment of the present invention shown in FIG. 27B, however, it is found that the white color tone hardly changes.

This is because rotation angles of liquid crystal molecules in two rubbing regions are symmetric with respect to a line normal to the direction of electric field application and thereby, there is an effect of offsetting coloring each other and it is possible to further expand the angular range in which the white color tone is constant.

Therefore, according to the embodiment 8 of the present invention, it is found that complete color tone constancy can be realized in a range up to ±50° of $\phi$ in the whole circumferential direction θ.

Figure 28A:
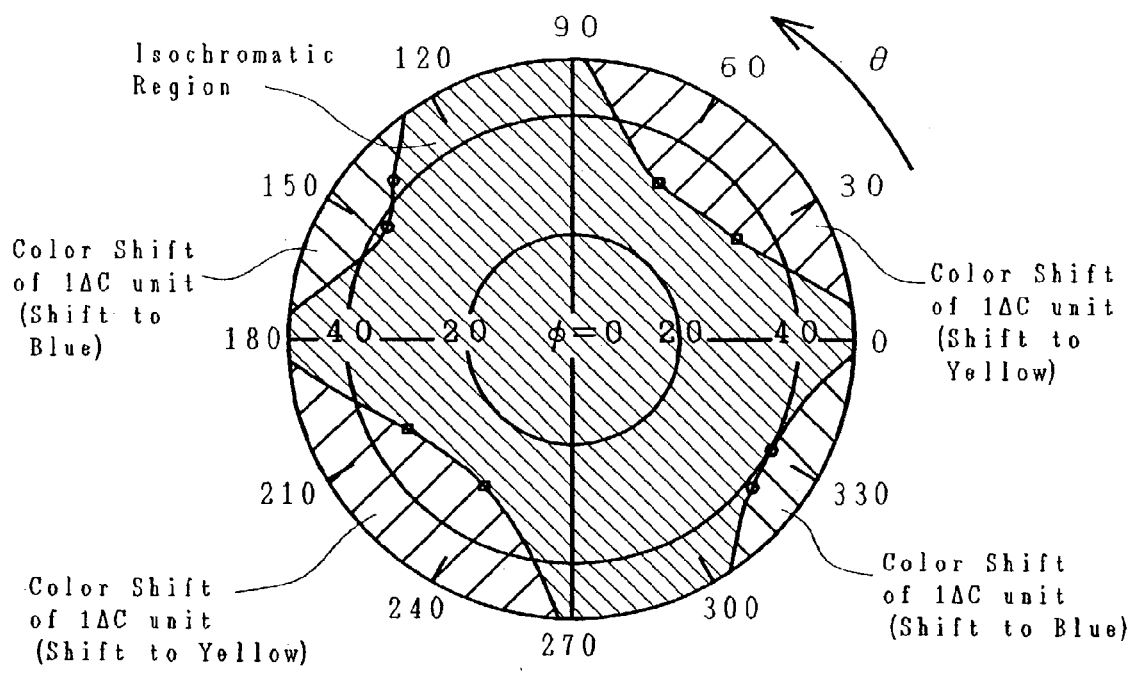
Figure 28B:
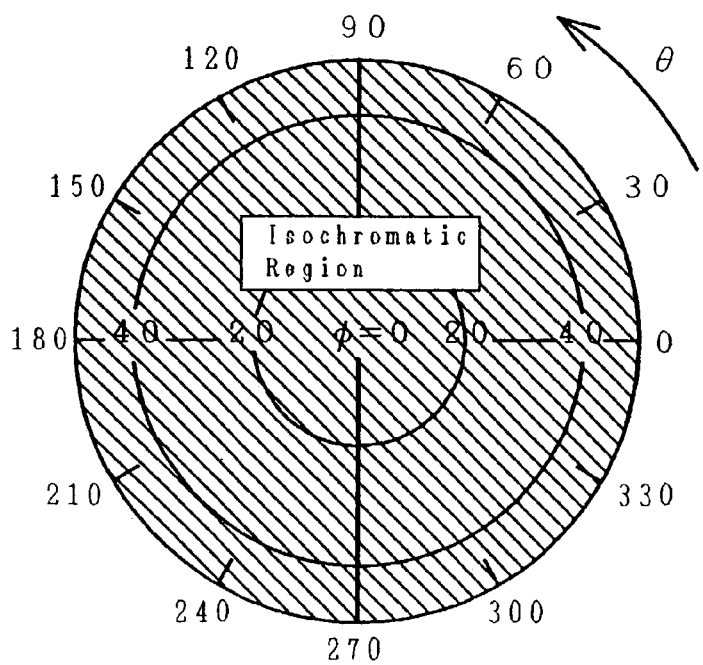

FIGS. 28A and 28B show the color tone constancy (the isochromatic region) in the form of semispherical polar-coordinate (θ, $\phi$) graphs, in which FIG. 28A shows the case of the comparative example and FIG. 28B shows the case of the embodiment 8 of the present invention and both of which show distributions of the white color tone.

The expression of "color shift of 1 ΔC unit" is used for the embodiment of the present invention as an expedient scale for deciding a shift of a color tone.

When X and Y coordinates of the white color tone are shifted from the front white color tone up to +0.02 or more, the shift is defined as "color shift of 1 ΔC unit (shift to yellow)".

When the coordinates are shifted up to −0.02 or more, the shift is defined as "color shift of 1 ΔC unit (shift to blue)".

In the case of the comparative example, white is tinged with blue in the direction of approx. 150° of θ and with yellow in the direction of approx. 45° of θ.

However, the embodiment of the present invention makes it possible to completely homogenize the white color tone in a range up to ±50° of $\phi$ in every direction and improve the homogeneity to a viewing angle direction.

As described above, the embodiment 8 of the present invention makes it possible to improve the homogeneity of color tone, tone reversal, and contrast ratio to a viewing angle and obtain a liquid crystal display device with wide viewing angle characteristics closer to those of a cathode ray tube.

Embodiment 9

The embodiment 9 of the present invention is the same as the embodiment 8 except the values of $\phi$LC1, $\phi$LC2, $\phi$P1, and $\phi$P2.

In the case of the embodiment 9 of the present invention, $\phi$LC1 is set to 87.5°, $\phi$LC2 is set to 92.5°, $\phi$P1 is set to 90°, and $\phi$P2 is set to 0°.

Similarly to the embodiment 8, rotation angles of liquid crystal molecules in two rubbing regions are thereby symmetric with respect to a line normal to the direction (EDR) of an electric field.

Therefore, the effect for offsetting coloring each other is further improved and an angle range in which the white color tone is constant can further be expanded.

Moreover, tone reversal and contrast ratio can homogeneously be averaged in every direction.

Furthermore, in the case of the embodiment 8, a problem occurs that the contrast ratio decreases to about 4 because the angles between initial orientation directions (RDR1, RDR2) and a transmission axis direction (OD1) of a bottom polarizer (POL1) are as large as 15° and thereby, black level does not completely sink when no voltage is applied.

In the case of the structure of the embodiment 9 of the present invention, however, because angles formed between initial orientation directions (RDR1, RDR2) and a transmission axis direction (OD1) of a bottom polarizer (POL1) can be set to a value close to 0°, black level completely sinks when no voltage is applied, the contrast ratio can be improved, and a contrast ratio about 100 can be achieved for the embodiment 9 of the present invention.

In the case of the embodiment of the present invention, LC1 is set to 88.5° and φLC2 is set to 92.5°. However, when these values are closer to 90°, it is possible to further improve the contrast ratio.

Moreover, in the case of the embodiment of the present invention, φLC1 is set to 177.5° and φLC2 is set to 2.5° when liquid crystal with negative dielectric anisotropy is used.

Embodiment 10

The embodiment of the present invention is the same as the above embodiment 8 except φP1 and φP2.

In the embodiment 10 of the present invention, φLC1 is set to 45°, φLC2 is set to 135°, φP1 is set to 90° and φP2 is set to 0°.

Thereby, two initial orientation directions RDR1 and RDR2 are both tilted to −45° and 45° from a transmission axis direction OD1, and show the maximum transmittance when no voltage is applied.

Moreover, when a voltage is applied, major axes (optical axes) of liquid crystal molecules in each region rotate up to −45° or 45° to the direction of applied voltage and coincides with a transmission axis direction OD2 to obtain a black image.

That is, the normally white mode can be obtained.

In the embodiment 10 of the present invention, liquid crystal molecules in every region between electrodes are finally lined up in the direction (EDR) of the applied electric field, and it is possible to make major axes of liquid crystal molecules completely parallel with the polarized-light transmission axis OD2 of one polarizing plate.

Therefore, a preferable black level can be displayed and the contrast ratio becomes the same level or larger than that of the above embodiment 9.

As a result, the embodiment 10 of the present invention makes it possible to obtain a contrast of 120.

In the embodiment 10 of the present invention, though the liquid crystal molecules are arranged in one direction (0°) when an electric field is applied, the problem of coloring is hardly recognized because the coloring occurs in displaying dark images.

As described above, the embodiment 10 of the present invention makes it possible to obtain the same effect as the above embodiment 9.

Moreover, the embodiment 10 of the present invention makes it possible to perform brighter white display because white display is performed when no voltage is applied, and thereby, a homogeneous transmittance can be obtained in a region between electrodes.

Embodiment 11

The embodiment 11 of the present invention is the same as the above embodiment 10 except the following structure.

Figure 24:
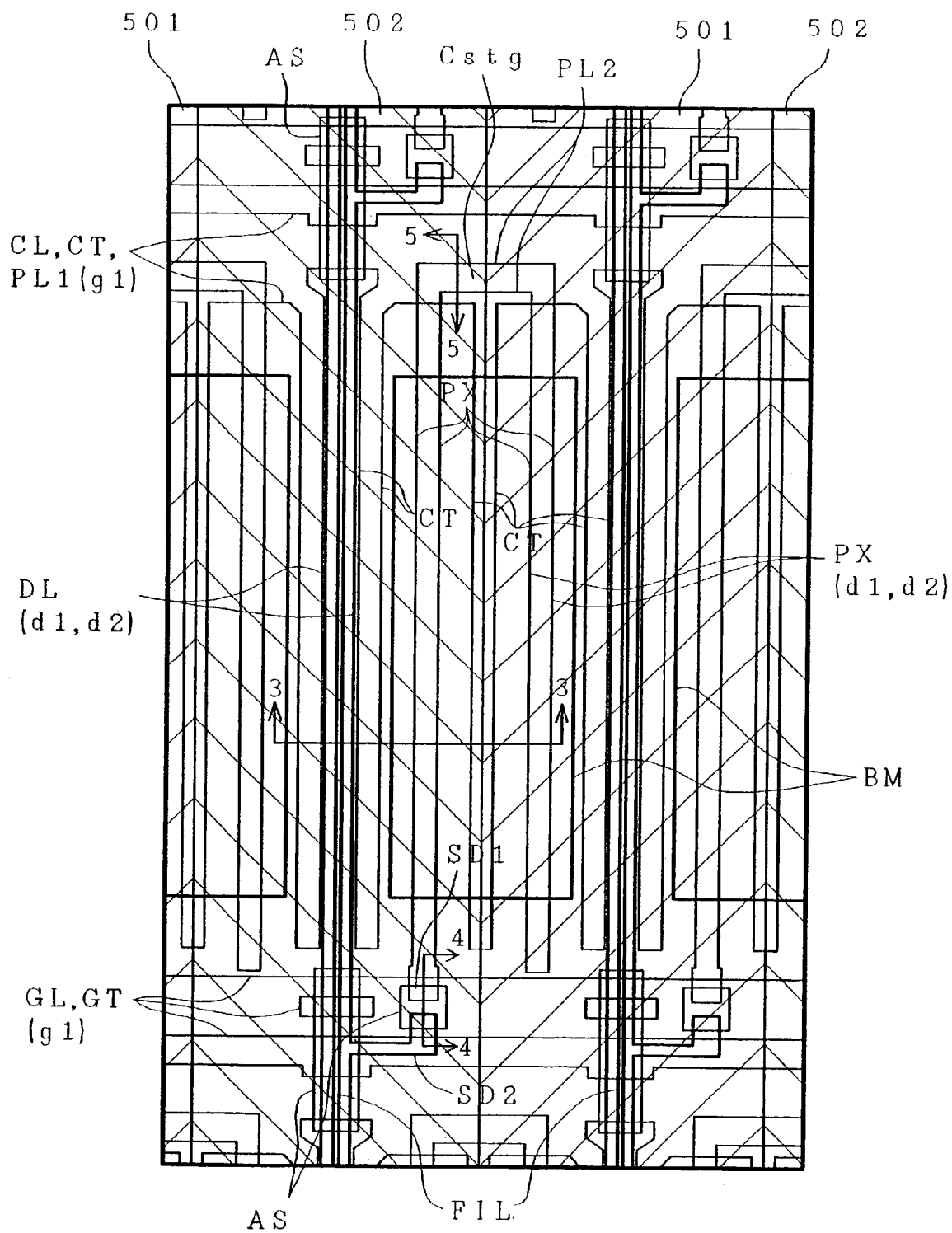
FIG. 24 is a top view showing one picture element and its neighborhood of the active-matrix color liquid crystal display device of embodiment 11 of the present invention.

FIG. 24 is a top view showing one pixel and its neighborhood of the active-matrix color liquid crystal display device of the embodiment 11.

The embodiment 11 of the present invention is different from the embodiment 8 in FIG. 23 only in the way of arranging two regions with different rubbing directions.

When a rubbing boundary is set as shown in FIG. 23, an imperfect orientation region (domain) is formed nearby the boundary, and, thereby, the contrast ratio decreases and the image quality deteriorates.

Therefore, in the case of the embodiment 11 of the present invention, the boundary between two regions 501 and 502 with different rubbing directions is set over a pixel electrode.

It is also possible to set the boundary between two regions 501 and 502 with different rubbing directions over a counter electrode.

Thereby, because the region where a domain is produced can be formed over a metallic electrode unrelated to an image display region, it is possible to prevent deterioration of display quality and decrease of contrast ratio due to the domain.

Therefore, in the case of the embodiment 11 of the present invention, a contrast ratio of 200 and more excellent display quality can be obtained.

As described above, the embodiment 11 of the present invention makes it possible to obtain a very-high-image-quality liquid crystal display device.

Embodiment 12

The embodiment 12 of the present invention is the same as embodiment 8 except the following structure.

Each of the above embodiments 8 to 11 controls initial orientation directions (φLC1 and φLC2) by rubbing top orientation film (ORI1) and bottom orientation film (ORI2).

However, by rubbings twice, it is necessary to mask one of two regions. in one picture element so that the other region is not rubbed.

Therefore, the number of steps of applying and removing resist for masking increases and thereby, the throughput decreases or the direct material cost increases.

Therefore, the embodiment 12 of the present invention is constituted so that it is enough to rub only either of top and bottom orientation films (ORI1 and ORI2).

In the embodiment 12 of the present invention, parallel orientation control power is provided for liquid crystal molecules by adding chiral agents for clockwise spin and counterclockwise spin to liquid crystal composition of liquid crystal layer (LC) at a ratio of approx. 50%:50%.

Thereby, when an initial orientation direction RDR at a side of one orientation film is determined, an initial orientation direction RDR. at the side of the other orientation film is naturally determined.

Therefore, it is enough to rub only one orientation film, the number of steps of applying and removing resist for masking can be halved, and decrease of the throughput and increase of the direct material cost can be prevented.

Moreover, the embodiment 12 of the present invention can be applied to each of the above embodiments and advantages of each embodiment can be reproduced.

As described above, the embodiment of the present invention not only has the advantages of embodiment 8 but also makes it possible to halve the number of steps of applying and removing resist required for rubbing and prevent the throughput from decreasing and the direct material cost from increasing.

Embodiment 13

The embodiment 13 of the present invention is the same as the above embodiment 8 except the following structure.

Each of the above embodiments 1 to 12 controls initial orientation directions φLC1 and φLC2) of liquid crystal molecules by rubbing either or both of top orientation film (ORI1) and bottom orientation film (ORI2).

Figure 26:
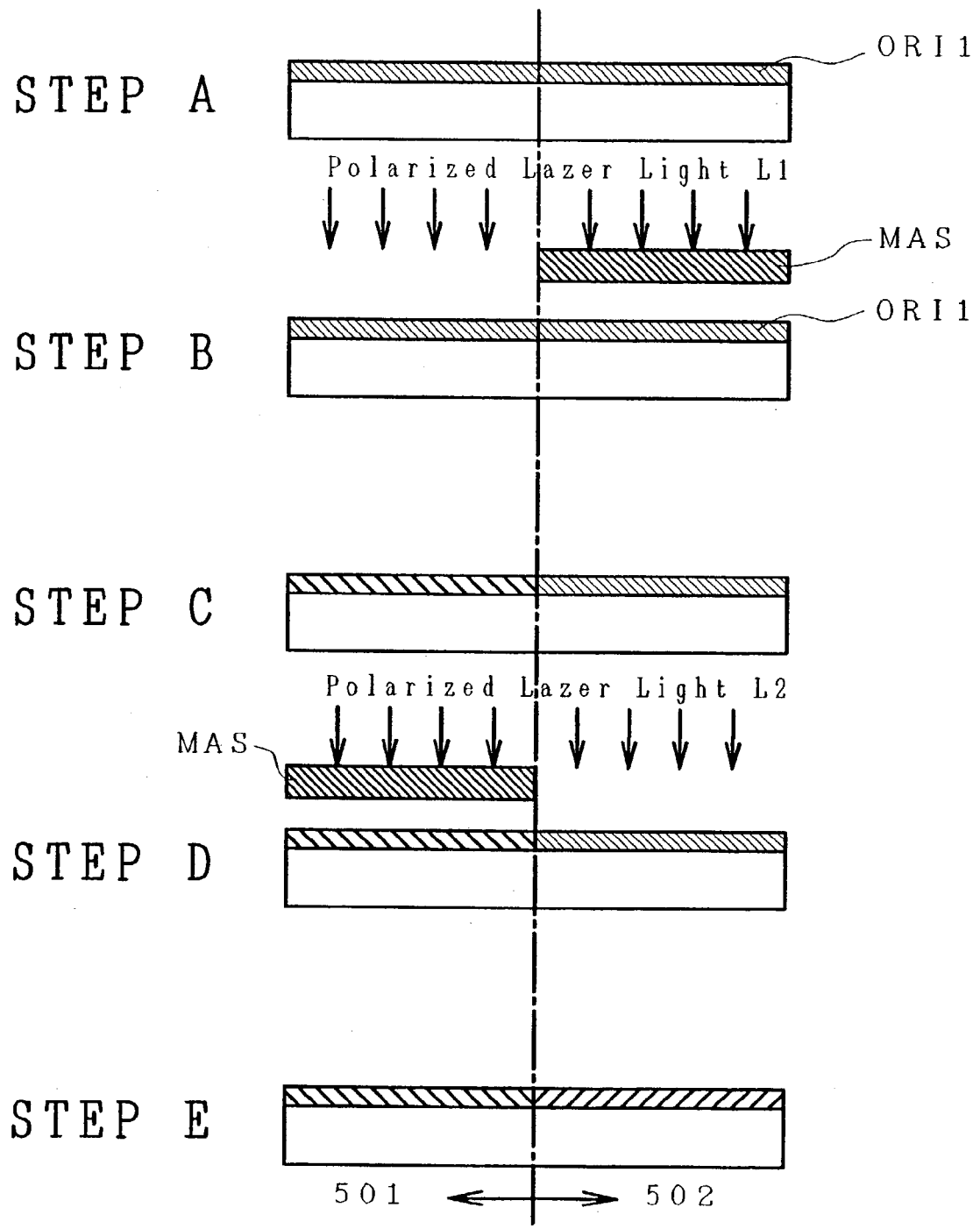
FIG. 26 is an illustration showing a method for applying a laser beam having two predetermined polarized directions to different regions of a bottom orientation film (ORI1) of the active-matrix color liquid crystal display device of embodiment 13 of the present invention.

FIG. 26 is an 1 Illustration showing a method for applying a laser beam having two predetermined polarized directions to different regions of a bottom orientation film (ORI1) of the active-matrix color liquid crystal display device which is embodiment 13 of the present invention.

The embodiment 13 of the present invention applies two polarization laser beams (L1 and L2) with two different polarization directions to two regions whose initial orientation directions should be changed.

Because an interface control power or a so-called anchoring power between polyimide or urethane used, as orientation film (ORI) and liquid crystal molecules changes in accordance with the polarization direction of the light, liquid crystal molecules are initial-oriented in the polarization direction of a laser beam.

Therefore, it is possible to initially orient liquid crystal molecules facing orientation film (ORI) in one picture element to two directions without applying resist.

Moreover, the embodiment 13 of the present invention can be applied to each of the above embodiments and advantages of each embodiment can be reproduced.

As described above, the embodiment 13 of the present invention not only has the advantages of embodiment 8 but also makes it possible to decrease the number of steps of applying and removing resist required for rubbing and prevent the throughput from decreasing and the direct material cost from increasing.

The present invention is described in detail in accordance with embodiments.

However, the present invention is not restricted to the embodiments. It is needless to say that various modifications of the present invention are permitted as long as they follow the gist of the present invention.

Advantages obtained from a typical invention among those disclosed in this application are briefly described below.

(1) The present invention makes it possible to offset color tone shifts each other and greatly reduce the dependency of white color tone on viewing angles in an active-matrix liquid crystal display device using an in-plane field type.

Moreover, characteristic of the minor axis direction of liquid crystal molecules hardly causing tone reversal and that of the major axis direction of liquid crystal molecules easily causing tone reversal are averaged and a no tone reversal viewing angle range can be expanded.

(2) The present invention makes it possible to lower the driving voltage and increase the response speed by arranging the driving direction of liquid crystal molecules between a pair of driving electrodes into a single direction.

(3) The present invention makes it possible to provide a very high quality liquid crystal display device capable of realizing viewing angle characteristics equal to those of a CRT.

The invention claimed is:

1. A liquid crystal display device comprising:
a pair of substrates with a liquid crystal layer therebetween;
a plurality of scanning signal lines and a plurality of video signal lines formed on one of the pair of substrates;
a plurality of first electrodes provided on the one of the pair of substrates;
a plurality of second electrodes on the one of said pair of substrates to drive the liquid crystal by a voltage difference with respect to the first electrode;
an orientation film formed on a nearest surface to the liquid crystal layer on each of the pair of substrates and having an initial orientation direction;
wherein at least two first electrodes and at least one second electrode are provided in each pixel; and
wherein the first electrode and the second electrode have portions substantially in parallel, the at least two first electrodes are connected by a connecting portion in each pixel, a distance between the first electrode and the second electrode becomes smaller gradually in a region approaching the connecting portion than a region where the first electrode and the second electrode are substantially in parallel, and one edge of a light shielding layer is arranged at the approaching region.

2. The liquid crystal display device according to claim 1, wherein a width of the first electrode becomes gradually wider at the approaching region.

3. The liquid crystal display device according to claim 1, wherein a width of the second electrode becomes gradually wider at the approaching region.

4. A liquid crystal display device comprising:
a pair of substrates with a liquid crystal layer therebetween;
a plurality of scanning signal lines and a plurality of video signal lines formed on one of the pair of substrates;
a plurality of first electrodes provided on the one of the pair of substrates;
a plurality of second electrodes provided on the one of the pair of substrates to drive the liquid crystal layer by a voltage difference with respect to the first electrode; and
an orientation film formed on a nearest surface to the liquid crystal layer on each of the pair of substrates and having an initial orientation direction;
wherein at least one second electrode is sandwiched by two first electrodes in each pixel, and forms a first region arranged at a left side of the second electrode and a second region arranged at a right side of the second electrode;
one of the first electrode and the second electrode become wider gradually in order to reduce a distance between the first electrode and the second electrode; and
a direction where the electrode becomes wider is a counter direction at the first region and at the second region.

5. The liquid crystal display device according to claim 4, wherein the initial orientation direction is substantially a right angle to the scanning signal line.

6. The liquid crystal display device according to claim 5, wherein the first electrode and the second electrode are substantially in parallel in each pixel except in a region where the electrode becomes wider gradually.

7. A liquid crystal display device comprising:
a pair of substrates with a liquid crystal layer therebetween;
a plurality of scanning signal lines and a plurality of video signal lines formed on one of the pair of substrates;
a plurality of first electrodes provided on the one of the pair of substrates;
a plurality of second electrodes provided on the one of the pair of substrates to drive the liquid crystal layer by forming an electric field by a voltage difference with respect to the first electrode; and
an orientation film formed on a nearest surface to the liquid crystal layer on each of the pair of substrates and having an initial orientation direction;
wherein at least one second electrode is sandwiched by two first electrodes in each pixel, a region between the first electrode and the second electrode includes first and second regions along an elongated direction of the second electrode;

the first electrode and the second electrode are arranged substantially in parallel in the first region and arranged to be non-parallel in the second region;

a direction of the electric field formed between the first electrode and the second electrode in the second region is different from a right angle to the second electrode in the first region; and the direction of the electric field in the second region is in counter relation to the initial orientation direction between a right side and a left side of the second electrode.

8. The liquid crystal display device according to claim 7, wherein the initial orientation direction is substantially at a right angle to the scanning signal line.

9. The liquid crystal display device according to claim 8, wherein the first electrode and the second electrode are substantially in parallel in the first region and non-parallel in the second region.

10. A liquid crystal display device comprising:

a pair of substrates with a liquid crystal layer therebetween;

a plurality of scanning signal lines and a plurality of video signal lines formed on one of the pair of substrates;

a plurality of first electrodes provided on the one of the pair of substrates;

a plurality of second electrodes provided on the one of the pair of substrates to drive the liquid crystal layer by forming an electric field by a voltage difference with respect to the first electrode; and an orientation film formed on a nearest surface to the liquid crystal layer on each of the pair of substrates and having an initial orientation direction;

wherein the first electrode and the second electrode are substantially in parallel, and at least one of the first electrode and the second electrode has a wider portion at a tip of the electrode.

11. The liquid crystal display device according to claim 10, wherein a direction of the electric field between the first electrode and the second electrode changes in a region of the tip as compared to the parallel region.

12. The liquid crystal display device according to claim 10, wherein a direction of the electric field between the first electrode and the second electrode changes in a region of the tip as compared to the region where the first electrode and the second electrode are arranged to be substantially in parallel.

13. The liquid crystal display device according to claim 10, further comprising a light shielding layer, wherein one edge of the light shielding layer is elongated substantially in a direction parallel with the scanning signal line and arranged at a region of the wider portion.

14. The liquid crystal display device according to claim 10, wherein the wider portion increase a width of the electrode gradually with approach to the tip of the electrode.

15. The liquid crystal display device according to claim 10, wherein the one of the first electrode and the second electrode has a parallel portion, a wider portion and parallel portion in order with approach to the tip thereof.

* * * * *